(12) United States Patent
Matsuura et al.

(10) Patent No.: US 7,213,078 B2
(45) Date of Patent: May 1, 2007

(54) E-MAIL SERVICE APPARATUS, SYSTEM, AND METHOD

(75) Inventors: Kenichiro Matsuura, Kanagawa (JP); Hiroshi Satomi, Kanagawa (JP); Satoshi Igeta, Kanagawa (JP); Atsushi Inoue, Toyko (JP); Kosuke Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 726 days.

(21) Appl. No.: 10/159,586

(22) Filed: May 31, 2002

(65) Prior Publication Data

US 2002/0194286 A1    Dec. 19, 2002

(30) Foreign Application Priority Data

Jun. 1, 2001    (JP) ............................. 2001-167189

(51) Int. Cl.
    *G06F 15/16* (2006.01)
(52) U.S. Cl. .................. 709/246; 709/206; 715/523; 705/40
(58) Field of Classification Search ............... 709/206, 709/246–247; 705/1, 34, 26, 40; 715/515, 715/523
    See application file for complete search history.

(56) References Cited

U.S. PATENT DOCUMENTS

| | | | |
|---|---|---|---|
| 5,996,022 A * | 11/1999 | Krueger et al. ............. 709/247 |
| 6,249,808 B1 * | 6/2001 | Seshadri ..................... 709/206 |
| 6,449,343 B1 * | 9/2002 | Henderson ............... 379/88.14 |
| 6,643,684 B1 * | 11/2003 | Malkin et al. .............. 709/206 |
| 6,801,793 B1 * | 10/2004 | Aarnio et al. ............... 455/566 |
| 2001/0013070 A1 * | 8/2001 | Sasaki ........................ 709/246 |
| 2001/0054011 A1 * | 12/2001 | Kimpara et al. .............. 705/26 |
| 2002/0016818 A1 * | 2/2002 | Kirani et al. ................ 709/203 |
| 2002/0044294 A1 * | 4/2002 | Matsuura et al. .......... 358/1.13 |
| 2002/0184145 A1 * | 12/2002 | Sijacic et al. ................. 705/40 |
| 2002/0198931 A1 * | 12/2002 | Murren et al. ............. 709/203 |
| 2004/0059651 A1 * | 3/2004 | MaGuire et al. ............. 705/30 |
| 2004/0133487 A1 * | 7/2004 | Hanagan et al. .............. 705/34 |

* cited by examiner

*Primary Examiner*—Abdullahi Salad
(74) *Attorney, Agent, or Firm*—Cowan, Liebowitz & Latman, P.C.

(57) ABSTRACT

A net database holds, for each user, user information which contains information indicating a forwarding destination (FAX, Web, portable terminal, or the like) of a received e-mail message, and information indicating a destination to which a message indicating that an e-mail message is forwarded is to be sent. A site which includes a judgment module and conversion module converts a received e-mail message into a data format matching the forwarding destination designated by the user information using the self function or in collaboration with another site. The converted data is forwarded to a mail server, Web server, or FAX server in accordance with the designated forwarding destination. When the e-mail message is forwarded via the Web server or FAX server, a message indicating this is sent to a portable terminal via the mail server.

5 Claims, 67 Drawing Sheets

406a USER INFORMATION TABLE

| USER ID |
| --- |
| PASSWORD |
| USER NAME (LAST NAME) |
| USER NAME (FIRST NAME) |
| USER NAME FURIGANA (LAST NAME) |
| USER NAME FURINAGA (FIRST NAME) |
| CREDIT CARD COMPANY |
| CREDIT CARD NUMBER |
| CREDIT CARD EXPIRATION DATE |
| ACCOUNTING RECORD |

406d USER PORTABLE TERMINAL INFORMATION TABLE

FIG. 12

406e USER CONVERSION SETUP TABLE

| |
|---|
| USER ID |
| TEMPORARY FLAG |
| Web DISPLAY=ON |
| FUNCTION OF DISPLAYING ATTACHED IMAGE ON Web=ON |
| FUNCTION OF DISPLAYING ATTACHED WORDPROCESSOR DOCUMENT ON Web=ON |
| USE PAY CONVERSION IN Web DISPLAY |
| NOTIFY BY MAIL WHEN Web PAGE IS UPLOADED TO Web SERVER |
| DISPLAY ON PORTABLE TERMINAL COMPATIBLE Web=ON |
| FUNCTION OF DISPLAYING ATTACHED IMAGE ON PORTABLE TERMINAL COMPATIBLE Web=ON |
| FUNCTION OF DISPLAYING ATTACHED WORDPROCESSOR DOCUMENT ON PORTABLE TERMINAL COMPATIBLE Web=ON |
| USE PAY CONVERSION IN DISPLAY ON PORTABLE TERMINAL COMPATIBLE Web |
| NOTIFY BY MAIL WHEN PORTABLE TERMINAL COMPATIBLE Web PAGE IS UPLOADED TO Web SERVER |
| FORWARD TO PORTABLE TERMINAL=ON |
| FUNCTION OF SENDING SUMMARY OF BODY TEXT TO PORTABLE TERMINAL WHEN NUMBER OF CHARACTERS OF BODY TEXT IS LARGER THAN MAXIMUM NUMBER OF DISPLAYABLE CHARACTERS OF PORTABLE TERMINAL=ON |
| FUNCTION OF CONVERTING ATTACHED IMAGE TO DISPLAYABLE SIZE AND SENDING CONVERTED IMAGE TO PORTABLE TERMINAL=ON |
| FUNCTION OF SENDING SUMMARY OF ATTACHED WORDPROCESSOR DOCUMENT TO PORTABLE TERMINAL=ON |
| USE PAY CONVERSION IN DISPLAY ON PORTABLE TERMINAL |
| FORWARD TO FAX=ON |
| FORWARD ATTACHED IMAGE TO FAX=ON |
| FORWARD ATTACHED WORDPROCESSOR DOCUMENT TO FAX=ON |
| DESTINATION FAX (HOME or OFFICE or PORTABLE TERMINAL) |
| ALLOWABLE FAX OUTPUT PAGE COUNT |
| USE PAY CONVERSION IN DISPLAY ON FAX |
| NOTIFY DESTINATION IF FAX IS SENT |
| SELECT CRITERION OF CONVERSION MODULE (PRICE or COMPATIBILITY LEVEL or STABILITY) |

F I G. 16

FIG. 17

406j PORTABLE TERMINAL PERFORMANCE TABLE

| PORTABLE TERMINAL TYPE |
| PORTABLE TERMINAL CARRIER NAME |
| PORTABLE TERMINAL MODEL NUMBER |
| COLOR DISPLAYABLE FLAG |
| NUMBER OF COLORS |
| NUMBER OF Bits PER COLOR |
| MAXIMUM DISPLAYABLE SIZE (VERTICAL) |
| MAXIMUM DISPLAYABLE SIZE (HORIZONTAL) |
| DISPLAYABLE IMAGE FORMAT (MIME) |
| MAXIMUM NUMBER OF DISPLAYABLE CHARACTERS (Byte) |
| DISPLAYABLE Mark Up LANGUAGE |

FIG. 20

DISPLAY MAIL CONTENTS — 710

CHANGE SETUP — 711

FIG. 21

| MEMBER REGISTRATION | | |
|---|---|---|
| DESIRED USER ID: | ☐ | ~720 |
| PASSWORD: | ☐ | ~721 |
| NAME (LAST NAME): | ☐ | ~722 |
| NAME (LAST NAME) FURIGANA: | ☐ | ~723 |
| NAME (FIRST NAME): | ☐ | ~724 |
| NAME (FIRST NAME) FURIGANA: | ☐ | ~725 |
| POSTAL CODE: | ☐ | ~726 |
| ADDRESS: | ☐ | ~727 |
| TELEPHONE NUMBER: | ☐ | ~728 |
| MAIL ADDRESS: | ☐ | ~729 |
| CREDIT CARD COMPANY: | ☐ | ~730 |
| CREDIT CARD NUMBER: | ☐ | ~731 |
| CREDIT CARD EXPIRATION DATE: | ☐ YEAR ☐ MONTH | ~732 |
| | OK ~733    Cancel | ~734 |

FIG. 22

```
ENTER DATA REQUIRED FOR SERVICE THAT YOU WANT TO USE

FORWARD FAX/MAIL TO HOME            ~740

FORWARD FAX/MAIL TO OFFICE          ~741

FORWARD FAX/MAIL TO PORTABLE TERMINAL  ~742
```

FIG. 23

DESIGNATE HOME AS FORWARD DESTINATION OF FAX AND MAIL

HOME FAX: ⎯750

HOME MAIL ADDRESS: ⎯751

| DESIGNATE OFFICE AS FORWARD DESTINATION OF FAX AND MAIL | |
|---|---|
| POSTAL CODE: | ───760 |
| ADDRESS: | ───761 |
| COMPANY NAME: | ───762 |
| DEPARTMENT NAME: | ───763 |
| TELEPHONE NUMBER: | ───764 |
| FAX NUMBER: | ───765 |
| MAIL ADDRESS: | ───766 |
| OK ─767 | |

FIG. 25

DESIGNATE PORTABLE TERMINAL AS FORWARD DESTINATION OF FAX AND MAIL

| | | |
|---|---|---|
| TYPE: | PORTABLE PHONE ▼ | —770 |
| CARRIER NAME: | ○△□× ▼ | —771 |
| TERMINAL MODEL NUMBER: | | —772 |
| TELEPHONE NUMBER: | | —773 |
| FAX NUMBER: | | —774 |
| MAIL ADDRESS: | | —775 |

CHANGE SETUP

CHANGE USE MEDIUM —— 790

CHANGE USE SERVICE —— 791

FIG. 27

SELECT DESIRED SERVICE

- 800 — ☐ DISPLAY ON Web
- 801 — ☐ DISPLAY ON Web BY CHANGING FORMAT IF MAIL CONTAINS ATTACHED IMAGE
- 802 — ☐ DISPLAY ON Web IF MAIL CONTAINS ATTACHED WORDPROCESSOR DOCUMENT
- 803 — ☐ PERMIT USE OF PAY CONVERSION MODULE IN DISPLAY ON Web
- 804 — ☐ NOTIFY PORTABLE TERMINAL IF Web PAGE IS UPLOADED TO Web SERVER
- 805 — ☐ DISPLAY ON PORTABLE TERMINAL COMPATIBLE Web
- 806 — ☐ DISPLAY ON PORTABLE TERMINAL COMPATIBLE Web BY CHANGING FORMAT IF MAIL CONTAINS ATTACHED IMAGE
- 807 — ☐ DISPLAY SUMMARY ON PORTABLE TERMINAL COMPATIBLE Web IF MAIL CONTAINS ATTACHED WORDPROCESSOR DOCUMENT
- 808 — ☐ PERMIT USE OF PAY CONVERSION MODULE IN DISPLAY ON PORTABLE TERMINAL COMPATIBLE Web
- 809 — ☐ NOTIFY PORTABLE TERMINAL IF PORTABLE TERMINAL COMPATIBLE Web PAGE IS UPLOADED TO Web SERVER
- 810 — ☐ FORWARD TO PORTABLE TERMINAL
- 811 — ☐ SEND SUMMARY OF BODY TEXT TO PORTABLE TERMINAL WHEN NUMBER OF CHARACTERS OF MAIL BODY TEXT IS LARGER THAN MAXIMUM NUMBER OF DISPLAYABLE CHARACTERS OF PORTABLE TERMINAL
- 812 — ☐ CONVERT ATTACHED IMAGE TO DISPLAYABLE SIZE AND SEND CONVERTED IMAGE TO PORTABLE TERMINAL IF MAIL CONTAINS ATTACHED IMAGE
- 813 — ☐ DISPLAY SUMMARY AND SEND TO PORTABLE TERMINAL IF MAIL CONTAINS ATTACHED WORDPROCESSOR DOCUMENT
- 814 — ☐ PERMIT USE OF PAY CONVERSION MODULE IN DISPLAY ON PORTABLE TERMINAL
- 815 — ☐ FORWARD TO FAX (CHARGED)
- 816 — ☐ FORWARD TO FAX IF MAIL CONTAINS ATTACHED IMAGE (CHARGED)
- 817 — ☐ FORWARD TO FAX IF MAIL CONTAINS ATTACHED WORDPROCESSOR DOCUMENT (CHARGED)

FAX FORWARD DESTINATION [ ▼ ] 818

ALLOWABLE FAX OUTPUT PAGE COUNT [ ] PAGES 819

- 820 — ☐ PERMIT USE OF PAY CONVERSION MODULE IN GENERATION OF FAX DOCUMENT
- 821 — ☐ NOTIFY PORTABLE TERMINAL IF FAX IS SENT
- 822 — ● PRIORITIZE PRICE UPON SELECTING CONVERSION MODULE
  ○ PRIORITIZE COMPATIBILITY LEVEL UPON SELECTING CONVERSION MODULE
  ○ PRIORITIZE STABILITY UPON SELECTING CONVERSION MODULE

YOU RECEIVED 13 MAIL MESSAGES

| | From | Subject | |
|---|---|---|---|
| 1 | TShoutoku@AAA.go.jp | Hello | |
| 2 | HItou@BBB.ne.jp | Good Morning | |
| 3 | TItagaki@CCC.co.jp | Good Afternoon | |
| 4 | YFukuzawa@AAA.co.jp | Good Evening | |
| 5 | INitobe@BBB.go.jp | Welcome | 830 |
| 6 | SMurasaki@CCC.ne.jp | Genji | |
| 7 | SNatume@AAA.ne.jp | I Am | |
| 8 | NOda@BBB.go.jp | In Owari | |
| 9 | HToyotomi@CCC.co.jp | In Osaka | |
| 10 | ITokugawa@AAA.go.jp | In Edo | |

NEW MESSAGE (832)    NEXT 3 MESSAGES (831)

From      SNatume@AAA.ne.jp

Subject    I AM A CAT

I AM A CAT ·······

BODY TEXT

BODY TEXT

BODY TEXT

BODY TEXT

FORWARD —— 840

DELETE —— 841

FIG. 30

```
DESIGNATE FORWARD DESTINATION AND METHOD OF MAIL
```

850 — ☐ FORWARD AS MAIL

| To: | | 851 |
| Cc: | | 852 |
| Bcc: | | 853 |

854 — ☐ DISPLAY ON Web AND NOTIFY OF MAIL BY URL

| MAIL ADDRESS | | 855 |

856 — ☐ DISPLAY ON Web BY CHANGING FORMAT IF MAIL CONTAINS ATTACHED IMAGE
857 — ☐ DISPLAY ON Web IF MAIL CONTAINS ATTACHED WORDPROCESSOR DOCUMENT
858 — ☐ PERMIT USE OF PAY CONVERSION MODULE IN DISPLAY ON Web
859 — ☐ DISPLAY ON PORTABLE TERMINAL COMPATIBLE Web AND NOTIFY OF URL BY MAIL

| TYPE | | 860 |
| CARRIER NAME | | 861 |
| TERMINAL MODEL NUMBER | | 862 |
| MAIL ADDRESS | | 863 |

864 — ☐ DISPLAY ON PORTABLE TERMINAL COMPATIBLE Web BY CHANGING FORMAT IF MAIL CONTAINS ATTACHED IMAGE
865 — ☐ DISPLAY SUMMARY ON PORTABLE TERMINAL COMPATIBLE Web IF MAIL CONTAINS ATTACHED WORDPROCESSOR DOCUMENT
866 — ☐ PERMIT USE OF PAY CONVERSION MODULE IN DISPLAY ON PORTABLE TERMINAL COMPATIBLE Web
867 — ☐ FORWARD TO PORTABLE TERMINAL

| TYPE | | 868 |
| CARRIER NAME | | 869 |
| TERMINAL MODEL NUMBER | | 870 |
| MAIL ADDRESS | | 871 |

872 — ☐ SEND SUMMARY OF BODY TEXT TO PORTABLE TERMINAL WHEN NUMBER OF CHARACTERS OF MAIL BODY TEXT IS LARGER THAN MAXIMUM NUMBER OF DISPLAYABLE CHARACTERS OF PORTABLE TERMINAL
873 — ☐ CONVERT ATTACHED IMAGE TO DISPLAYABLE SIZE AND SEND CONVERTED IMAGE TO PORTABLE TERMINAL IF MAIL CONTAINS ATTACHED IMAGE
874 — ☐ DISPLAY SUMMARY AND SEND TO PORTABLE TERMINAL IF MAIL CONTAINS ATTACHED WORDPROCESSOR DOCUMENT
875 — ☐ PERMIT USE OF PAY CONVERSION MODULE IN DISPLAY ON PORTABLE TERMINAL
876 — ☐ FORWARD TO FAX (CHARGED)

| FAX NUMBER | | 877 |

878 — ☐ FORWARD TO FAX IF MAIL CONTAINS ATTACHED IMAGE (CHARGED)
879 — ☐ FORWARD TO FAX IF MAIL CONTAINS ATTACHED WORDPROCESSOR DOCUMENT (CHARGED)

| ALLOWABLE FAX OUTPUT PAGE COUNT | | PAGES | — 880

881 — ☐ PERMIT USE OF PAY CONVERSION MODULE IN GENERATION OF FAX DOCUMENT

DESIGNATE MAIL SENDER

MAIL ADDRESS: ▼ —885
FAX SENDER NAME: ▼ —886

DESIGNATE MAIL DESTINATION AND SENDING METHOD

900 — ☐ SEND AS MAIL

To: [ ] — 901
Cc: [ ] — 902
Bcc: [ ] — 903

904 — ☐ DISPLAY ON Web AND NOTIFY OF URL BY MAIL

MAIL ADDRESS [ ] — 905

906 — ☐ DISPLAY ON PORTABLE TERMINAL COMPATIBLE Web AND NOTIFY OF URL BY MAIL

TYPE [ ] — 907
CARRIER NAME [ ] — 908
TERMINAL MODEL NUMBER [ ] — 909
MAIL ADDRESS [ ] — 910

911 — ☐ SEND TO PORTABLE TERMINAL

TYPE [ ] — 912
CARRIER NAME [ ] — 913
TERMINAL MODEL NUMBER [ ] — 914
MAIL ADDRESS [ ] — 915

916 — ☐ SEND SUMMARY OF BODY TEXT TO PORTABLE TERMINAL WHEN NUMBER OF CHARACTERS OF BODY TEXT IS LARGER THAN MAXIMUM NUMBER OF DISPLAYABLE CHARACTERS OF PORTABLE TERMINAL

917 — ☐ PERMIT USE OF PAY CONVERSION MODULE IN DISPLAY ON PORTABLE TERMINAL

918 — ☐ SEND TO FAX (CHARGED)

FAX NUMBER [ ] — 919
ALLOWABLE FAX OUTPUT PAGE COUNT [ ] PAGES
                                            920

```
REGISTER SERVICE COMPANY

COMPANY NAME:      [                    ]—930
POSTAL CODE:       [                    ]—931
ADDRESS:           [                    ]—932
TELEPHONE NUMBER:  [                    ]—933
FAX NUMBER:        [                    ]—934
PERSON IN CHARGE:  [                    ]—935
MAIL ADDRESS:      [                    ]—936

| REGISTER SERVICE SITE | | |
|---|---|---|
| NAME : | | —940 |
| SERVICE COMPANY : | ×× SARVICE COMPANY ▼ | —941 |
| URL : | | —942 |
| MAIL ADDRESS : | | —943 |
| OK —944 | | |

FIG. 38

REGISTER CONVERSION MODULE

| | | |
|---|---|---|
| CONVERSION SERVICE SITE: | ×× SERVICE SITE ▼ | 950 |
| NAME: | | 951 |
| INPUT FORMAT (MIME): | | 952 |
| INPUT FORMAT (EXTENSION): | | 953 |
| OUTPUT FORMAT (MIME): | | 954 |
| OUTPUT FORMAT (EXTENSION): | | 955 |
| OUTPUT FORMAT (UNIQUE): | | 956 |
| COMPATIBILITY LEVEL: | | 957 |
| PRICE: | | 958 |

OK — 959

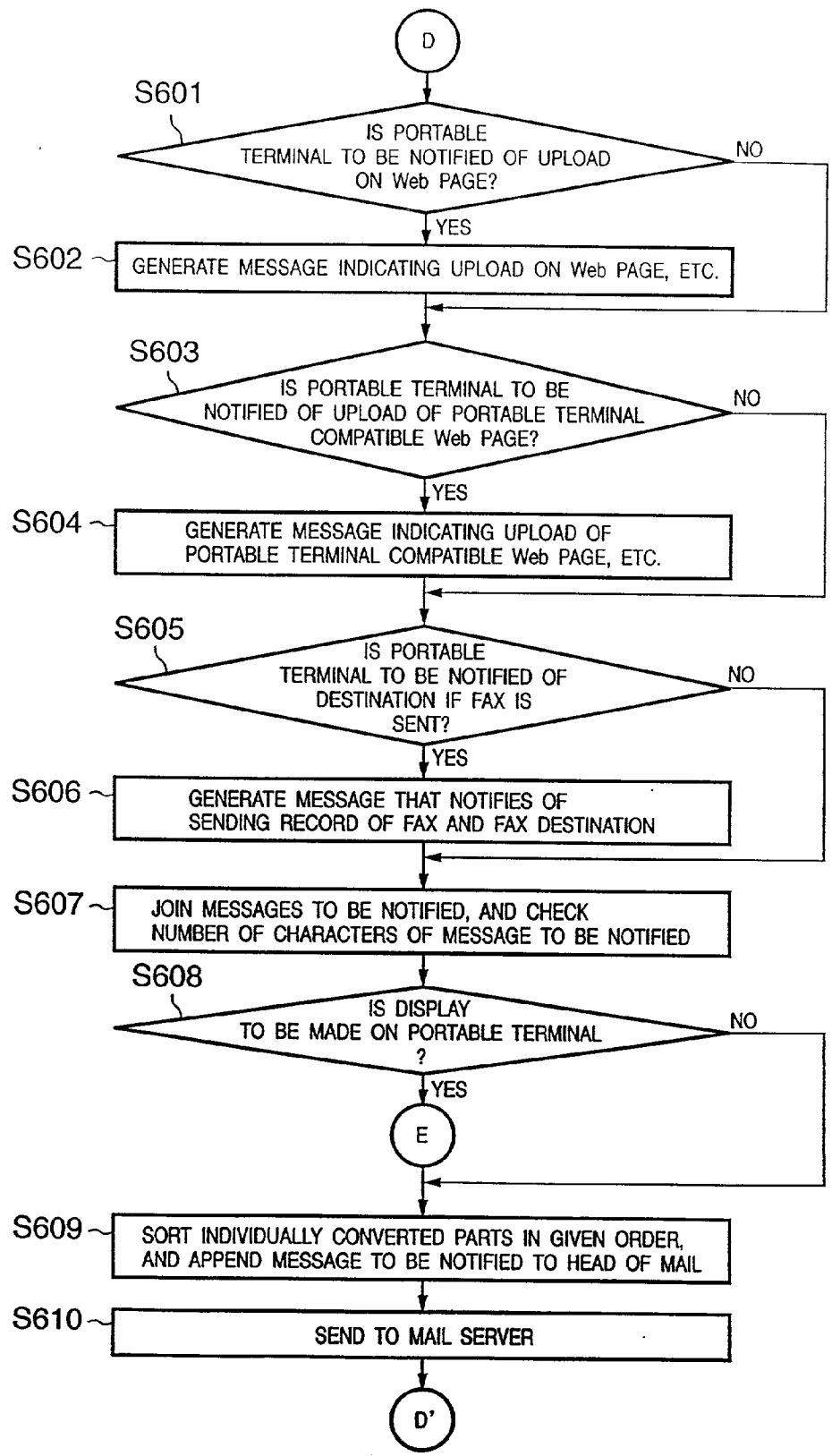

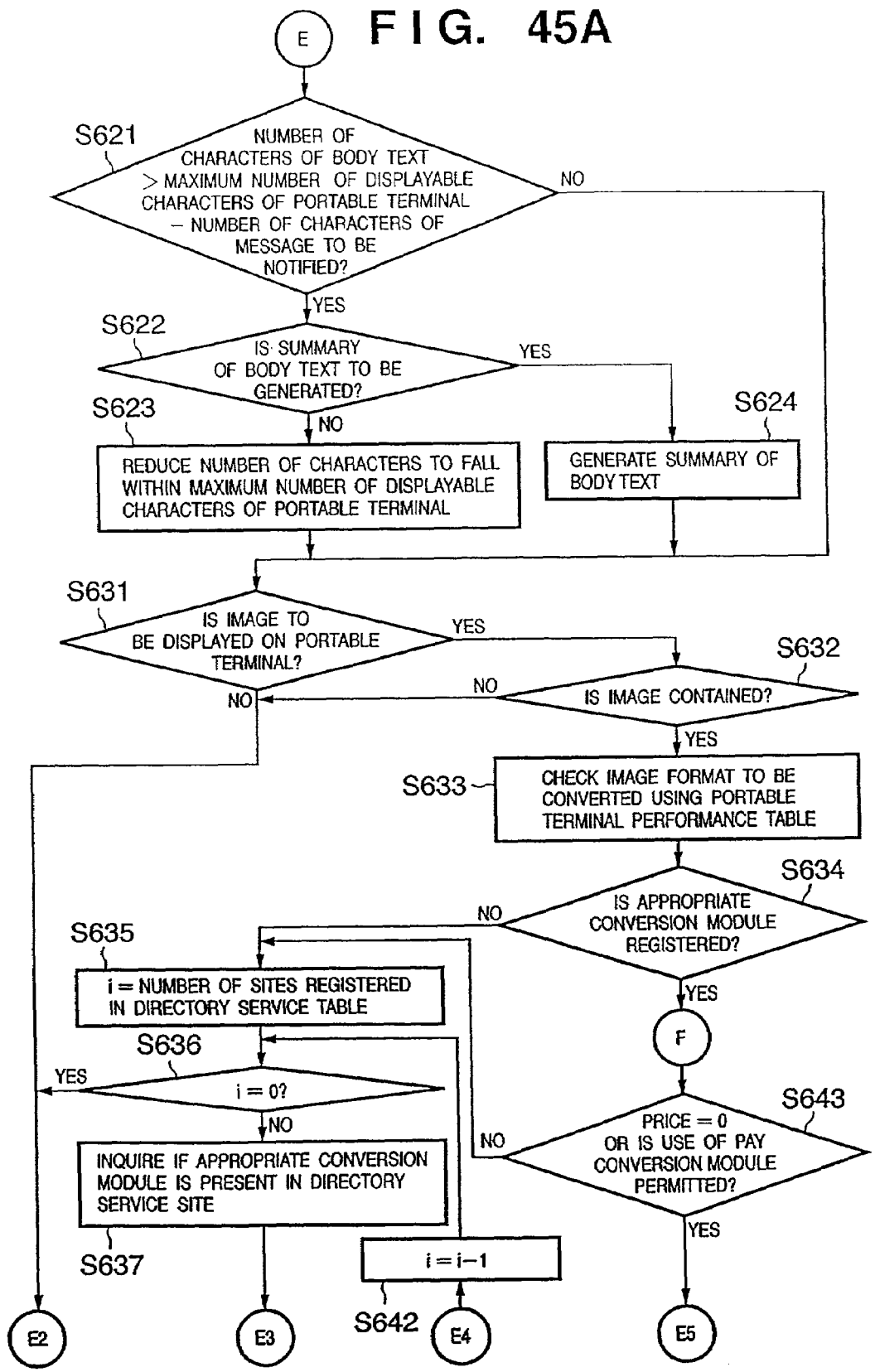

F I G. 50A

```
<?xml version="1.0" encoding="Shift_JIS"?>
<subscribe module="transformation" status="request">
    <input format="MIME"> image/tiff </input>
    <input format="ext"> tiff </input>
    <output format="MIME" > image/jpeg </output>
    <output format="ext">jpg </output>
    <price> 30 </price>
</subscribe>
```

```
<?xml version="1.0" encoding="Shift_JIS"?>
<subscribe module="transformation" status="request">
    <input format="MIME"> image/tiff </input>
    <input format="ext"> tiff </input >
    <output format="MIME" > image/jpeg </output>
    <output format="ext">jpg </output>
    <price> 30 </price>
        <exception> 3892 </exception>
        <exception> 4526 </exception>
</subscribe>
```

FIG. 51A

```
<?xml version="1.0" encoding="Shift_JIS"?>
<subscribe module="transformation" status="ok">
        <id> 3892 </id>
</subscribe>
```

FIG. 51B

```
<?xml version="1.0" encoding="Shift_JIS"?>
<subscribe module="transformation" status="ng">
</subscribe>
```

FIG. 53

```
<?xml version="1.0" encoding="Shift_JIS"?>
<search module="transformation" status="ok">
    <id> 38 </id>
    <compatibility> 8 </compatibility>
    <price > 30 </price>
    <stability> 0.95 </stability
</transformation>
```

E-MAIL SERVICE APPARATUS, SYSTEM, AND METHOD

FIELD OF THE INVENTION

The present invention relates to an e-mail service system, apparatus, and method for providing information to a user using an e-mail system.

BACKGROUND OF THE INVENTION

Along with the development of communication infrastructures and progress of information communication technologies, an information service using the Internet can be made. In the information service using the Internet, not only text information but also multimedia information containing an image, audio, and the like can be provided.

Users who receive information services via the Internet can make communication and exchange of information using e-mail messages among users by registering their mail accounts required to use e-mail.

Normally, e-mail information is text. Also, binary files such as application data (document files) and the like created by users can be attached to e-mail information using an encode technique to text data and a decode technique from text data, and can be exchanged among users.

On the other hand, along with the development of communication infrastructures, the progress of information communication technologies, and size reductions of terminals required to use them, connection to the Internet can be established not only from desktop personal computers but also portable terminals for a mobile environment such as portable phones and the like. As a result, users who utilize e-mail via portable terminals are increasing rapidly.

Means that can acquire information distributed on the Internet are not limited to personal computers, but are wide-ranging devices including portable terminals, e-mail dedicated terminals, and the like. For this reason, unique physical and performance limitations such as limitations on the information size that can be received, limitations on display performance of terminals such as the display size, color, resolution, and the like vary. Even in communications or exchange of e-mail messages between personal computers which suffer less limitations, an information processing environment common to both the sender and receiver is often deficient.

In such environment, if the receiver's environment cannot process received information, that information is discarded without being acquired as information. Hence, information to be exchanged may be lost unless information exchange is made after both the environments are confirmed in advance.

For example, portable terminals can exchange e-mail messages via the Internet. However, the number of received characters per mail message, and information contents that can be handled (attachment of computer digital files or binary files) are limited, and information beyond such limitations is discarded. Therefore, information that an e-mail receiver cannot normally receive (which may be discarded before it reaches a terminal) may be generated unless the e-mail receiver informs an e-mail sender of such limitations.

One can imagine from the domain name of a mail address that the destination of information is a portable terminal, but such address makes no difference from that of a standard Internet mail address system. Furthermore, some portable terminal users forward mail messages with mail addresses, which are normally used in terminals with different limitations on e-mail reception performance such as desktop personal computers or the like, to mail addresses of portable terminals. Therefore, the senders cannot easily determine the information reception performance of receivers' terminals. As a result, it is very difficult for an e-mail sender to predict a receiver's environment, and to process information to allow the receiver to receive it upon sending the information.

Therefore, many e-mail messages exchanged via portable terminals currently suffer loss of information.

In order to avoid such problems, a technique for forwarding an e-mail message to a portable terminal to one account on a server that exploits the World Wide Web technique, and browsing that message via a mechanism of the World Wide Web is already available. However, such technique can only avoid a limitation on the number of received characters at a portable terminal, but cannot cope with browsing of binary files and data acquisition. In this arrangement, since an e-mail message to a portable terminal is unconditionally forwarded to a World Wide Web server, the portable terminal user must always check if mail messages have been forwarded to the World Wide Web server, thus imposing a heavy load on the portable terminal user.

When an e-mail sender attaches a document file or the like created using some application to an e-mail message, a user who uses a portable terminal alone as connection means to the Internet can expand the attached file on the portable terminal, but the expanded file often goes beyond the limitations such as display performance or the like of the portable terminal.

Furthermore, not only in a portable terminal but also in an Internet connection terminal such as a desktop personal computer or the like, which suffers less limitations as reception means, a mail receiving terminal must have an application which is the same as that used when an e-mail sender created an attached document, or is compatible to that application, so as to expand and display document information attached to an e-mail message. However, such application is not always present in the e-mail receiving terminal. If the receiver does not have any application which is the same as that used when the sender created an attached document or is compatible to that application, he or she cannot review information sent from the e-mail sender.

In such environment, the receiver cannot confirm information sent from the sender unless he or she prepares for an environment compatible to the sending environment of the sender with much labor.

SUMMARY OF THE INVENTION

The present invention has been made in consideration of the above problems, and has as its object to provide the contents of an e-mail message by converting them into a data format corresponding to the performance of an e-mail receiving terminal. It is another object of the present invention to allow sending of a forward message to another receiving terminal.

According to the present invention, the foregoing object is attained by providing an information service apparatus comprising: reception means for receiving information to be sent to a user; determination means for determining a destination of the information to be sent received by the reception means on the basis of information set in correspondence with the user; split means for splitting data contained in the information to be sent for respective types of contents; instruction means for instructing format conversion to match each data split by the split means with processing performance of the destination determined by the determination means; and service means for combining the data that have undergone format conversion on the basis of the instruction of the instruction means, and providing the combined data to the destination.

According to another aspect of the present invention, the foregoing object is attained by providing an information processing apparatus, comprising: judgment means for judging a conversion unit that can convert data into a predetermined format; and instruction means for instructing the conversion unit judged by the judgment means to convert the data.

In still another aspect of the present invention, the foregoing object is attained by providing an information processing apparatus comprising: reception means for receiving data; conversion means for converting the received data into a predetermined format; and sending means for sending the data that has been converted into the predetermined format, wherein the received data is data which is instructed by an external apparatus to undergo conversion into the predetermined format.

In still another aspect of the present invention, the foregoing object is attained by providing an information service system comprising: reception means for receiving information to be sent to a user; determination means for determining a destination of the information to be sent received by the reception means on the basis of information set in correspondence with the user; split means for splitting data contained in the information to be sent for respective types of contents; instruction means for instructing format conversion to match each data split by the split means with processing performance of the destination determined by the determination means; conversion means for executing format conversion of the split data instructed by the instruction means; and service means for combining the data that have undergone format conversion on the basis of the instruction of the instruction means, and providing the combined data to the destination.

In still another aspect of the present invention, the foregoing object is attained by providing an information processing system comprising: judgment means for judging a conversion module that can convert data into a predetermined format; and instruction means for instructing the conversion module judged by the judgment means to convert the data.

In still another aspect of the present invention, the foregoing object is attained by providing an information processing system comprising: reception means for receiving data; conversion means for converting the received data into a predetermined format; and sending means for sending the data that has been converted into the predetermined format, wherein the received data is data which is instructed by judgment means present on a network to undergo conversion into the predetermined format.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 shows an example of the data configuration of a user conversion setup table;

FIG. 16 shows an example of the data configuration of a use directory service table;

FIG. 17 shows an example of the data configuration of a portable terminal performance table;

FIG. 20 shows an example of a user setup cover page in the Web server of the net mail service of this embodiment;

FIG. 21 shows an example of a member registration window in the Web server of the net mail service of this embodiment;

FIG. 22 shows an example of a forward destination designation window in the Web server of the net mail service of this embodiment;

FIG. 23 shows an example of a forward destination designation window in the Web server of the net mail service of this embodiment;

FIG. 24 shows an example of a forward destination designation window in the Web server of the net mail service of this embodiment;

FIG. 25 shows an example of a forward destination designation window in the Web server of the net mail service of this embodiment;

FIG. 26 shows an example of a user setup change cover page in the Web server of the net mail service of this embodiment;

FIG. 27 shows an example of a service select window in the Web server of the net mail service of this embodiment;

FIG. 28 shows an example of a received mail list in the Web server of the net mail service of this embodiment;

FIG. 30 shows an example of a mail forwarding setup window in the Web server of the net mail service of this embodiment;

FIG. 31 shows an example of a mail forwarding setup or new mail creation window in the Web server of the net mail service of this embodiment;

FIG. 34 shows an example of a new mail creation window in the net mail service Web server of this embodiment;

FIG. 36 shows an example of a registration window of another site associated with a conversion service in the net mail service Web server of this embodiment;

FIG. 37 shows an example of a registration window of another site associated with a conversion service in the Web server of the net mail service of this embodiment;

FIG. 38 shows an example of a conversion module registration window in the Web server of the net mail service of this embodiment;

FIG. 44 is a flow chart for explaining the process for generating data which can be displayed on a portable terminal;

FIGS. 45A to 45D are flow charts for explaining the process for generating data that can be displayed on a portable terminal;

FIG. 50A shows an example of an XML file used upon registration of a conversion module of this embodiment;

FIG. 51A shows an example of an XML file used upon registration of a conversion module of this embodiment;

FIG. 51B shows an example of a message sent when no corresponding conversion module is found in a conversion service site or directory service site;

FIG. 53 shows an example of an XML file used upon searching for a conversion module of this embodiment.

DETAILED DESCRIPTION OF THE PREFERRED EMBODIMENTS

Preferred embodiments of the present invention will now be described in detail in accordance with the accompanying drawings.

This embodiment will explain an information service system. In this system, when information is provided to the user using an e-mail system, if information that cannot be expanded or displayed in an environment of the receiver terminal of an e-mail message is sent, the system notifies the user of its summary and acquisition method, and can provide information which cannot be expanded or displayed due to environmental limitations in a conventional system to a receiver in various forms.

<System Arrangement>

A service system (to be referred to as a net mail service hereinafter) to be explained in this embodiment has a mail server, a module for judging based on user's setups if it is possible to display or output to a medium of user's choice, and generating a document which matches the medium of user's choice (to be referred to as a judgment module hereinafter), a module for converting a specific format into another specific format (to be referred to as a conversion module hereinafter), a module for setting user information and a medium of user's choice (to be referred to as a setup module hereinafter), and a storage device for storing user information, user's setups of inter-media conversion (to be referred to as user conversion setups hereinafter), information of servers that implement inter-media conversion, data sent via mail, and the like (to be referred to as a net database hereinafter).

Figure 1:
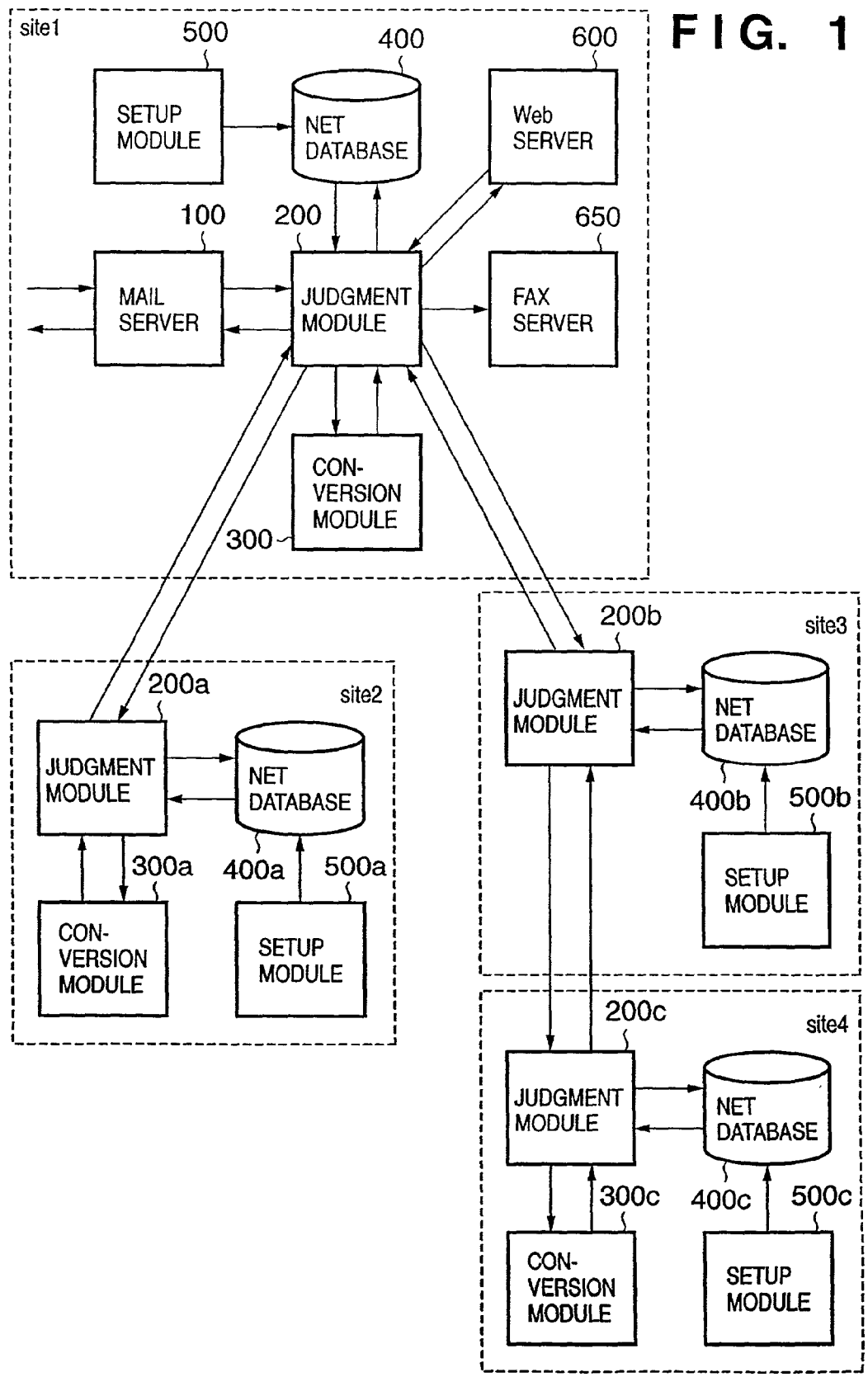
FIG. 1 is a schematic block diagram showing the arrangement of a service system according to an embodiment of the present invention.

FIG. 1 is a schematic diagram for explaining the arrangement of the service according to this embodiment. As shown in FIG. 1, the service according to this embodiment is constituted by four different sites, i.e., site1, site2, site3, and site4. FIG. 1 shows four sites for the sake of easy understanding, but the number of sites is not limited to four. As other site arrangements, for example, the following configurations are available:

(1) a configuration formed of one or a plurality of site1;

(2) a configuration formed of one or a plurality of site1 and one or a plurality of site2;

(3) a configuration formed of one or a plurality of site1, one or a plurality of site3, and one or a plurality of site4;

(4) a configuration formed of one or a plurality of site1, one or a plurality of site2, one or a plurality of site3, and one or a plurality of site4; and (5) a configuration in which site1 does not have any conversion module in each of configurations (2) to (4).

In FIG. 1, site1, site2, site3, and site4 assume minimum required arrangements which provide functions to be described later. Such assumption is also made for the sake of easy understanding in the following detailed description of site1, site2, site3, and site4, but does not deny the presence of a single site including site1 and site3 (and other combinations), and a site having both functions of site1 and site3 (and combinations of other functions). In the following description, site1 will be referred to as a net mail service site, site2 and site4 will be referred to as conversion service sites, and site3 will be referred to as a directory service site.

Note that site2 and site4 are conversion service sites having similar functions. Although site2 and site4 are conversion service sites having similar functions, FIG. 1 illustrates direct communication relationships only between site1 and site3, and between site3 and site4. Such assumption is also made for the sake of easy understanding, and direct communication relationships may be established between site2 and site3, and between site1 and site4.

Figure 2:
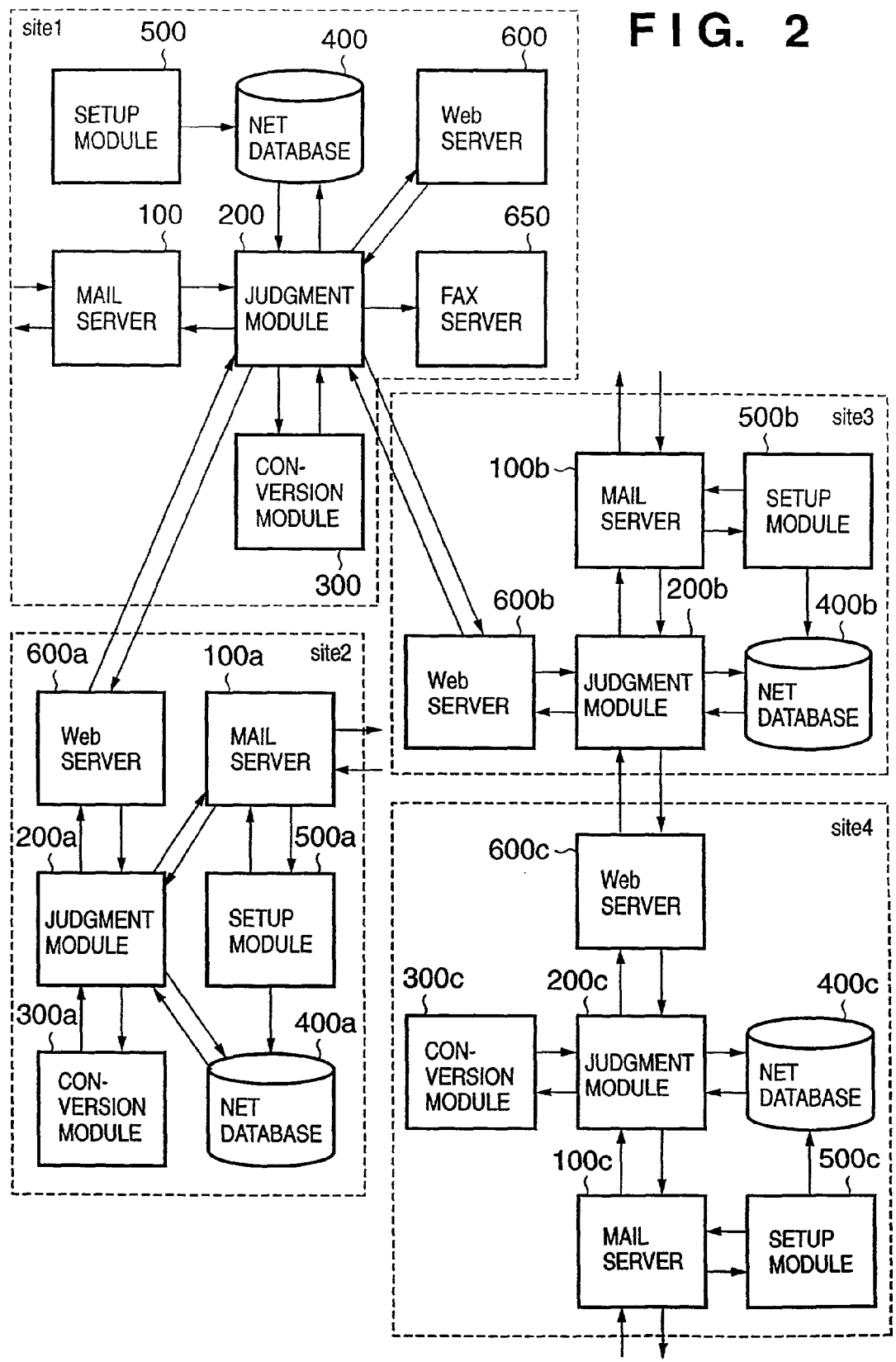
FIG. 2 is a schematic block diagram showing the arrangement of a service system according to an embodiment of the present invention.

FIG. 2 also illustrates communication methods of site1, site2, site3, and site4 of this embodiment, which are not shown in FIG. 1. In this embodiment, as shown in FIG. 2, communications using CGI on Web servers 600, 600a, 600b, and 600c are made using HTTP, and communications are made via mail servers using SMTP among judgment modules 200, 200a, 200b, and 200c. However, the present invention is not limited to such specific protocols, and dedicated protocols or versatile protocols other than HTTP and SMTP may be used. That is, communications using dedicated protocols or versatile protocols other than HTTP and SMTP can be made, and if inter-site communication means are present independently, Web servers and mail servers in site2, site3, and site4 are not indispensable. The following explanation will be given using FIG. 2, and the same applies to FIG. 1 except for paragraphs that explain communication methods among judgment modules.

Referring to FIG. 2, reference numeral 100 (100a, 100b, 100c) denotes a mail server; 200 (200a, 200b, 200c), a judgment module; 300 (300a, 300c), a conversion module; 500 (500a, 500b, 500c), a setup module; and 400 (400a, 400b, 400c), a net database. In FIG. 2, only one conversion module 300 (300a, 300c) is illustrated in each site, but a plurality of conversion modules may be present in each site, as will be described later. As described above, since site1, site3, site3, and site4 assume minimum required functions, some functions of the judgment modules 200, 200a, 200b, and 200c are different.

In the above arrangement, a mail message received by the mail server 100 is split by the judgment module 200 in correspondence with formats, and each data is passed to and converted by the appropriate conversion module 300, the conversion module 300a of site2, or the conversion module 300c of site4 selected at site3 in accordance with user conversion setups. The judgment module 200 of site1 receives converted data and generates a document that matches each output destination medium using the converted data, and the generated document is sent to each medium such as a user's Web browser, portable terminal, or facsimile device via a Web server 600, the mail server 100, or a FAX server 650 and is displayed or output. The contents of the user conversion setups used in the judgment process in the judgment module 200 are generated and changed by the setup module 500. Individual modules will be described in detail below.

In this embodiment, in order to provide flexible services to the user, the setup module 500 allows user's setups. However, if uniform services are to be provided to all users, identical conversion setups need only be used, and the setup module can be omitted in such case. That is, the setup module is an option, and is not indispensable.

The mail server 100 is a module for exchanging mail messages, and may or may not run on a server on which the judgment module 200 is running. Also, a mail reception function maybe either a function of directly receiving SMTP mail messages, or a function of periodically accessing an independent mail server using an arbitrary protocol such as POP3 or the like to acquire mail messages. That is, upon application to this embodiment, the mail server is required to have means for passing received data to another program module, and to issue a mail message to a medium (another mail server, a portable medium having a mail function, or the like) that expresses the conversion result.

The judgment module 200 splits a mail message received by the mail server 100 or a mail message stored in the net database 400 into data for respective formats contained in that mail message. In order to convert each individual part obtained by splitting into a format which matches a medium of user's choice, an appropriate conversion module is selected. If the conversion module 300 in site1 is an appropriate one, a conversion instruction is issued to the conversion module 300. If it is determined based on information in the net database in site1 that the conversion module 300a in site2 is appropriate, a conversion instruction is issued from the judgment module 200 to the conversion module 300a via the judgment module 200a.

Furthermore, if an appropriate conversion module and its site cannot be determined, an appropriate conversion module is judged using the judgment module 200b of the directory service site (site3). If a conversion module in a conversion service site selected as a result of checking in that directory service site is the conversion module 300c in site4, conversion is made by the conversion module 300c.

Note that an appropriate format after conversion is determined by looking up a user conversion setup table (to be described later) stored in the net database 400 of a conversion request source site (site1). A document for a medium of user's choice is generated using data returned from the conversion module 300, 300a, or 300c.

The judgment module 200b in site3 selects a conversion module appropriate for the conversion instruction from the judgment module 200 from a conversion module table in the net database 400b (to be described later), and sends a conversion instruction to an appropriate judgment module (e.g., judgment module 200c in site4) in the conversion service site where the appropriate conversion module is present. If no appropriate conversion module is present in the conversion module table, a message indicating that no appropriate conversion is available is sent to the judgment module 200.

The judgment module 200a in site2 selects the conversion module 300a appropriate for the conversion instruction from the judgment module 200, and returns the conversion result to the judgment module 200. Likewise, the judgment module 200c in site4 selects the conversion module 300c appropriate for the conversion instruction from the judgment module 200, and returns the conversion result to the judgment module 200.

The conversion modules 300, 300a, 300b are filters each for converting a specific format into another specific format. As the simplest example, a module for converting a TIFF format as an image format into a JPEG format as another image format may be used. Since such module converts between specific formats, there are a plurality of conversion modules in correspondence with format conversions that the judgment module 200 can process. Note that FIG. 1 illustrates the conversion modules 300, 300a, and 300c, but two or more conversion modules can be present in a single site.

The setup module 500 is a mechanism for accepting user registration, user conversion setups, setups associated with conversion modules, and the like, and storing these setup contents in the net database 400. Likewise, the setup modules 500a, 500b, and 500c are mechanisms for accepting setups associated with conversion modules and the like, and storing them in the net databases 400a, 400b, and 400c, respectively. In this embodiment, the setup modules are launched from the Web servers 600, 600a, 600b, and 600c via CGI or the mail servers 100, 100a, 100b, and 100c via mail messages, but this does not mean that setups using a dedicated terminal, phone or the like are not available. That is, setups and their changes can be made using a dedicated terminal, voice guidance via phone, or the like.

The net databases 400, 400a, 400b, and 400c store user registration contents, user conversion setups, accounting information, information of other sites associated with conversion, mail data, and the like.

The Web server 600 and FAX server 650 are respectively connected to media (a computer having a Web browser, a portable terminal having a Web browser, a facsimile device, and the like) to which a document generated using converted data is output. In this embodiment, the Web server 600 is used to access the setup module 500. In this case, the Web server 600 and setup module 500 may be physically present in a single server or different servers.

Data to be forwarded to a facsimile device that outputs a document is sent via the FAX server 650. Alternatively, a document may be sent by directly calling the facsimile device.

In order to immediately inform the user that a mail message has arrived and undergone data conversion, a mail conversion result indicating that information has been uploaded onto the Web server 600, that FAX data has been sent and its destination, or the like can be sent to the portable terminal via the mail server 100.

In this embodiment, the mail server 100, Web server 600, and FAX server 650 are selected as information service means to media that express the conversion result, but implementation of other media is not limited. For example, if a conversion module for converting text into audio data is available, a voice telephone may be selected as a medium that expresses the conversion result. Also, a user's portable terminal or facsimile device need not be a dedicated one.

As examples of services realized by the aforementioned system, this embodiment will mainly explain the following services.

(1) User registration: This service registers the ID and password used in user authentication, information required for accounting, personal information, and the like.

(2) Registration/change of user conversion setups: This service registers or changes the setups of a forwarding destination and conversion used upon providing an automatic mail conversion service.

(3) Data display on Web: This service displays converted mail information on a Web.

(4) Data display on Web compatible to portable terminal: This service displays mail information converted for a Web browser on a portable terminal.

(5) Data display on portable terminal: This service displays converted mail information on a portable terminal.

(6) Data display via FAX: This service outputs converted mail information using FAX.

(7) Registration of other sites associated with conversion service: This service registers information of other sites used in the conversion service.

(8) Site registration content verification service: This service verifies if information of other sites registered in the net database is correct.

(9) Automatic mail conversion service: This service automatically converts the contents of a mail message into a format suitable for another medium in accordance with setups.

(10) Interactive mail conversion service: This service converts the contents of a mail message into a format suitable for another medium interactively with the user.

The aforementioned services will be described in detail later. Note that the services and functions in this embodiment are not limited to such specific ones.

<Arrangement of Mail Server>

Figure 3:
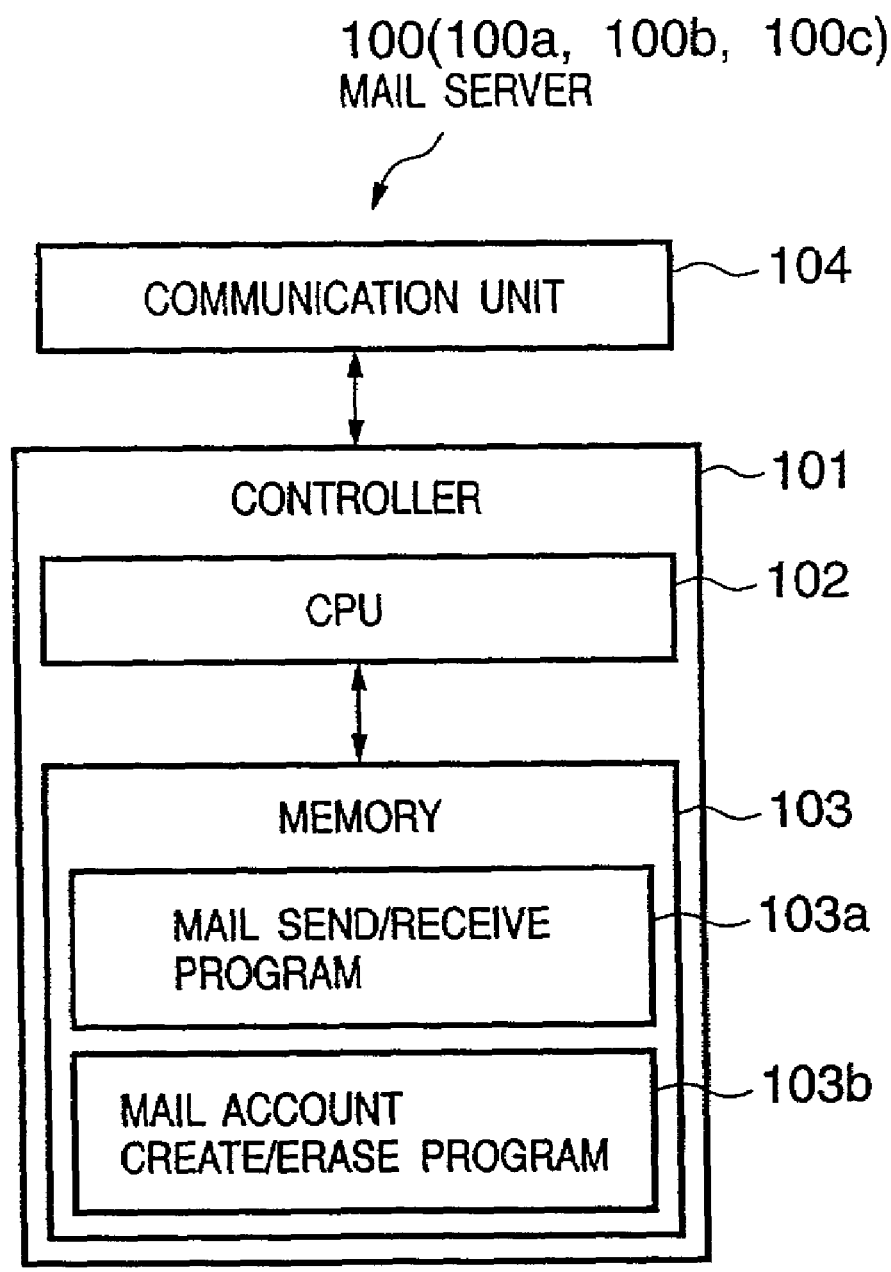
FIG. 3 is a schematic block diagram showing the arrangement of a mail server.

FIG. 3 is a schematic block diagram showing the arrangement of the mail server 100 (100a, 100b, 100c). Reference numeral 101 denotes a controller which comprises a CPU 102 and memory 103. The CPU 102 implements mail send/receive control, and creation and erasure of mail accounts by executing a mail send/receive program 103a and mail account create/erase program 103b stored in the memory 103. Reference numeral 104 denotes a communication unit, which is used to exchange mail data via a line, to store a received mail message in the net database 400, and to read out data from the net database 400 upon sending a mail message.

<Arrangement of Judgment Module>

Figure 4:
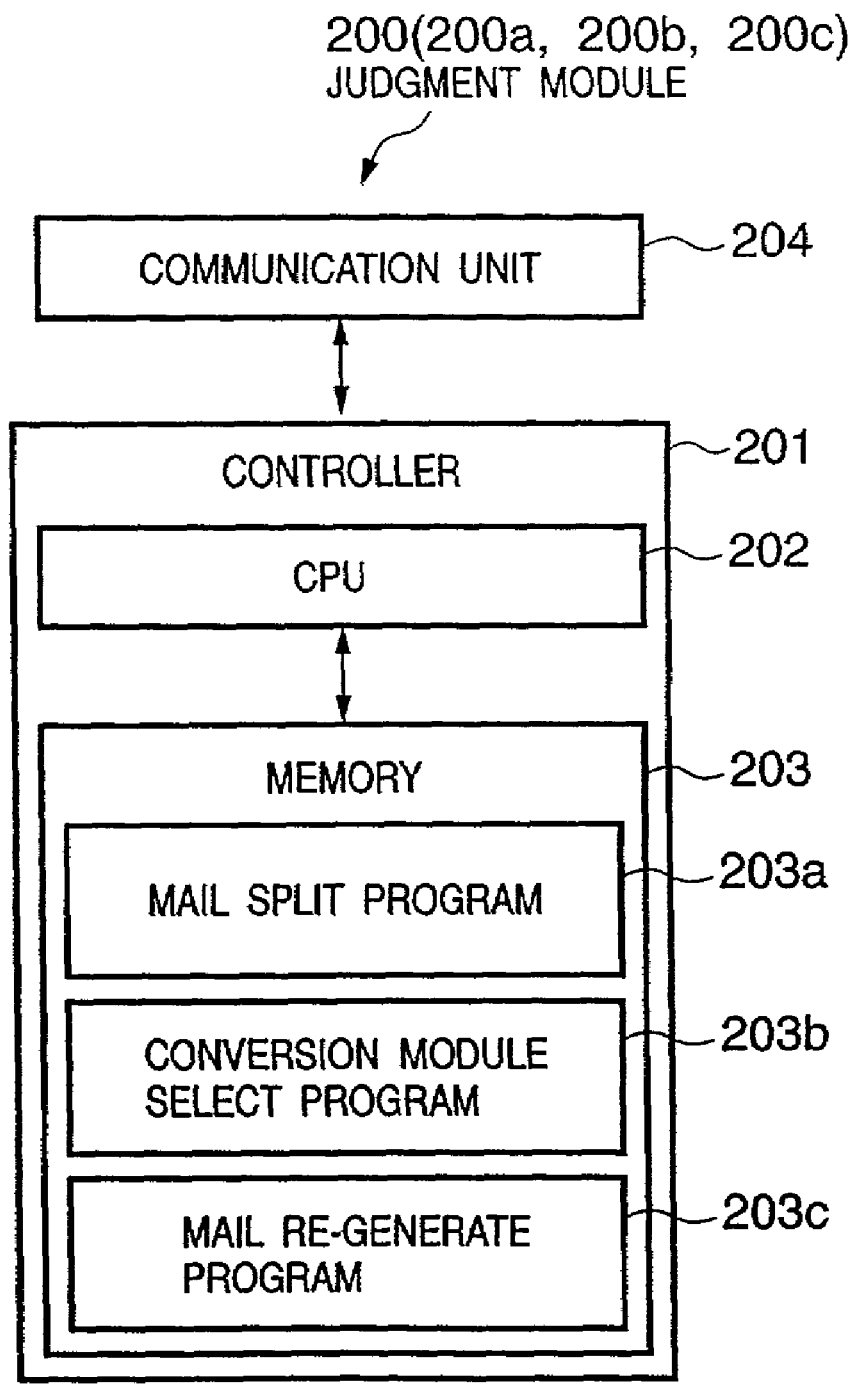
FIG. 4 is a schematic block diagram showing the arrangement of a judgment module.

FIG. 4 is a schematic block diagram showing the arrangement of the judgment module 200 (200a, 200b, 200c) Reference numeral 201 denotes a controller which comprises a CPU 202 and memory 203. The CPU 202 implements a judgment process associated with data conversion by executing a mail split program 203a, conversion module select program 203b, and mail re-generate program 203c stored in the memory 203. Reference numeral 204 denotes a communication unit which is used to exchange data with other modules and other sites, and to access the net database 400 (400a, 400b, 400c) when received mail messages stored in the net database 400 are read out, when processed data are added to the net database 400 (400a, 400b, 400c), when the contents of user conversion setups, information associated with conversion modules, and the like are stored in the net database 400 (400a, 400b, 400c), and so forth. In this embodiment, the judgment module 200 (200a, 200b, 200c) executes an access mediation process between other modules and other servers, and the net database 400 (400a, 400b, 400c). However, such access may be made without the intervention of the judgment module 200 (200a, 200b, 200c).

<Arrangement of Conversion Module>

Figure 5:
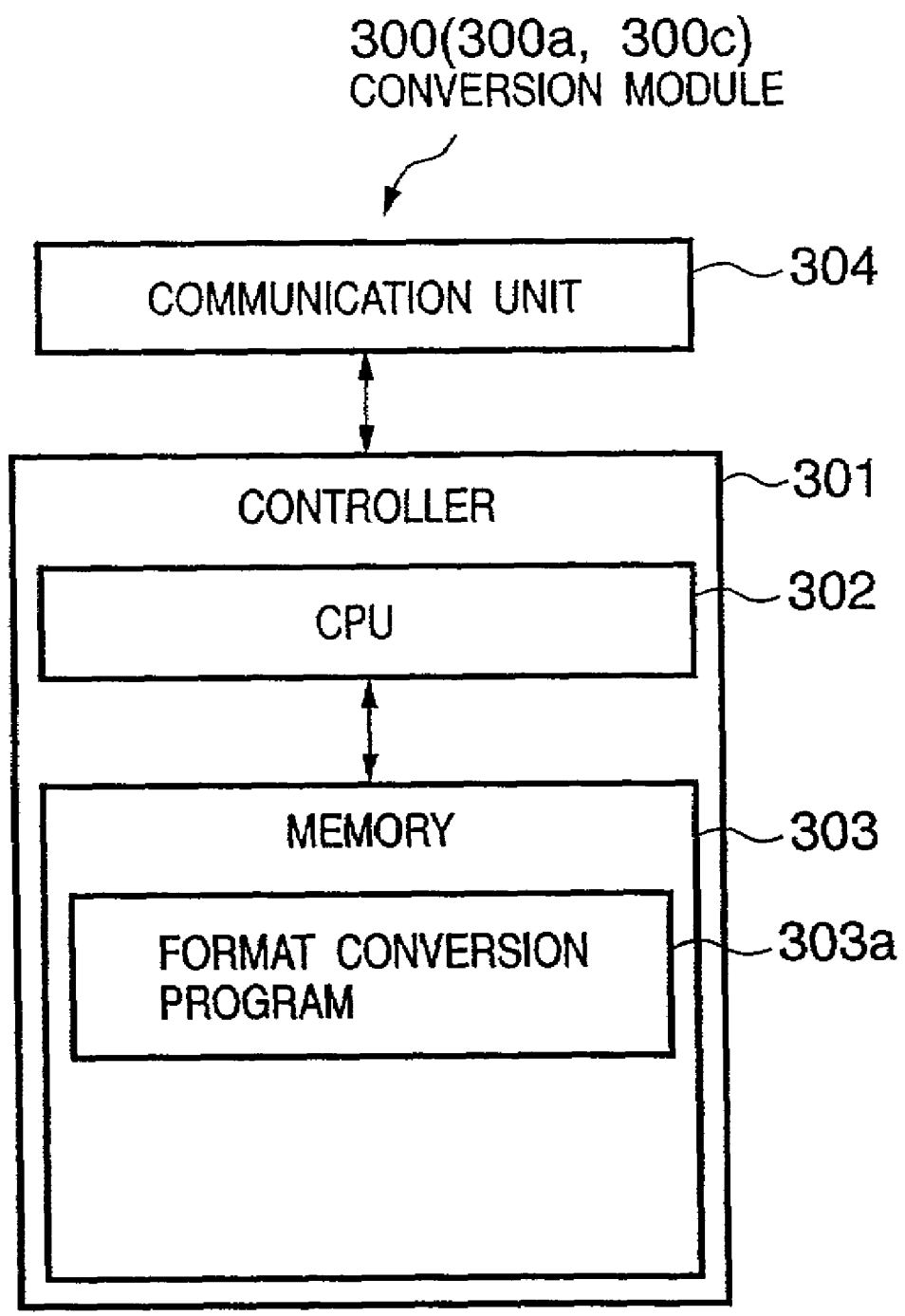
FIG. 5 is a schematic block diagram showing the arrangement of a conversion module.

FIG. 5 is a schematic block diagram showing the arrangement of the conversion module 300 (300a, 300c). Reference numeral 301 denotes a controller, which comprises a CPU 302 and memory 303. The CPU 302 converts the format of provided data by executing a format conversion program 303a stored in the memory 303. Reference numeral 304 denotes a communication unit, which is used to exchange data with other modules, and to access data on the net database 400 (400a, 400b, 400c) when data before conversion is acquired from the net database 400 (400a, 400b, 400c) and when data after conversion is stored in the net database 400 (400a, 400b, 400c).

<Arrangement of Setup Module>

Figure 6:
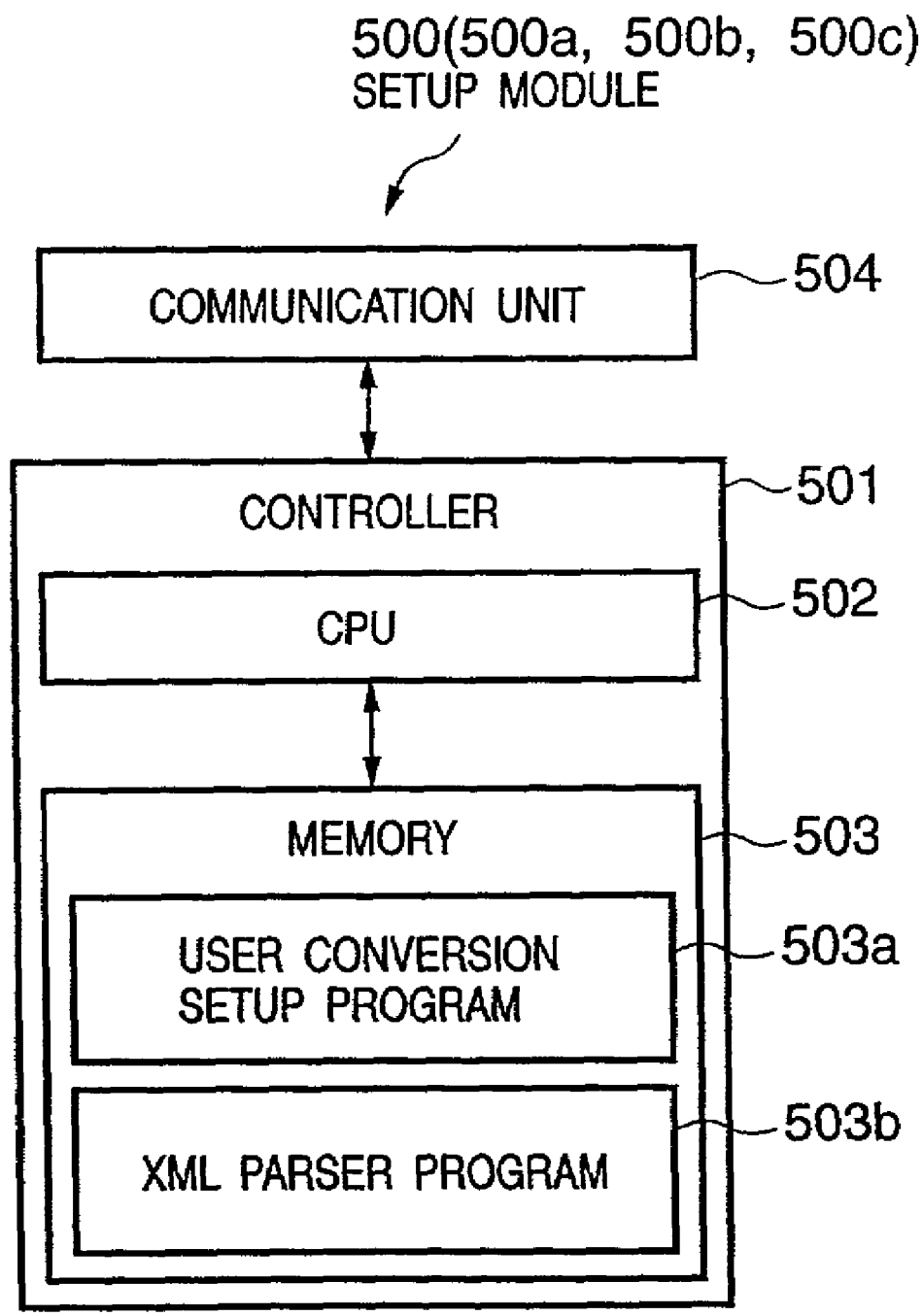
FIG. 6 is a schematic block diagram showing the arrangement of a setup module.

FIG. 6 is a schematic block diagram showing the arrangement of the setup module 500 (500a, 500b, 500c). Reference numeral 501 denotes a controller, which comprises a CPU 502 and memory 503. The CPU 502 implements setting and change processes of user conversion setups by executing a user conversion setup program 503a and XML parser program 503b stored in the memory 503. Reference numeral 504 denotes a communication unit which is used to receive designations of setup contents by interacting with the user via a line, to communicate with other modules, and to access data on the net database 400 (400a, 400b, 400c) upon storing the contents of user conversion setups, information associated with conversion modules, and the like in the net database 400 (400a, 400b, 400c).

<Arrangement of Net Database>

Figure 7:
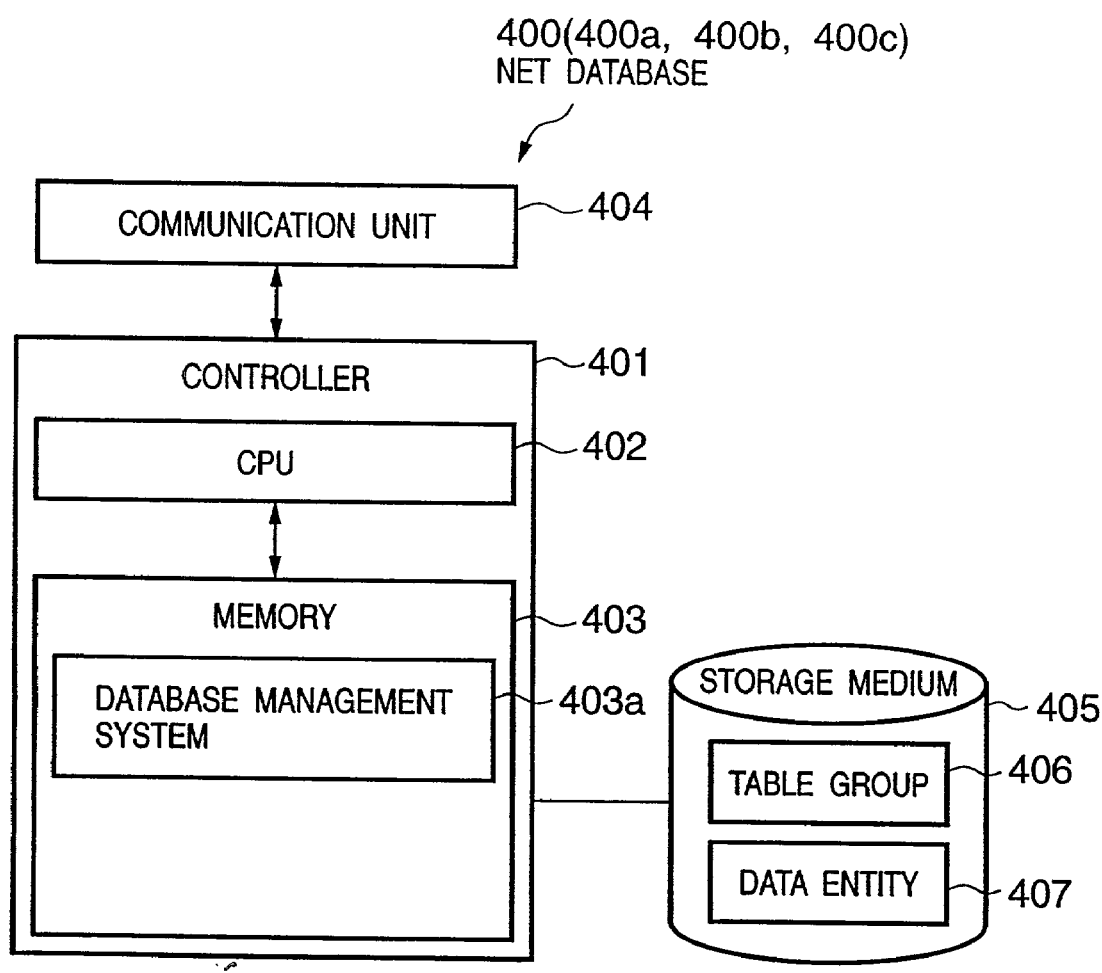
FIG. 7 is a schematic block diagram showing the arrangement of a net database.

FIG. 7 is a schematic block diagram showing the arrangement of the net database 400 (400a, 400b, 400c). Reference numeral 401 denotes a controller, which comprises a CPU 402 and memory 403. The CPU 402 manages data stored in a storage medium 405 by executing a database management system 403a stored in the memory 403. Reference numeral 404 denotes a communication unit, which is used to exchange data with other modules via a line. The storage medium 405 stores and saves data to be managed by the database management system 403a. The data to be stored include a table group 406 such as user information and the like, a data entity 407 of mail data and the like, and so forth.

The table group 406 includes a user information table 406a (FIG. 8), user home information table 406b (FIG. 9), user office information table 406c (FIG. 10), user portable terminal information table 406d (FIG. 11), user conversion setup table 406e (FIG. 12), conversion module table 406f (FIG. 13), service company table 406g (FIG. 14), service site table 406h (FIG. 15), use directory service table 406i (FIG. 16), and portable terminal performance table 406j (FIG. 17). The respective tables will be described below. In this embodiment, since the functions of sites are limited, unnecessary tables may be present in site1, site2, site3, and site4. The net mail service site (site1) has all tables, i.e., the user information table 406a, user home information table 406b, user office information table 406c, user portable terminal information table 406d, user conversion setup table 406e, conversion module table 406f, service company table 406g, service site table 406h, use directory service table 406i, and portable terminal performance table 406j. On the other hand, the conversion service site (site2, site4) or the directory service site (site3) has the conversion module table 406f, service company table 406g, and service site table 406h.

Figure 8:
FIG. 8 shows an example of the data configuration of a user information table.

FIG. 8 shows an example of the data configuration of the user information table. The user information table 406a is generated and recorded when the user makes user registration, and stores the user ID and password used in user authentication, and credit card information, accounting record, and the like used in user accounting.

Note that the user ID is also used as a mail account generated in the mail server in the net mail service of this embodiment. For example, if the user ID is aaa and the domain of the net mail service site is hoge.ne.jp, a mail address assigned to the user in the mail server is aaa@hoge.ne.jp.

Figure 9:
FIG. 9 shows an example of the data configuration of a user home information table.

FIG. 9 shows an example of the data configuration of the user home information table. The user home information table 406b is generated and recorded when the user makes user registration or when he or she uses net mail services. The user home information table 406b stores the user's home telephone number and address, and the IDs of display/output media (e.g., home FAX number, home mail address) used in the home. Note that the user ID is the same as that registered in the user information table shown in FIG. 8.

Figure 10:
FIG. 10 shows an example of the data configuration of a user office information table.

FIG. 10 shows an example of the data configuration of the user office information table. The user office information table 406c is generated and recorded when the user makes user registration or when he or she uses net mail services. The user office information table 406c stores the address of an office of the user (office telephone number, office address, and the like), and the IDs of display/output media (e.g., office FAX number, office mail address) used in that office. Note that the user ID is the same as that registered in the user information table shown in FIG. 8.

Figure 11:
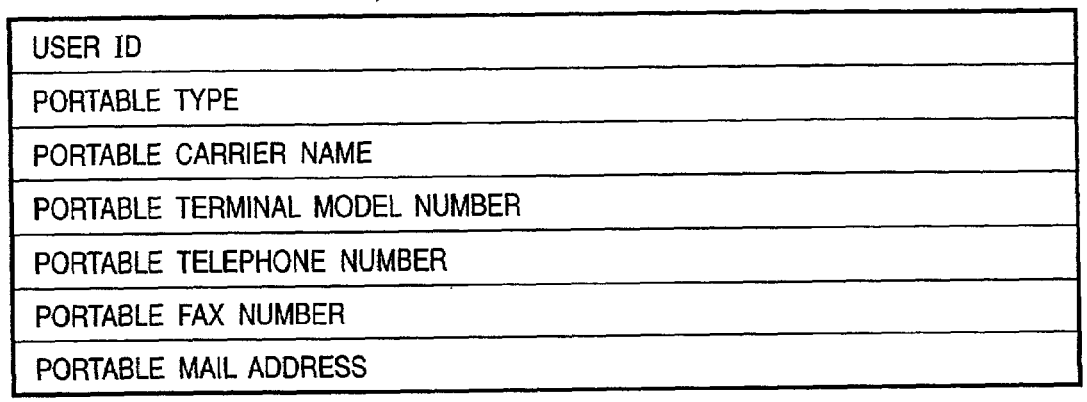
FIG. 11 shows an example of the data configuration of a user portable terminal information table.

FIG. 11 shows an example of the data configuration of the user portable terminal information table. The user portable terminal information table is generated and recorded when the user makes user registration or when he or she uses net mail services, and stores information associated with a user's portable terminal, as shown in FIG. 11. Note that the user ID is the same as that registered in the user information table shown in FIG. 8.

FIG. 12 shows an example of the data configuration of the user conversion setup table. In this embodiment, setups as to whether to make display or output on respective media via the mail server 100, Web server 600, and FAX server 650 are made using the user conversion setup table 406e. The user conversion setup table 406e is used to make setup so that appropriate information can be delivered to an appropriate device when the user uses an automatic conversion service. Note that the user ID is the same as that registered in the user information table shown in FIG. 8.

The user can select display (output) on respective media via the mail server 100, Web server 600, and FAX server 650 using the setup module 500, and can also select the display (output) forms of an attached document for respective output destinations. When the contents are displayed or output via the Web server 600 or FAX server 650, a message indicating that such display/output process is done can be sent to the portable terminal via the mail server 100.

For example, assume that a mail message attached with an image file is received while selecting display on a Web. Normally, the image formats that a Web browser supports are limited to JPEG, GIF, and the like. In such case, in order to review an attached image with another format, the user must prepare image display software compatible to that format. However, if the user selects (function of converting image format other than JPEG and GIF to JPEG upon displaying attached image on Web=ON) in the user conversion setup table 406e, the format of the image file is automatically converted into JPEG, and that image can be displayed on a Web browser. Then, a part such as mail body text or the like, which can be browsed even on a portable terminal, and a message indicating that the image is uploaded to the Web server 600, are sent to the portable terminal via the mail server 100. The above sequence is similarly done for a wordprocessor document. Note that conversion of image formats and wordprocessor documents is supported only when conversion modules which are used to convert such image formats and wordprocessor documents are available, and not all formats are converted. However, if a format is open to the public, a conversion service of that format can be provided by implementing a conversion module corresponding to that format.

In case of a format which is not open to the public, a conversion module used to convert that format is available only when a given fee is paid. Hence, whether or not use of a pay conversion module is permitted can be selected (such setup can be made by selecting [use pay conversion in Web display], [use pay conversion in display on portable terminal], and [use pay conversion in display on FAX] in the user conversion setup table 406e). If a plurality of conversion modules with an identical function are present, a criterion (price, compatibility level, stability) used upon selecting a conversion module in such case can be set. Since these setups are allowed, the user can avoid wasteful expense, and can use a conversion module with stable quality.

Note that the user need not always select only one of the mail server 100, Web server 600, and FAX server 650 as a display/output destination, and the contents of one mail message can be displayed or output to a plurality of or all media. The display or output contents on these plurality of media need not always be identical. For example, mail body text and the summary of an attached wordprocessor document can be sent to a portable terminal, and full wordprocessor document text can be output using FAX via the FAX server 650.

The functions of the user conversion setup table have been explained. Since mail data is saved in the data entity 407, conversion can also be made interactively with the user, as will be described later. In this case as well, the user conversion setup table 406e is used. When setups for interactive conversion are stored in the user conversion setup table 406e, a [temporary flag] is set "True" ("False" in case of automatic conversion). For example, when a wordprocessor document can only be browsed using a pay conversion module, a message indicating only arrival of a wordprocessor document is sent to a portable terminal via the mail server 100. Upon receiving this message, the user accesses the Web server 600 to select that mail message, and designates a conversion method of the mail message. The designation result is stored in the user conversion setup table 406e, and the [temporary flag] in the table is set "True" accordingly. The judgment module 200 sends a part to be converted of the mail message to an appropriate conversion module 300 by looking up the user conversion setup table 406e, receives the conversion result from the conversion module, and generates a document compatible to the output destination, thus allowing the user to browse the mail contents.

Figure 13:
FIG. 13 shows an example of the data configuration of a conversion module table.

FIG. 13 shows an example of the data configuration of the conversion module table. The conversion module table 406f is used to describe characteristics of conversion modules (300, 300a, 300c). The judgment modules 200, 200a, 200b, and 200c can select conversion modules with appropriate input and output formats by looking up this conversion module table 406f. Normally, the input and output formats are determined based on MIME and extension. However, some output formats like "summary of wordprocessor document" in FIG. 12 cannot be determined using only MIME and extension, and "output format (unique)" is added to determine such formats.

As has been described in FIG. 12, since pay conversion modules are present, an item ([price]) indicating a conversion price required per page is prepared. In this embodiment, the conversion price is calculated per page, but the price may be determined using other criterion such as the data size and the like.

Furthermore, since items that store the use count and success count ([use count], [success count]) are prepared to recognize the stability of each conversion module, the stability of conversion can be recognized by dividing the success count by the use count. In case of an application file or the like, since it is often impossible to convert all functions, an item ([compatibility level]) is prepared to indicate a limit of reproducibility. Items [compatibility level], [price], [use count], and [success count] are used as criteria when the judgment module selects a conversion module.

Figure 14:
FIG. 14 shows an example of the data configuration of a service company table.

FIG. 14 shows an example of the data configuration of the service company table. The service company table 406g is used to describe basic information of a company that manages one or a plurality of the conversion service site, net mail service site, and directory service site. Since use of the conversion service site or directory service site may often require accounting, an item [scheduled payment record] is prepared to describe a payment payable to a company that manages the conversion service site or directory service site, or a charge against a company that manages the conversion service site or directory service site. Every time the conversion service site or directory service site is used, [price] in the conversion module table 407f or an amount reported from the directory service site (to be described later) is added to or subtracted from the scheduled payment record. Note that addition is made when a service incurs a payment payable to a company that manages the conversion service site or directory service site, and subtraction is made when a service incurs a charge against a company that manages the conversion service site or directory service site.

Figure 15:
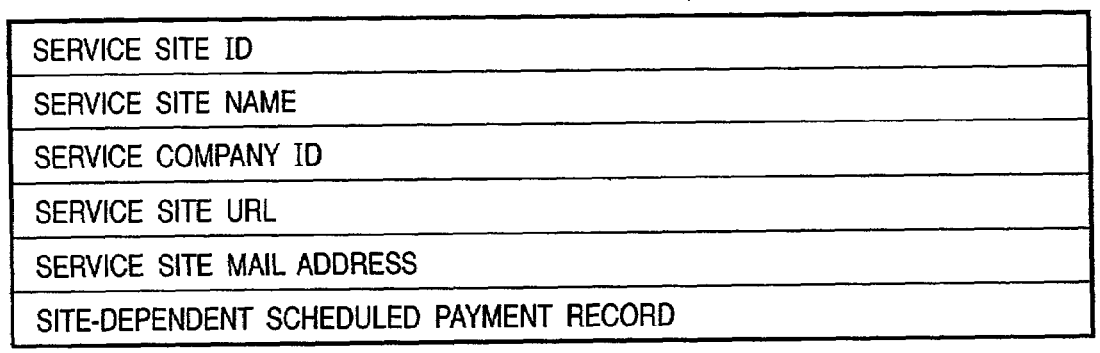
FIG. 15 shows an example of the data configuration of a service site table.

FIG. 15 shows an example of the data configuration of the service site table. The service site table 406h is used to describe basic information of one of the conversion service site, net mail service site, and directory service site. Since use of the conversion service site or directory service site may often require accounting, an item [site-dependent scheduled payment record] is prepared to describe a payment payable to a company that manages the conversion service site or directory service site, or a charge against a company that manages the conversion service site or directory service site. Every time the conversion service site or directory service site is used, [price] in the conversion module table 407f or an amount reported from the directory service site (to be described later) is added to or subtracted from the [site-dependent scheduled payment record]. Note that addition is made when a service incurs a payment payable to a company that manages the conversion service site or directory service site, and subtraction is made when a service incurs a charge against a company that manages the conversion service site or directory service site.

FIG. 16 shows an example of the data configuration of the use directory service table. The use directory service table 406i is used to describe a directory service site to be used and priority. When the judgment module of a given site fails to determine a conversion module that can implement desired conversion using the conversion module table 406f, a conversion module is searched for using the directory service, which is designated by looking up this use directory service table 406i. [Priority] designates the order in which directory service sites are used. The directory service site with priority=1 is searched for a desired conversion module. If the conversion module is found, that module is used. If no desired conversion module is found in the directory service site with priority=1, the directory service site with priority=2 is searched. In this way, the directory service sites are searched in the registered priority order.

As described above, since this embodiment assumes minimum required functions of site1, site2, site3, and site4, the use directory service table 406i can be stored in only the net mail service site (site1).

FIG. 17 shows an example of the data configuration of the portable terminal performance table. The portable terminal performance table 406j is used to describe the characteristics of a portable terminal. Since the image size that can be displayed largely differs depending on portable terminals, if an image is required to be displayed on the portable terminal, the portable terminal type, portable terminal carrier name, and portable terminal model number registered in the user portable terminal information table 406d are acquired, and the image display performance of the portable terminal specified by these kinds of information can be checked by looking up the portable terminal performance table 406j. In this way, an image can be generated in correspondence with the portable terminal. Likewise, since the maximum number of displayable characters largely differs depending on portable terminals, if a mail message is to be sent to a portable terminal, the maximum number of displayable characters of the portable terminal specified by the portable terminal type, portable terminal carrier name, and portable terminal model number is checked, thus allowing generation of a mail message in correspondence with the portable terminal as a mail destination.

In the above description, respective modules in the site are present on physically different machines, but a plurality of modules may be present on a single machine. That is, the mail server 100, judgment module 200, conversion module 300, setup module 500, and net database 400 in case of site1, the mail server 100a, judgment module 200a, conversion module 300a, setup module 500a, and net database 400a in case of site2, the mail server 100b, judgment module 200b, setup module 500b, and net database 400b in case of site3, and the mail server 100c, judgment module 200c, conversion module 300c, setup module 500c, and net database 400c in case of site4 may be respectively present on identical machines. That is, a common CPU may be used as the CPUs 102, 202, 302, 402, and 502. In this case, the mail server 100 (100a, 100b, 100c), judgment module 200 (200a, 200b, 200c), conversion module 300 (300a, 300c), and setup module 500 (500a, 500b, 500c) directly access the storage medium 405 without the intervention of the communication units 104, 204, 304, 404, and 504.

<Outline of System Operation>

Figure 18:
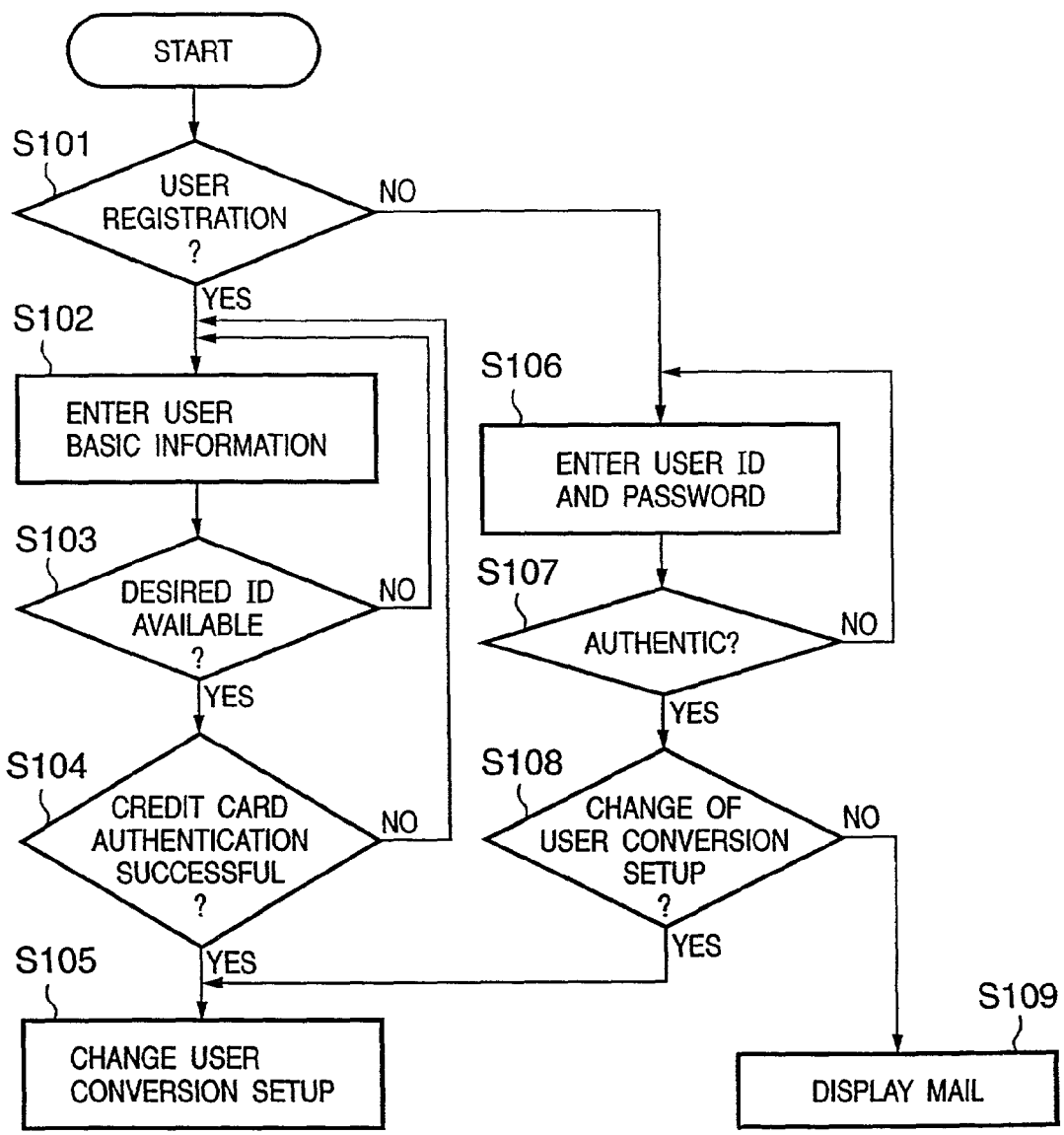
FIG. 18 is a flow chart showing the sequence for user registration and user conversion setup registration.

In order to receive a net mail service, user registration is required in advance. Also, in order to use an automatic conversion service, user conversion setups must be registered. As described above, in this embodiment, user registration, and registration of user conversion setups are made via the Web server 600. FIG. 18 shows the sequence of user registration, and registration of user conversion setups.

It is checked in step S101 if user registration is to be made. If user registration is not complete yet, the flow advances from step S101 to S102 to proceed with user registration. In step S102, user's basic information, and information required for accounting of the user are registered. Whether or not a desired user ID can be used is checked and a credit card is authenticated in steps S103 and S104. If no problems are found, the control prompts the user to enter additional information that pertains to a portable terminal, FAX, telephone, and the like used to convert and forward a mail message, and to select service contents (step S105).

If it is determined in step S103 that the desired user ID has already been used by another user, and cannot be used, or if the credit card cannot be authenticated in step S104, the flow returns to step S102 to prompt the user to correct basic information.

On the other hand, if user registration is already complete, since user registration is not required, the flow advances from step S101 to step S106 to prompt the user to input the user ID and password. If the user is authenticated by the input ID and password (step S107), the control prompts the user (step S108) to select if he or she wants to change user conversion setups (step S105) or to display mail messages on a Web (step S109). If the user wants to change user conversion setups, the control prompts the user to enter additional information that pertains to a portable terminal, FAX, telephone, and the like used to convert and forward a mail message, and to select service contents (step S105). If the user selects to display mail messages on a Web, mail messages which are converted to the Web format in accordance with the registered setups are displayed (step S109).

<User Registration>

Figure 19:
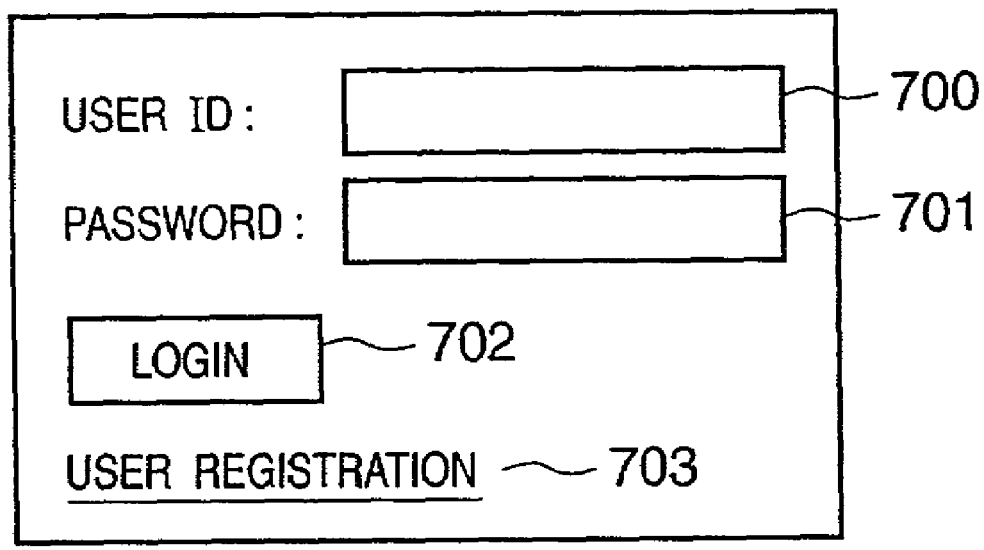
FIG. 19 shows an example of a cover page in a Web server of a net mail service of this embodiment.

FIG. 19 shows a login window in the Web server of the net mail service of this embodiment. The user who has already acquired his or her user ID enters that user ID in a user ID input field (or area) 700 and a password in a password input field 701, and then clicks a login button 702. Then, a window shown in FIG. 20 is displayed via user authentication (S101, S106, S107). When the user has clicked a "change setup" button 711 on this window, a window used to register/change user conversion setups (to be described later) is displayed (S108, S105). On the other hand, when the user has clicked a "display mail contents" button 710, a data display window on a Web (to be described later) is displayed (S108, S109).

On the other hand, when the user has clicked a user registration button 703 in FIG. 19, a window in FIG. 21, i.e., a window used to make user registration is displayed (S101, S102). The user fills all items of input fields 720 to 732, and presses (clicks) an OK button 733. If the ID that the user wants to use can be used, and the credit card authentication is successful, a window shown in FIG. 22 is displayed to allow the user to make user conversion setups (S103, S104, S105). Note that data are stored in the user information table 406a and user home information table 406b on the basis of the information input on the window in FIG. 21.

When the user has clicked a "forward FAX/mail to home" button 740 on the window in FIG. 22, an input window shown in FIG. 23 is displayed. The window in FIG. 23 is used to enter information of media in the home, and the user enters a FAX number and mail address in input fields 750 and 751 as needed. Based on this information, the user home information table 406b is formed.

When the user has clicked a "forward FAX/mail to office" button 741 in FIG. 22, an input window in FIG. 24 is displayed. The window in FIG. 24 is used to enter information of media in the office, and the user enters office information in input fields 760 to 766 as needed. Based on information input on this input window in FIG. 24, the user office information table 406c is generated.

When the user has clicked a "forward FAX/mail to portable terminal" button 742 in FIG. 22, a window in FIG. 25 is displayed. The window in FIG. 25 is used to enter information of a portable terminal, and the user selects or enters information of the portable terminal in input fields 770 to 775 as needed. For example, the user can select the type of portable terminal such as a portable phone, pager, or the like from a pull-down menu in the area 770, and can also select a carrier name from a pull-down menu in the area 771. The user enters the model number of the portable terminal in the field 772. The user enters a mail address assigned to the portable terminal in the field 775 if it is available. Based on such information, the user portable terminal information table 406d is generated.

Note that the user must fill all items in FIG. 21 to identify a person, but he or she can enter information of items in FIGS. 23, 24, and 25 as needed, since such information is required to provide a service.

<Registration/Change of User Conversion Setups>

When the user has clicked the "change setup" button 711 in FIG. 20, a window in FIG. 26 which is used to register/change user conversion setups is displayed (S108, S105). When the user has clicked a "change use medium" button 790 on this window, the aforementioned window in FIG. 22 is displayed. Since the actions made upon clicking the buttons 740 to 742 in FIG. 22 have already been explained, a description thereof will be omitted.

On the other hand, when the user has clicked a "change use service" button 791 in FIG. 26, a window in FIG. 27 is displayed. The window in FIG. 27 is used by the user to set desired services, and the user can set items 800 to 822 as needed. Based on the contents set using the window in FIG. 27, the user conversion setup table 406e is formed.

Check boxes 803, 808, 814, and 820 are items used to set whether or not the user permits use of a pay conversion module in automatic conversion. Check boxes 804, 809, and 821 are items used to set whether or not a mail message is sent when a Web page is uploaded to the Web server 600 or a FAX document is sent via the FAX server 650.

A pull-down menu 818 is used to designate a FAX forward destination when use of a forwarding service to FAX is selected by checking one of check boxes 815, 816, and 817, and the user can select one of the designated FAX numbers of the home, office, and portable terminal. Forwarding to FAX is a pay service since that incurs a telephone charge. Hence, the user can designate a maximum output page count in an input field 819 to avoid a large amount of charge to be incurred due to output of a large quantity of FAX.

Radio buttons 822 are used to give a criterion upon selecting a conversion module if more than two conversion modules with identical conversion functions are available. When the user selects one of these three buttons, he or she can set to preferentially select a conversion module with low price, high compatibility level, or high stability when a plurality of conversion modules are available in a single site or directory service site.

<Data Display on Web>

Figure 29:
FIG. 29 shows a display example of a received mail message in the Web server of the net mail service of this embodiment.

When the user has clicked the "display mail contents" button 710 in FIG. 20, a window shown in FIG. 28 is displayed (S108, S109). That is, a list of mail messages which have been converted to a Web format according to user's setups is displayed. When the user selects one of mail messages 830, "From" and "Subject" contents of which are displayed, the data entity 407 (mail body text and attached file) stored in the net database 400 is displayed, as shown in FIG. 29. FIG. 29 shows an example of the contents of a mail message which has been converted into a format that a Web browser can display, and to which an image file is attached. When the check box 801 in FIG. 27 is checked, and when a mail message has an attached image and a conversion module for converting the format of the attached image to JPEG is available, an image is displayed in addition to body text, as shown in FIG. 29. On the other hand, when a wordprocessor document file is attached to a mail message, and the check box 802 in FIG. 27 is checked, the contents of the wordprocessor document are displayed after body text.

In this way, the automatic conversion result is displayed on the Web. Also, interactive data conversion and operations via the Web server can be made. When the user has pressed a delete button 841 in FIG. 29, the mail contents displayed on the window in FIG. 29 are deleted from the net database 400, and information other than the mail message displayed on the window in FIG. 29 so far is displayed in the same format as in FIG. 28. In this embodiment, the delete button 841 is set only in the window in FIG. 29, but may be set in the window in FIG. 28.

When the user has pressed a forward button 840 in FIG. 29, a window in FIG. 30 is displayed. In order to designate the forwarding destination and method in FIG. 30, items 850 to 881 are used to make setups associated with display or output on respective media via the mail server 100, Web server 600, and FAX server 650.

When the user wants to forward a mail message without converting it, he or she checks a check box 850 and inputs arbitrary mail addresses in text input fields 851 to 853. If the user must input a plurality of addresses in one field, he or she can input them by delimiting them by commas.

When the user wants to display a mail message on a Web browser via the Web server, he or she can check a check box 854. If the check box 854 is checked, a Web page is prepared on the Web server 600, and the URL of this Web page is sent to a mail address entered in a field 855. For example, assume that an attached document of a mail message is an image with a TIFF format, and the receiver does not have any image display software compatible to the TIFF format. In such case, when the user checks the check box 854 and also a check box 856, an image can be displayed on a Web browser, thus improving the accuracy of transmission. In this manner, since format conversion using a conversion module is often required upon display on the Web, whether or not an image format or wordprocessor format is converted to display an image or document can be set. Also, whether or not a pay conversion module can be used in that conversion can be set using a check box 858.

When the user wants to display a mail message on a Web page compatible to a portable terminal, he or she can check a check box 859. When the user checks the check box 859 and inputs information of respective items 860 to 862, the performance of a portable terminal specified by the items 860 to 862 is checked by looking up the portable terminal performance table 406j, and a Web page that the portable terminal can display is prepared on the Web server 600. The URL of this Web page is sent to a mail address entered in a field 863. If the user does not know the type, carrier name, and model number of a portable terminal as a destination, this conversion function is not available. In this manner, since format conversion using a conversion module is often required upon display on the Web, whether or not an image format or wordprocessor format is converted to display an image or document can be set. At this time as well, the portable terminal performance table 406j is looked up to select an image format that matches a portable terminal which displays information. Also, whether or not a pay conversion module can be used in that conversion can be set using a check box 866.

Likewise, when the user wants to forward a mail message to a portable terminal, he or she checks a check box 867 and inputs information of items 868 to 871, thus generating a mail message optimal to a portable terminal as a destination. If the user does not know about a portable terminal as a destination, he or she can enter only a mail address. However, when the mail address alone is designated, an optimal mail message is not always generated. In case of a portable terminal as well, since format conversion using a conversion module is often required, whether or not an image format or wordprocessor format is converted to send an image or document via mail can be set. Also, whether or not a pay conversion module can be used in that conversion can be set using a check box 875.

When the user wants to forward a mail message to FAX, he or she checks a check box 876 and inputs a destination FAX number in a field 877, thus forwarding the mail message. If the user must input a plurality of FAX numbers in one field, he or she can input them by delimiting them by commas. In case of FAX transmission, since format conversion using a conversion module is often required, whether or not an image format or wordprocessor format is converted to send an image or document to FAX can be set. Also, whether or not a pay conversion module can be used in that conversion can be set using a check box 881. Forwarding to FAX is a pay service since it incurs a telephone charge. Hence, the user can designate a maximum output page count in an input field 880 to avoid a large amount of charge to be incurred due to output of a large quantity of FAX.

Note that the user need not always select only one of the mail server 100, Web server 600, and FAX server 650 as a display/output destination, and the contents of one mail message can be displayed or output to a plurality of or all media. The display or output contents on these plurality of media need not always be identical. For example, mail body text and the summary of an attached wordprocessor document can be sent to a portable terminal, and full wordprocessor document text can be output using FAX via the FAX server 650.

When the user has pressed an OK button 882 in FIG. 30, a window in FIG. 31 is displayed. On the window in FIG. 31, the user designates a sending source to be used. From a pull-down menu 885, the user can select one of four addresses, i.e., (1) the home mail address which is input in FIG. 23 and is stored in the user home information table 406*b*, (2) the office mail address which is input in FIG. 24, and is stored in the user office information table 406*c*, (3) the mail address of the portable terminal, which is input in FIG. 25 and is stored in the user portable terminal information table 406*d*, and (4) the address of a mail account on the mail server 100 provided by the net mail service.

Likewise, from a pull-down menu 886, the user can select one of three FAX numbers, i.e., (1) the home address and FAX number, which are input in FIGS. 21 and 23 and are stored in the user home information table 406*b*, (2) the office address and FAX number, which are input in FIG. 24, and are stored in the user office information table 406*c*, and (3) the FAX number of the portable terminal, which is input in FIG. 25 and is stored in the user portable terminal information table 406*d*. The mail address selected on this window is used as the contents of "From" in the headers of a mail message that informs the URL, and a mail message to the portable terminal. Also, the FAX sender name selected on this window is described in the sender column of a front page created upon FAX transmission.

Figure 32:
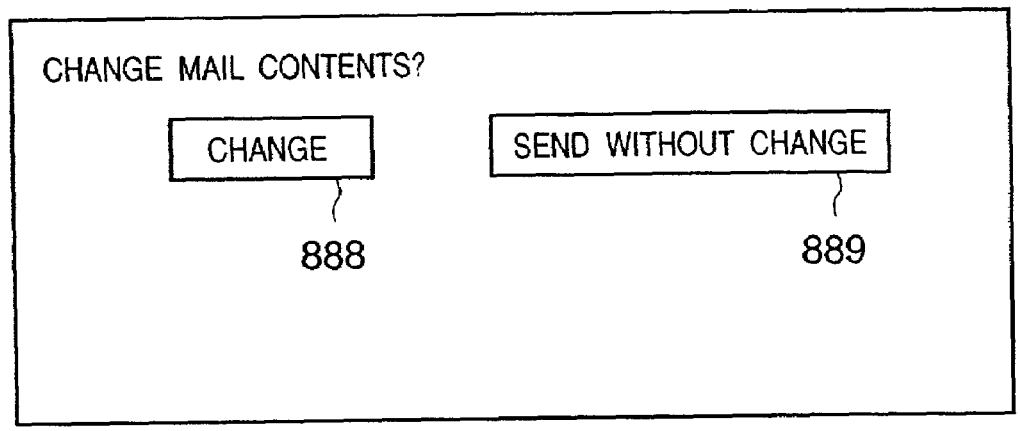
FIG. 32 shows an example of a mail forwarding setup window in the Web server of the net mail service of this embodiment.

When the user has pressed an OK button 887 in FIG. 31, a window in FIG. 32 is displayed. When the user wants to change the contents of a mail message to be forwarded, he or she presses a "change" button 888; when the user wants to send a mail message without change, he or she presses a "send without change" button 889. When the user has pressed the "send without change" button 889, a mail message is sent on the basis of the forwarding destination and method set in FIG. 30 and the source set in FIG. 31.

Figure 33:
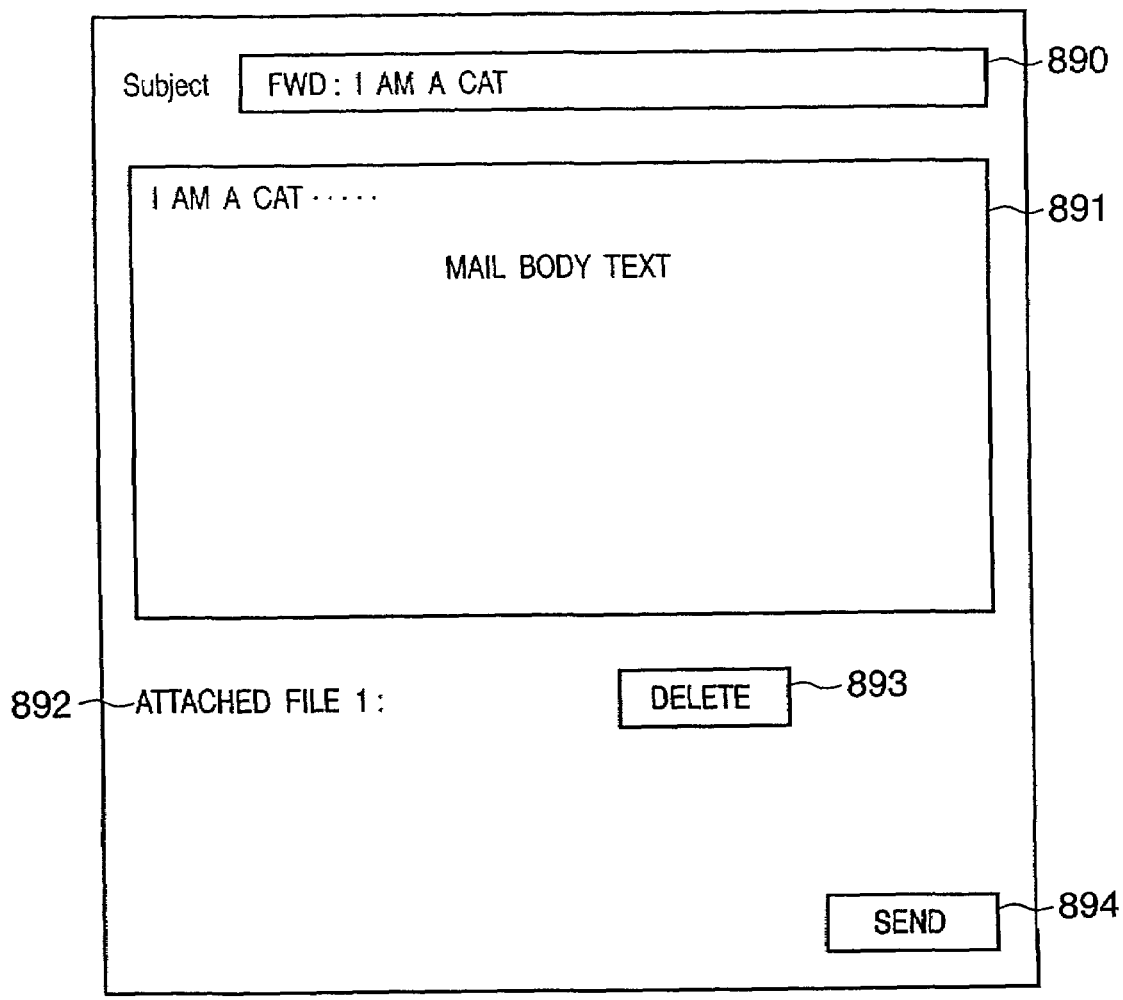
FIG. 33 shows an example of a mail forwarding setup window in the Web server of the net mail service of this embodiment.

When the user has pressed the "change" button 888 in FIG. 32, a window in FIG. 33 is displayed. On the window in FIG. 33, the user can edit the contents of a mail message to be forwarded. An input field 890 displays the contents of "Subject" of a mail message, an input field 891 displays mail body text, and the user can edit the contents based on them. The contents (Subject) of the input field 890 are used as "Subject" of mail messages including a mail message that notifies of the URL, and a mail message to a portable terminal, and are also used as the title of a FAX cover page. Since a field 892 displays an attached file, the user can confirm the attached file. By pressing a delete button 893, the user can choose not to send the attached file. Upon pressing the delete button 893, a window in FIG. 33 without the fields 892 and 893 is displayed. When the user has pressed a send button 894, the results edited in the input fields 890 and 891, and the attached file displayed in the field 892 are sent on the basis of the forwarding destination and method set in FIG. 30 and the source set in FIG. 31.

Since the forwarding method has been described, a sequence for creating new contents to be sent will be explained below. When the user has pressed a new message button 832 in FIG. 28, a window in FIG. 34 is displayed. The window in FIG. 34 is used for the same purpose as in FIG. 30 upon forwarding, i.e., is used to designate a sending destination and method. Unlike in FIG. 30, FIG. 34 has no designation items associated with an attached document.

Figure 35:
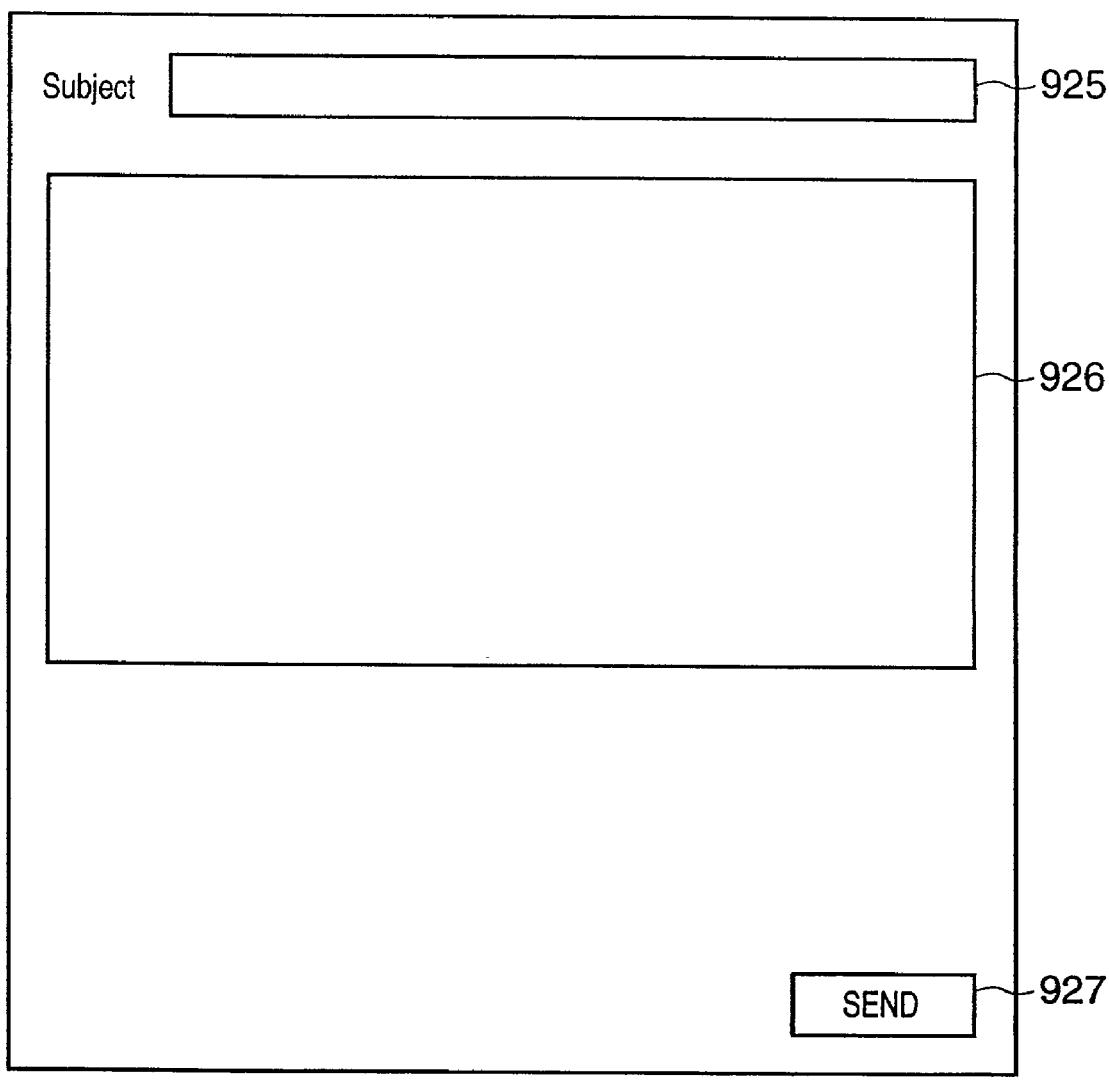
FIG. 35 shows an example of a new mail creation window in the Web server of the net mail service of this embodiment.

When the user has pressed an OK button 921 in FIG. 34, the window in FIG. 31 is displayed. Since the roles and actions of items on the window shown in FIG. 31 have already been explained, a description thereof will be omitted. By pressing the OK button 887, a window in FIG. 35 is displayed. The window in FIG. 35 is used to input mail contents. In FIG. 35, input fields 925 and 926 for Subject and body text are prepared, and the user inputs them. The contents of the Subject input field 925 are used as Subject of mail messages including a mail message that notifies of the URL, and a mail message to a portable terminal, and are also used as the title of a FAX cover page. By pressing a send button 927, the contents input to the input fields 925 and 926 are sent on the basis of the sending destination and method set in FIG. 34 and the source set in FIG. 31.

Use of an interactive conversion service using the forward and new button displayed on the Web has been explained. In this embodiment, only an interactive service via the Web server has been explained. However, the aforementioned interactive conversion service can be implemented in a Web server for portable terminals, a dedicated terminal, an automatic answering service of a telephone, and the like.

<Data Display on Portable Terminal Compatible Web>

Data is displayed using a Web browser on a portable terminal by either an automatic conversion service or interactive conversion service. The interactive conversion service is provided by pressing the forward button 840 in FIG. 29 or the new message button 832 in FIG. 28, and by selecting forwarding or sending of data to a portable terminal in FIG. 30 or 34.

If the user checks the check box 859 in FIG. 30 and inputs appropriate information in the input fields 860 to 862, a Mark Up language that can be displayed by a portable terminal is determined by looking up the portable terminal performance table 406*j*, and a file is converted into an appropriate format using an appropriate conversion module. The converted file is forwarded to the Web server 600, and a mail message that describes the URL is forwarded to the mail address entered in the input field 863. Furthermore, if the user checks a check box 864 in FIG. 30, an image format which can be displayed by a portable terminal specified by the portable terminal type, carrier name, and model number input to the input fields 860 to 862 is checked by looking up the portable terminal performance table 406*j*. An image attached to a mail message is converted into that image format by an appropriate conversion module, and the converted image file is sent to the Web server so that the image is browsed from a Mark Up language obtained by converting body text as in FIG. 29. Likewise, if the user checks a check box 865 in FIG. 30, a summary of a wordprocessor document is displayed after body text.

If the user checks a check box 906 in FIG. 34 and inputs appropriate information in input fields 907 to 909, a Mark Up language that can be expressed by that portable terminal is determined by looking up the portable terminal performance table 406j, and a file is converted into an appropriate format using an appropriate conversion module. The converted file is forwarded to the Web server 600, and a mail message that describes the URL is forwarded to the mail address entered in an input field 910.

The interactive conversion service has been explained. An automatic conversion service will be described below.

When a check box 805 in FIG. 27 is checked, a Web page compatible to the portable terminal is prepared in the Web server 600. A Mark Up language which can be displayed by a portable terminal specified by the portable terminal type, carrier name, and model number registered in the user portable terminal information table 406d is checked by looking up the portable terminal performance table 406j, and mail body text is converted to that language by an appropriate conversion module. If a check box 806 is checked in addition to the check box 805, an image format which can be displayed by a portable terminal specified by the portable terminal type, carrier name, and model number in the user portable terminal information table 406d is checked by looking up the portable terminal performance table 406j. Then, an appropriate conversion module is selected, and an image attached to a mail message is converted to the image format that can be displayed by the portable terminal using the selected conversion module. The converted image is provided as a portable terminal compatible Web page together with body text. Likewise, when a check box 807 in FIG. 27 is checked, a summary of a wordprocessor document is displayed after body text.

<Data Display on Portable Terminal>

Data is displayed on a portable terminal by either an automatic conversion service or interactive conversion service. The interactive conversion service is provided by pressing the forward button 840 in FIG. 29 or the new message button 832 in FIG. 28, and by selecting a forwarding or sending destination of data to a portable terminal in FIG. 30 or 34.

When the check box 867 in FIG. 30 is checked, data is forwarded to the mail address entered in the input field 871. Furthermore, when a check box 872 is checked, the maximum number of characters that can be displayed on a portable terminal specified by the portable terminal type, carrier name, and model number input to the input fields 868 to 870 is checked by looking up the portable terminal performance table 406j. As a result, if the number of characters of mail body text to be sent is larger than that maximum number of displayable characters, a conversion module which generates a summary from that text generates a summary of mail body text, and a mail message containing that summary is sent to the mail address entered in the input field 871. On the other hand, when a check box 873 in FIG. 30 is checked, an image format and image size that can be displayed on a portable terminal specified by the portable terminal type, carrier name, and model number input to the input fields 868 to 870 is checked by looking up the portable terminal performance table 406j. An appropriate conversion module converts an image attached to a mail message into a format that the portable terminal can use, and changes the image size of that image to one which can be displayed on the portable terminal. Then, the image is sent to the portable terminal. Likewise, when a wordprocessor document file is attached to a mail message, and a check box 874 in FIG. 30 is checked, the summary of a wordprocessor document is displayed after body text.

When a check box 911 in FIG. 34 is checked, a mail message is transferred to a mail address entered in an input field 915. Furthermore, when a check box 916 is checked, the maximum number of characters that can be displayed on a portable terminal specified by the portable terminal type, carrier name, and model number input to input fields 912 to 914 is checked by looking up the portable terminal performance table 406j. As a result, if the number of characters of mail body text to be sent is larger than that maximum number of displayable characters, a conversion module which generates a summary from that text generates a summary of mail body text, and a mail message containing that summary is sent to the mail address entered in the input field 915.

The interactive conversion serve in "data display on portable terminal" has been explained. An automatic conversion service will be described below.

When a check box 810 in FIG. 27 is checked, a mail message is sent to a portable terminal via the mail server 100. Furthermore, when a check box 811 in FIG. 27 is checked, the maximum number of characters that can be displayed on a portable terminal specified by the portable terminal type, carrier name, and model number registered in the user portable terminal information table 406d in FIG. 11 is checked by looking up the portable terminal performance table 406j. As a result, if the number of characters of mail body text to be sent is larger than that maximum number of displayable characters, a conversion module which generates a summary from that text generates a summary of mail body text, and a mail message containing that summary is sent.

When a check box 812 in FIG. 27 is checked, an image format and image size that can be displayed by a portable terminal specified by the portable terminal type, carrier name, and model number registered in the user portable terminal information table 406d in FIG. 11 is checked by looking up the portable terminal performance table 406j. An appropriate conversion module converts an image attached to a mail message into that image format and image size, and sends the image to the specified portable terminal. Likewise, when a check box 813 in FIG. 27 is checked, a summary of a wordprocessor document is displayed after body text. If the check boxes 804, 809, and 821 in FIG. 27 are checked, when a mail message is uploaded to the Web server 600 or a FAX document is sent via the FAX server 650, a mail message which describes it is sent to the portable terminal.

<Data Display (Output) by FAX>

Data is displayed (output) via FAX by either an automatic conversion service or interactive conversion service. The interactive conversion service is provided by pressing the forward button 840 in FIG. 29 or the new message button 832 in FIG. 28, and by selecting forwarding or sending of data to FAX in FIG. 30 or 34.

When one of check boxes 876, 878, and 879 in FIG. 30 is checked, a corresponding one of body text, an attached image, and attached wordprocessor document is sent via FAX to the FAX number input in the input field 877. The number of pages to be sent via FAX is adjusted to fall within the FAX allowable page count designated in the input field 880 in FIG. 30. Note that each FAX document is appended a cover page indicating the sending source set in FIG. 31.

When a check box 918 in FIG. 34 is checked, the contents input in FIG. 35 are sent via FAX to the FAX number input in an input field 919. Also, the number of pages of a FAX document is adjusted to fall within the FAX allowable page count designated in an input field 920 in FIG. 34. Note that each FAX document is appended a cover page indicating the sending source set in FIG. 31.

The interactive conversion service in "data display (output) by FAX" has been explained. An automatic conversion service will be described below.

When one of the check boxes 815, 816, and 817 in FIG. 27 is checked, a corresponding one of body text, an attached image, and attached wordprocessor document is sent via FAX. A destination at this time is specified by the FAX number of one of the home, office, and portable terminal designated in the user conversion setup table 406e, one of the FAX numbers registered in the user home information table 406b, user office information table 406c, and user portable terminal information table 406d is selected in accordance with a setup which is designated using the menu 818 and is stored in the user conversion setup table 406e. Also, the number of pages of a FAX document is adjusted to fall within the FAX allowable page count which is designated in the field 819 and is stored in the user conversion setup table 406e. Note that each FAX document is appended a cover page which indicates, as a destination, information of the address or the like stored in the user home information table 406b, user office information table 406c, or user portable terminal information table 406d, in correspondence with the location which is designated using the pull-down menu 818 and is stored in the user conversion setup table 406e.

<Registration of Other Sites Associated with Conversion Service>

FIGS. 36 to 39 show windows of a management tool, which can be accessed by only a site administrator. Using the windows in FIGS. 36 to 39, the site administrator inputs information of a net mail service site, directory service site, and conversion service site other than the self site.

FIG. 36 shows a window used to register basic information of a service company that manages one of a net mail service site, directory service site, and conversion service site. When the administrator fills input fields 930 to 936 with information as needed, and presses (clicks) an OK button 937, information of the company that manages a service site is registered in the service company table 406g.

FIG. 37 shows a window used to register basic information of one of a net mail service site, directory service site, and conversion service site. The administrator selects the site management company, which is input in advance using FIG. 36, from a pull-down menu 941, inputs the site name, the URL of CGI that launches the judgment module of that site, and a management mail address in input fields 940, 942, and 943, and presses (clicks) an OK button 944. Then, the site information can be registered in the service site table 406h. Note that the management mail address input in the input field 943 will be described in detail later.

FIG. 38 shows a window used to register conversion module information. The administrator selects one of other sites, which are input using FIG. 37 in advance, or the self site from a pull-down menu 950, inputs conversion module information in input fields 951 to 958, and presses (clicks) an OK button 959. Then, the conversion module information can be registered in the conversion module table 406f. When the conversion module is present in that site, the name of the conversion module is described as a full path in the input field 951; when the conversion module is present in another site, that field can be blank. Since a compatibility level indicates compatibility of the conversion module, the administrator can evaluate and determine it using a common evaluation criterion. As for a price, the administrator can input an arbitrary price if the conversion module is present in the self site, or a price designated by a site manager if the conversion module is present in another site. When the conversion module is registered in the table 406f, an ID to be stored in a conversion module ID of the conversion module table 406f is issued. The conversion module ID is a numeral or character string that uniquely specifies the conversion module.

Figure 39:
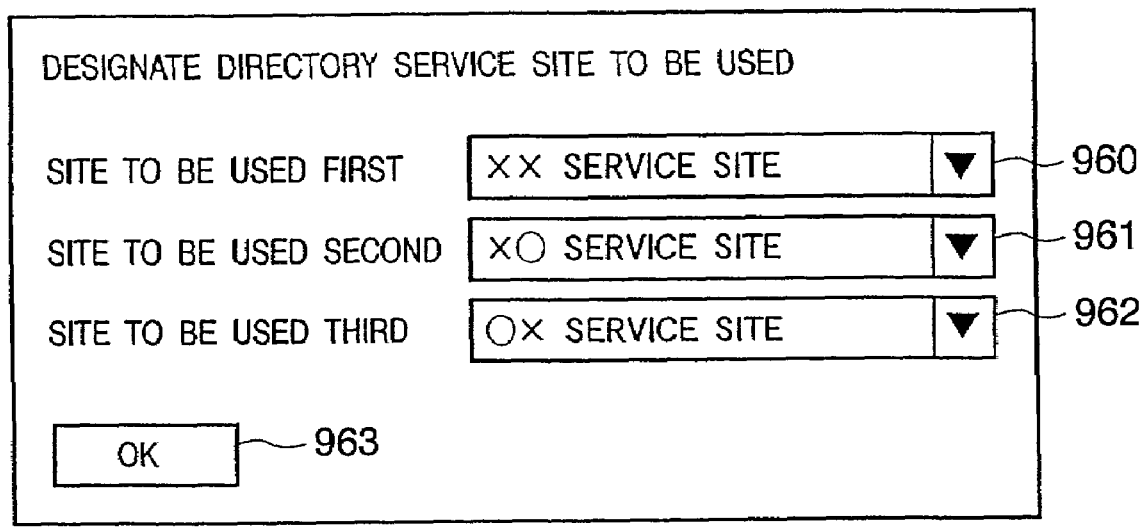
FIG. 39 shows an example of a directory service site priority registration window in the Web server of the net mail service of this embodiment.

FIG. 39 shows a window used to designate the order in which directory services are used. The administrator selects one of sites, which are input in advance using FIG. 37, from each of pull-down menus 960, 961, and 962, and presses (clicks) an OK button 963. Then, the directory service sites used and their priority levels are input to the use directory service table 406i. The site designated using the menu 960 is input to the use directory service table 406i as a site with priority=1, and the sites input using menus 961 and 962 are similarly registered to have priority=2 and 3, respectively. In FIG. 39, a maximum of three directory service sites can be registered. However, four or more sites may be registered.

<Site Registration Content Verification Service>

As described above, there are three use modes of a conversion module, i.e., a case wherein a conversion module in the self site is used, a case wherein a conversion module in a site other than the self site is directly used, and a case wherein a conversion module in a site other than the self site is used via a directory service. If the registration contents of conversion modules are defective, not only a problem in the self site but also a problem in, e.g., accounting may occur. The site registration content verification service is a function of minimizing such risk.

Upon registration of a conversion module, inputs are made using the window in FIG. 38. That is, an appropriate one of the already registered conversion service sites is selected from the pull-down menu 950, and appropriate contents are input to the input fields 951 to 958. Upon pressing (clicking) the OK button 959, the setup module 500 (500b) stores the conversion module information in the conversion module table 406f. At this time, a service validity flag is set to be "false", and the use count and success count are respectively set to be "0".

Figure 50B:
FIG. 50B shows an example of a mail message sent when items of the conversion module table are not updated.

Furthermore, the setup module 500 (500b) reads out a mail address from the service site table 406h, and sends an XML file by mail to this address via the mail server 100 (100b). This XML file describes items of the input format (MIME), input format (extension), output format (MIME), output format (extension), output format (unique), and price, which are stored in the conversion module table 406f. FIG. 50A shows an example of such XML file. Upon sending this mail message, the mail server 100 (100b) creates a new mail account, and uses that mail account in a Reply-To header of that mail message.

Upon receiving the mail message, the mail server of the conversion service site or directory service site passes that mail message to the setup module 500a (500b, 500c). The setup module 500a (500b, 500c) parses the XML file to compare it with the contents of the conversion module table 406f. If their contents match, the setup module returns a mail message to the Reply-To address. The contents of this mail message are written in XML. This XML file describes the conversion module ID in the conversion module table 406f in the conversion service site or directory service site. FIG. 51A shows an example of this XML file.

Upon receiving the mail message from the conversion service site or directory service site, the mail server erases the mail address used to receive this mail message, and passes the mail message to the setup module 500 (500b). The setup module 500 (500b) sets the service validity flag in the conversion module table 406f to be "True", and inputs the conversion service side conversion module ID. If the conversion module ID described in the XML file of that mail message, and the service site ID indicating the service site that originated the mail message match the conversion service site side conversion module ID and service site ID of another conversion module registered in the conversion module table 406f, the setup module does not update the corresponding items of the conversion module table 406f, and re-sends a mail message shown in FIG. 50B. If the setup module is informed of the conversion module ID, which is not already registered, as shown in FIG. 51A, it inputs information to the corresponding items in the conversion module table 406f, as described above. If the setup module receives the already registered conversion module ID again, it sends a mail message in FIG. 50B. If the setup module receives a message indicating that no corresponding conversion module is found in the conversion service site or directory service site, as shown in FIG. 51B, it erases the corresponding items from the conversion module table 406f.

In this embodiment, XML files are sent by mail to provide the site registration content verification service. However, this method is merely an example. A method using a unique protocol, method using another versatile protocol, and the like may be used.

In the following description, the conversion module table 406f is searched for a conversion module in some steps. In this case, since such search is made under the condition that the service validity flag="True", confirmation of the service validity flag is not cited.

<Automatic Mail Conversion Service>

Figure 40:
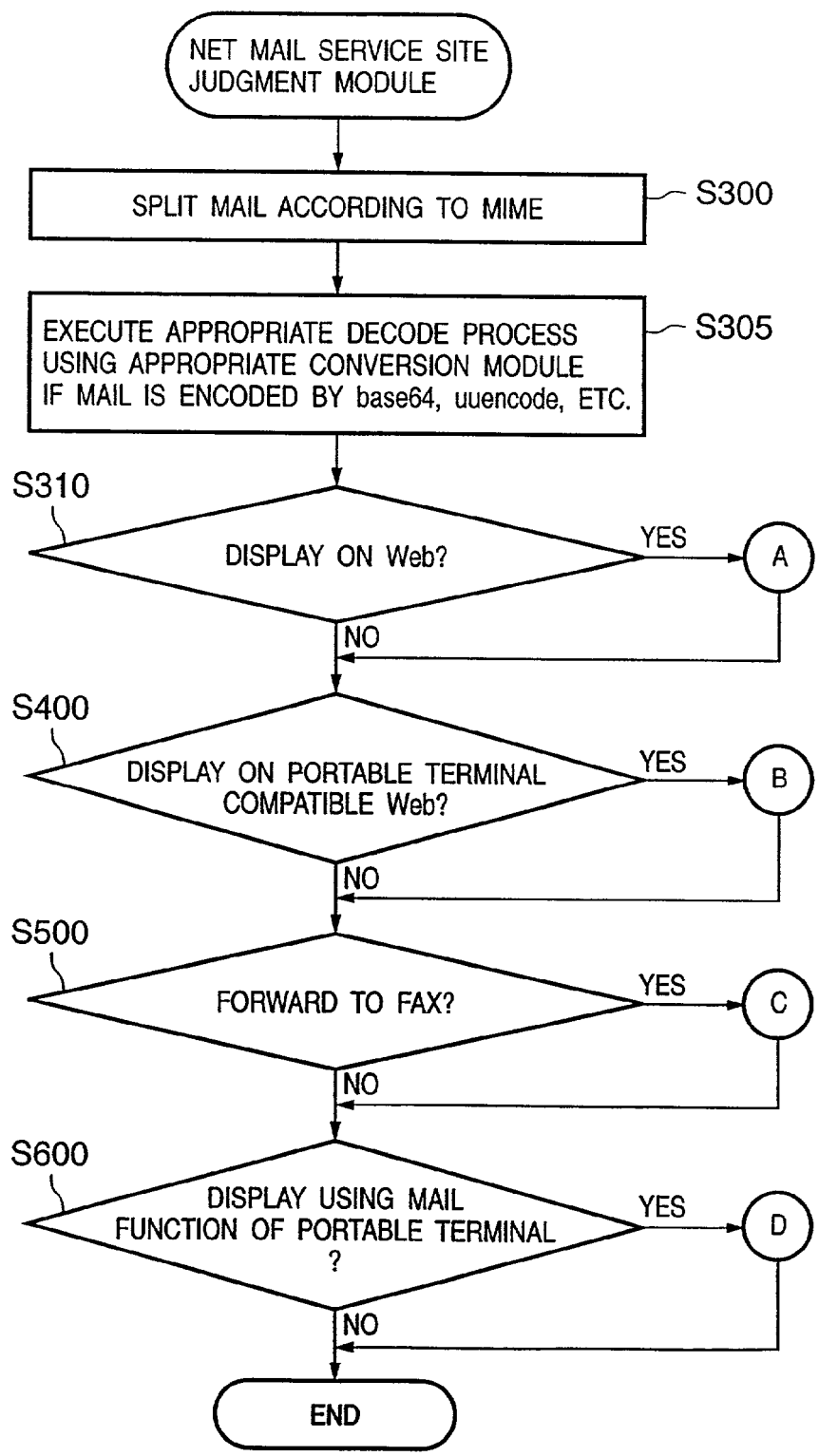
FIG. 40 is a flow chart for explaining the process of the judgment module in a net mail service site of this embodiment.
Figure 41A:
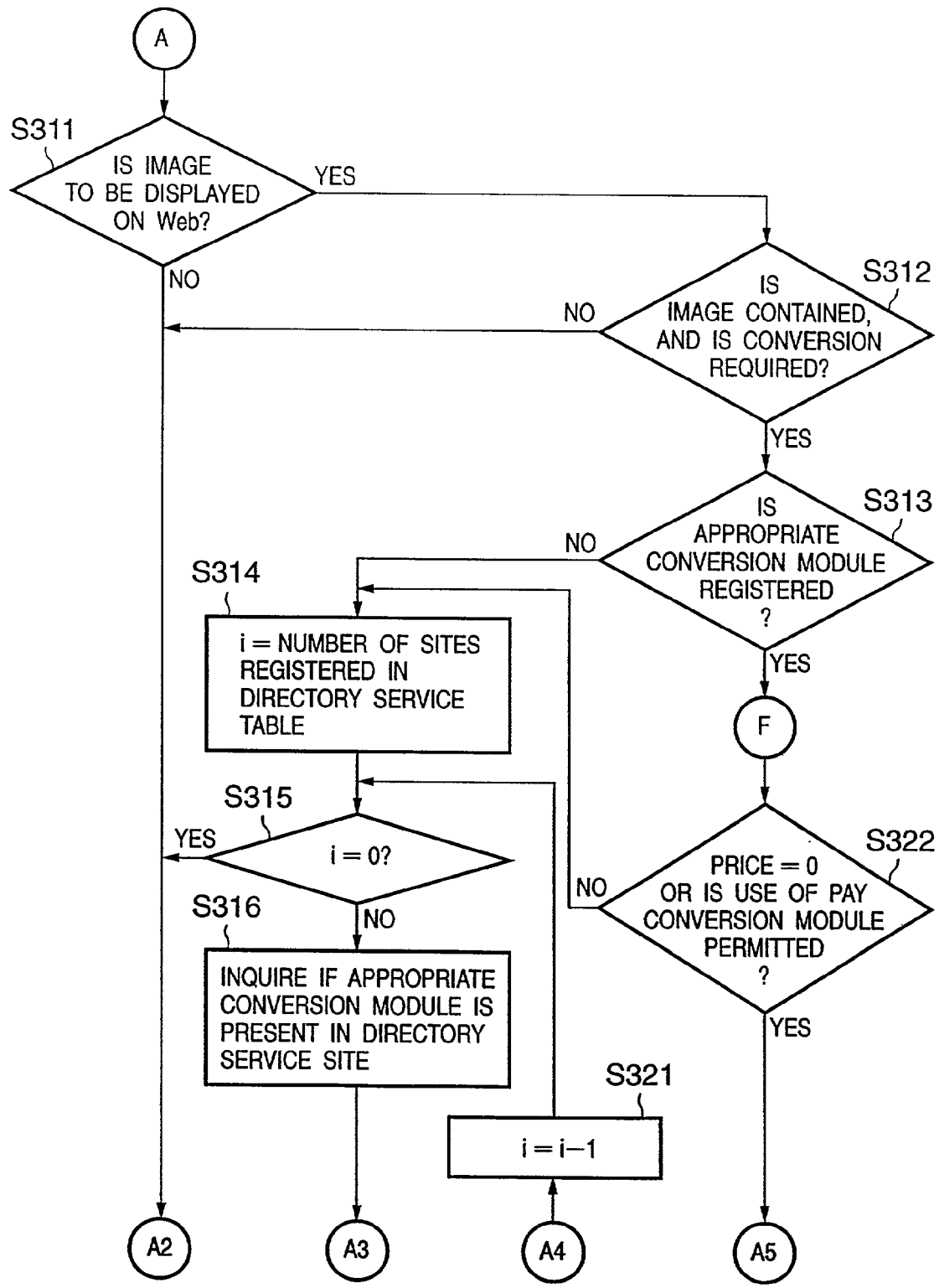
FIGS. 41A to 41D are flow charts for explaining the process for generating data which can be displayed on a Web.
Figure 41B:
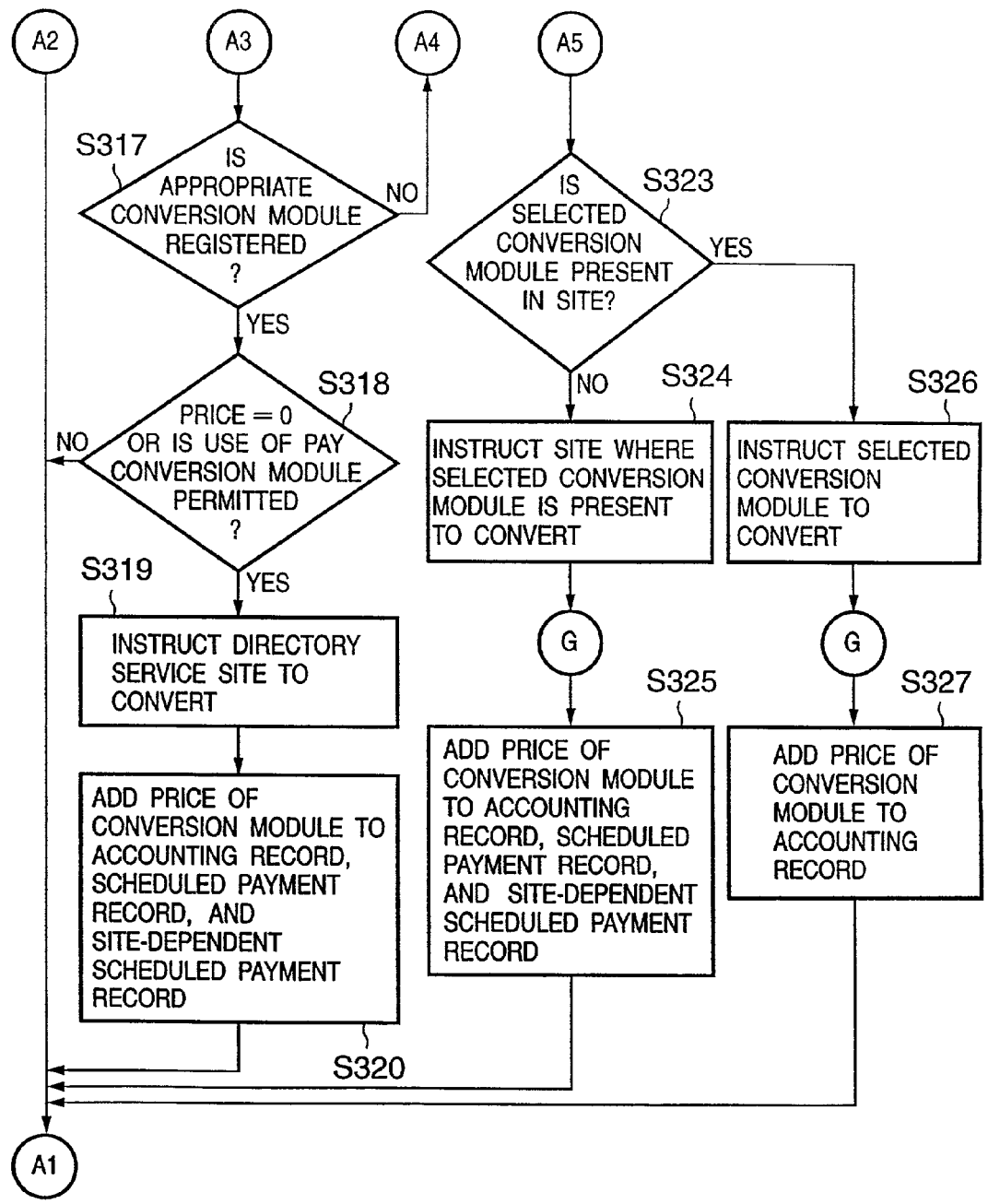
Figure 41C:
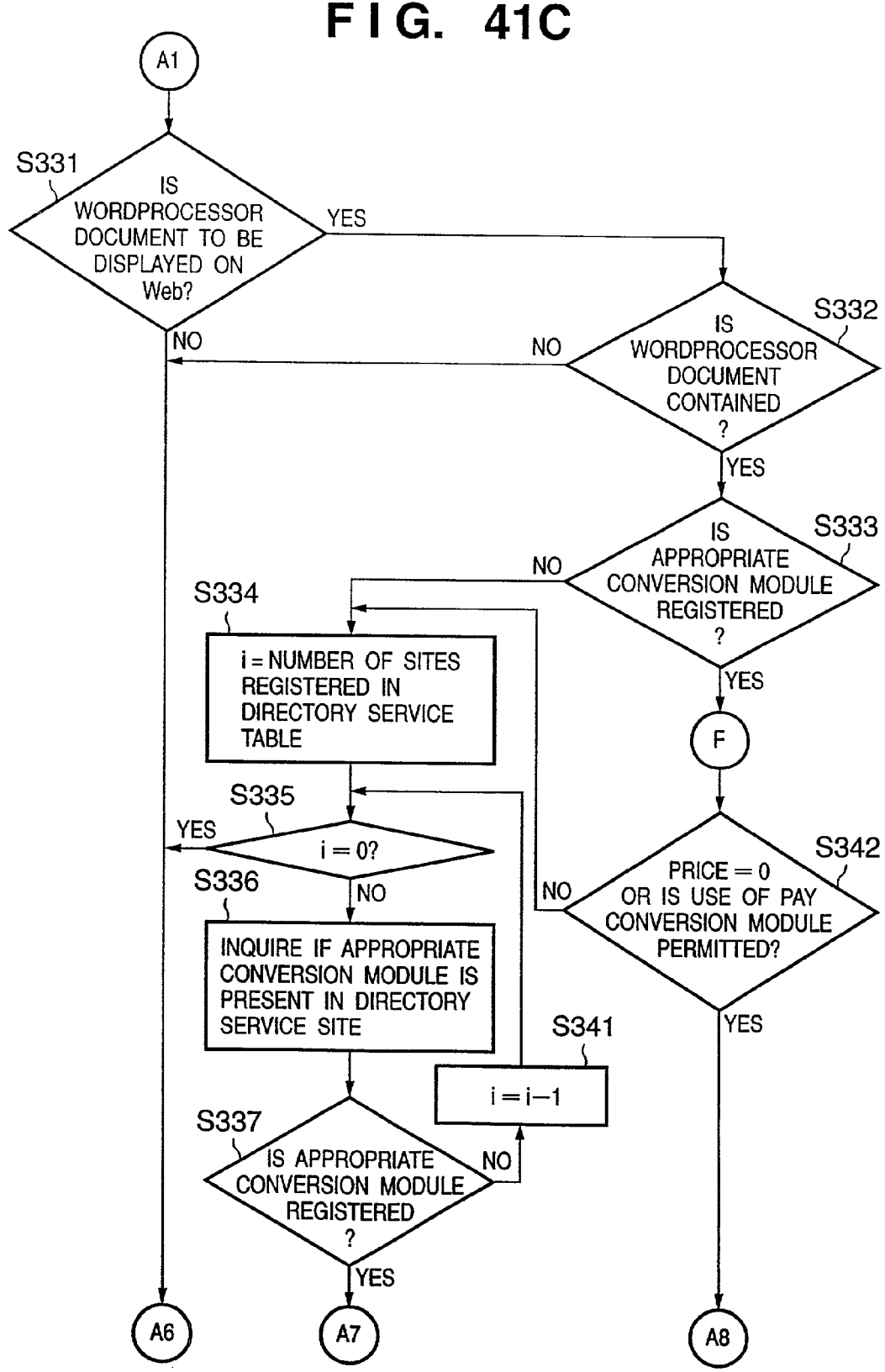
Figure 41D:
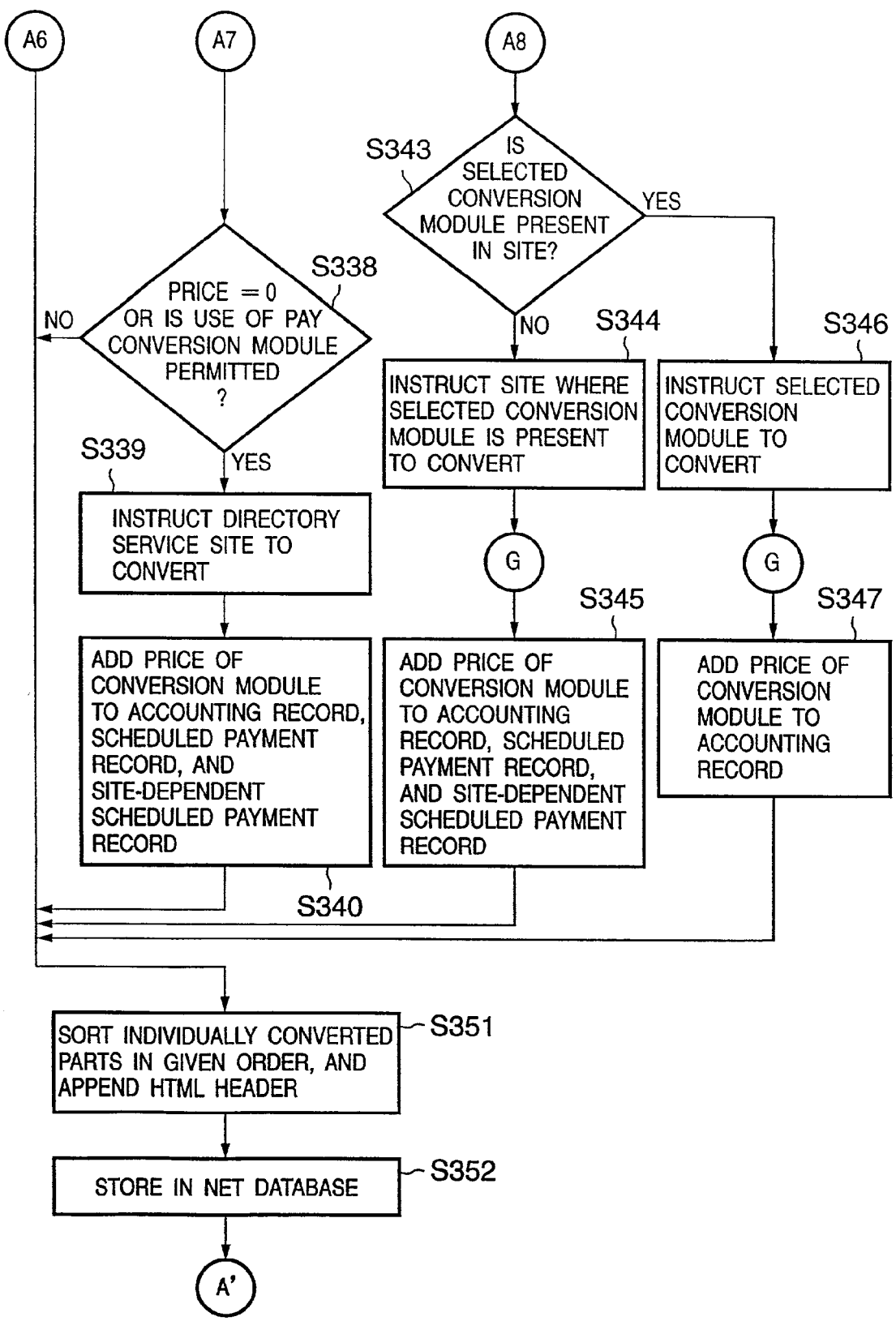
Figure 42A:
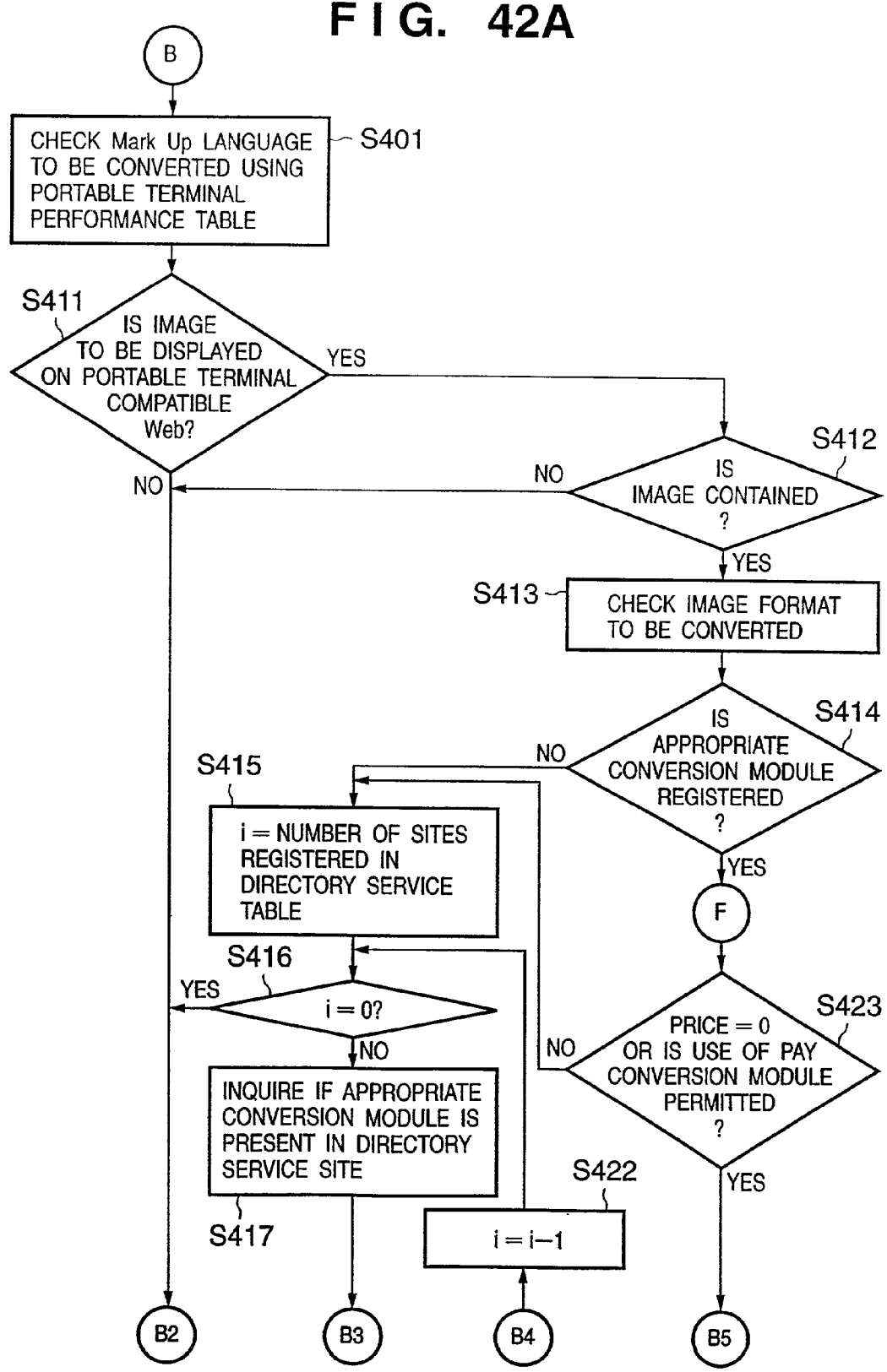
FIGS. 42A to 42D are flow charts for explaining the process for generating a Web page compatible to a portable terminal.
Figure 42B:
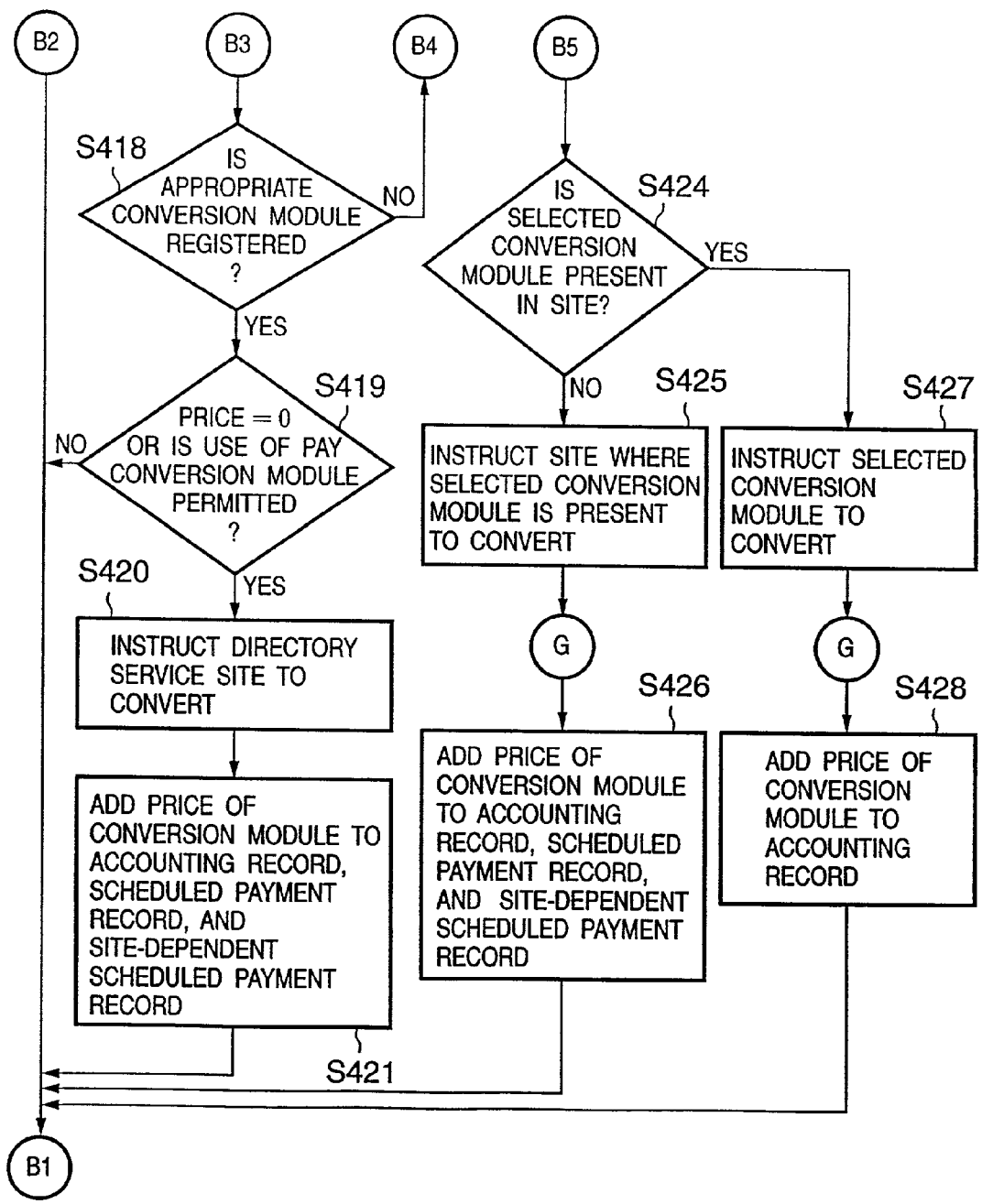
Figure 42C:
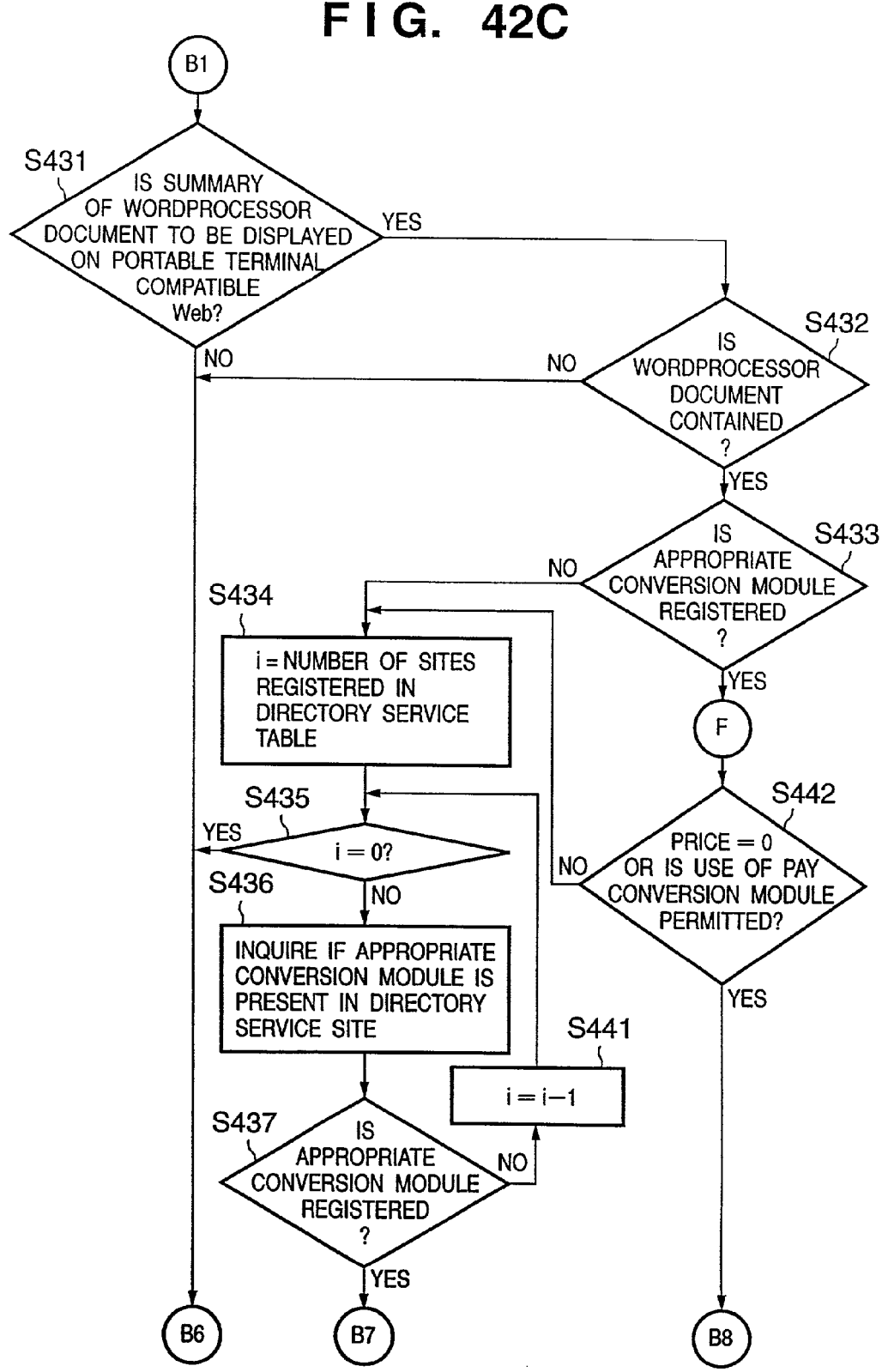
Figure 42D:
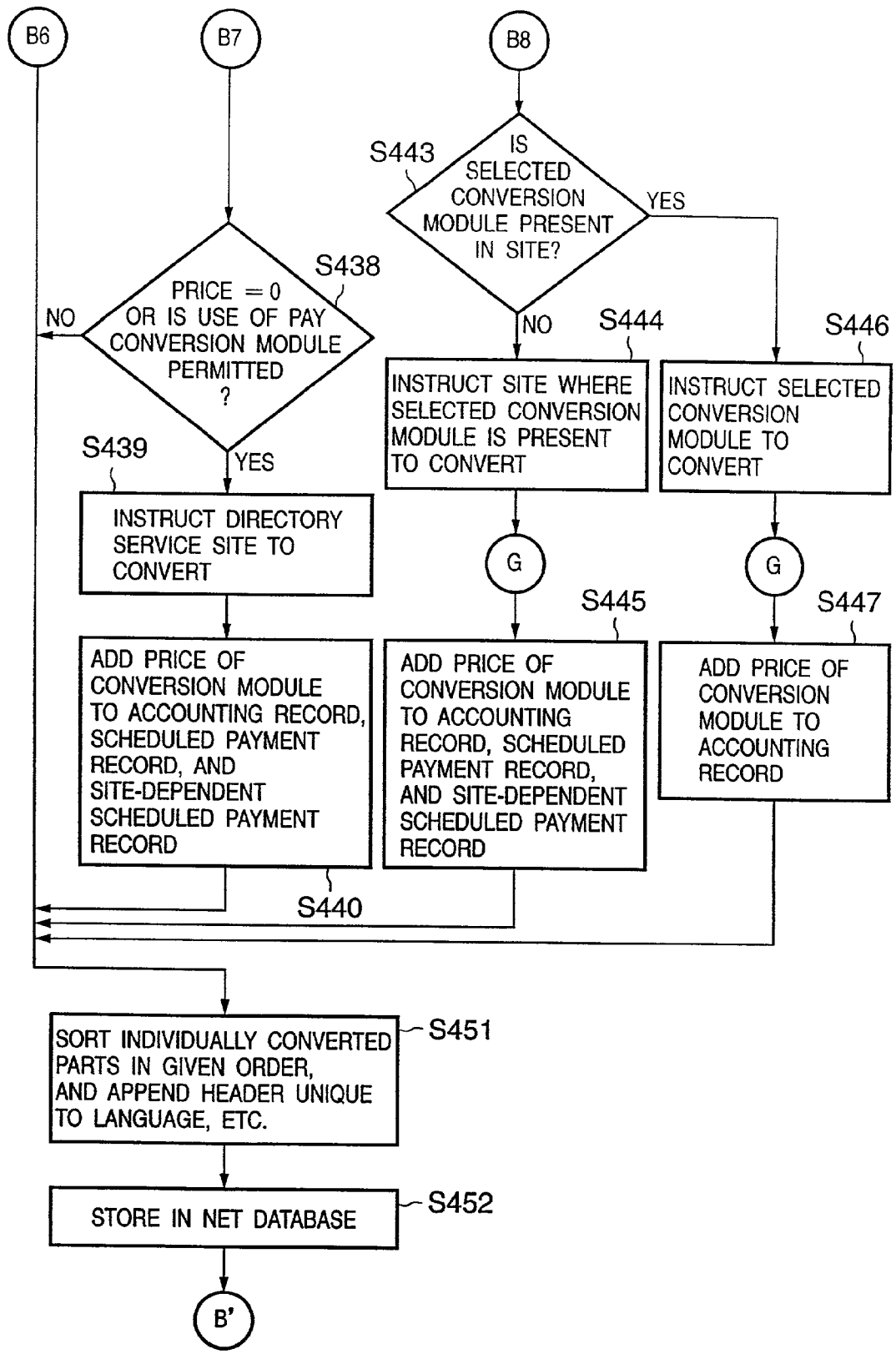
Figure 43A:
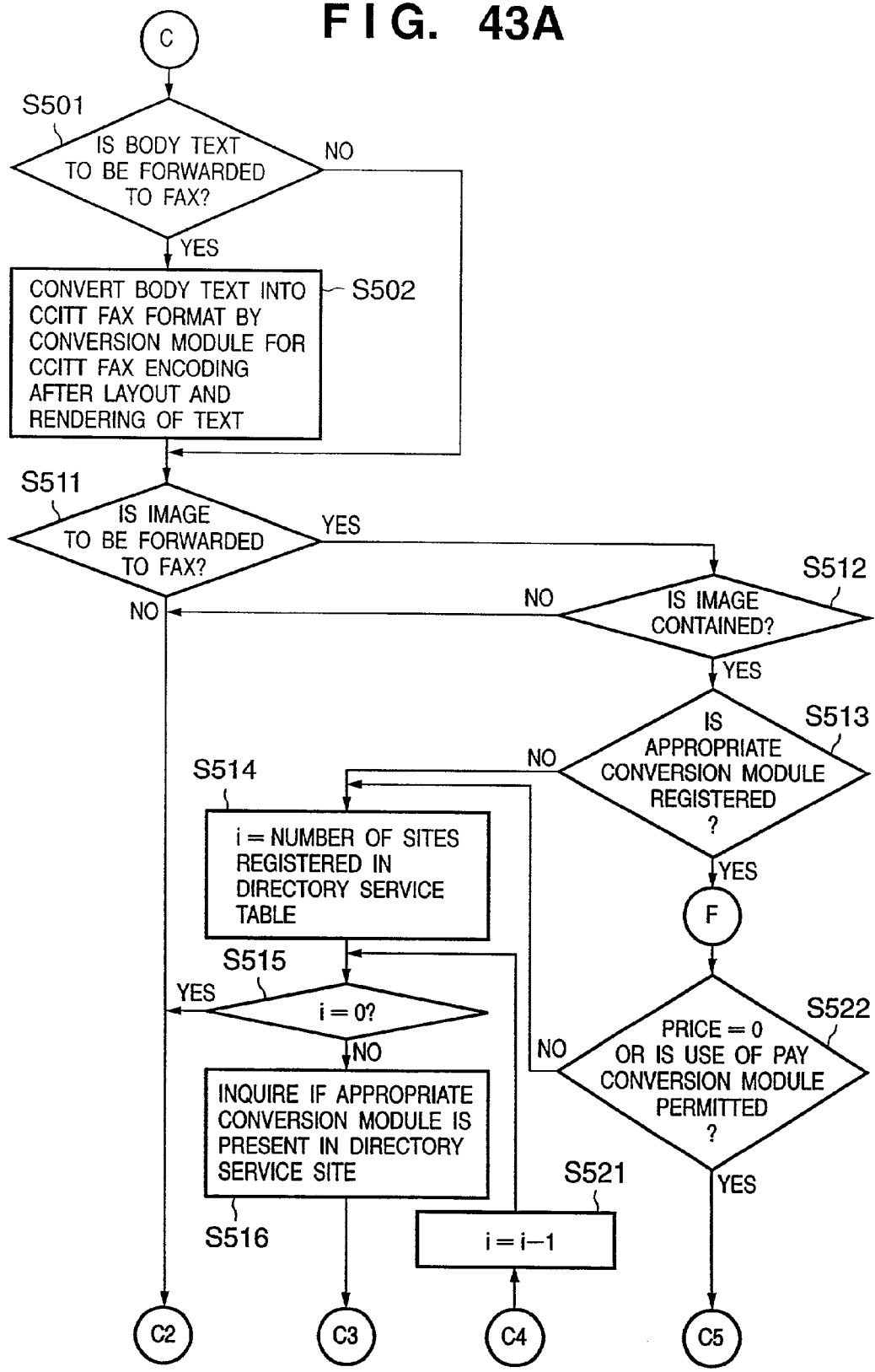
FIGS. 43A to 43D are flow charts for explaining the process for generating data that can be sent to a FAX.
Figure 43B:
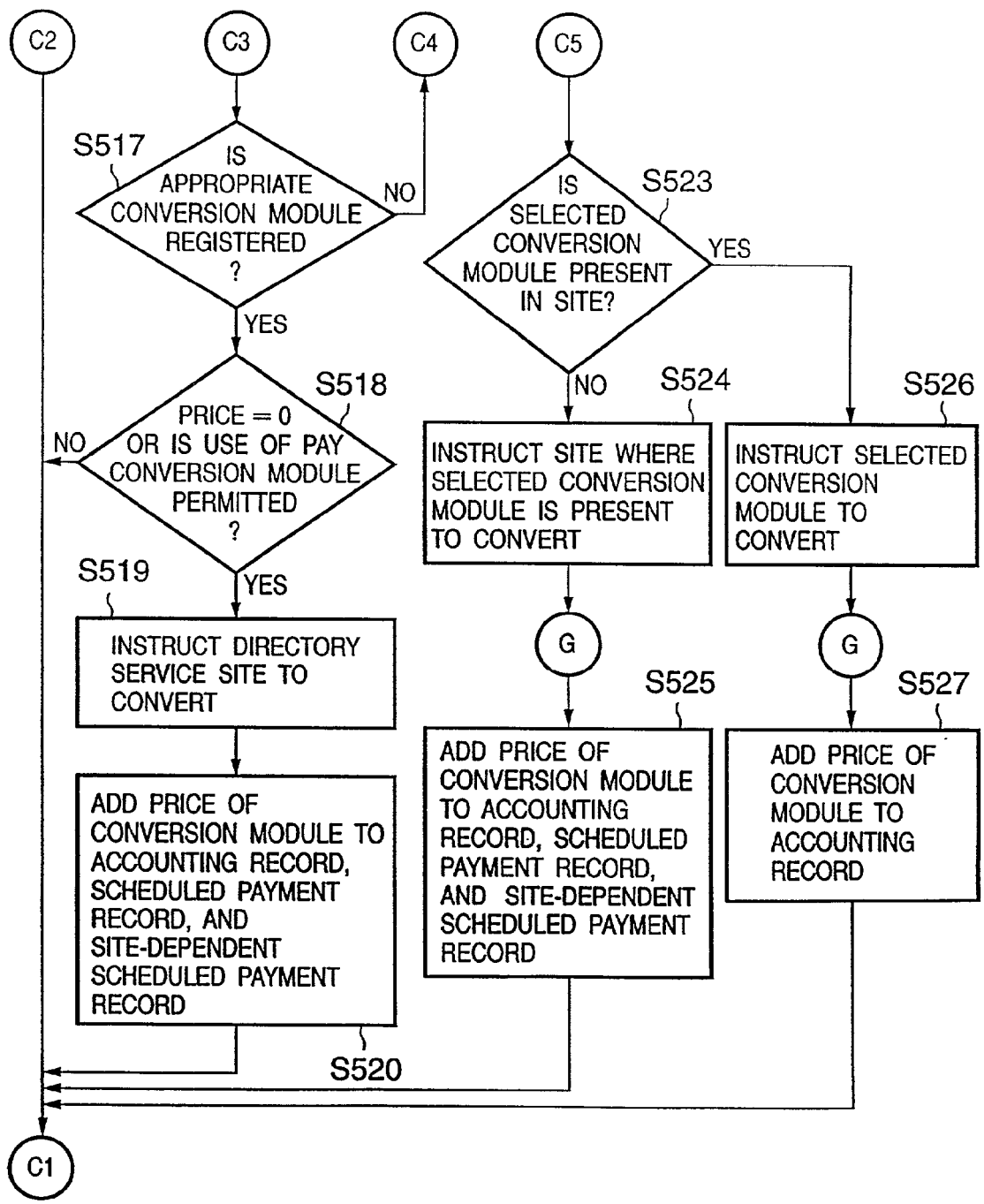
Figure 43C:
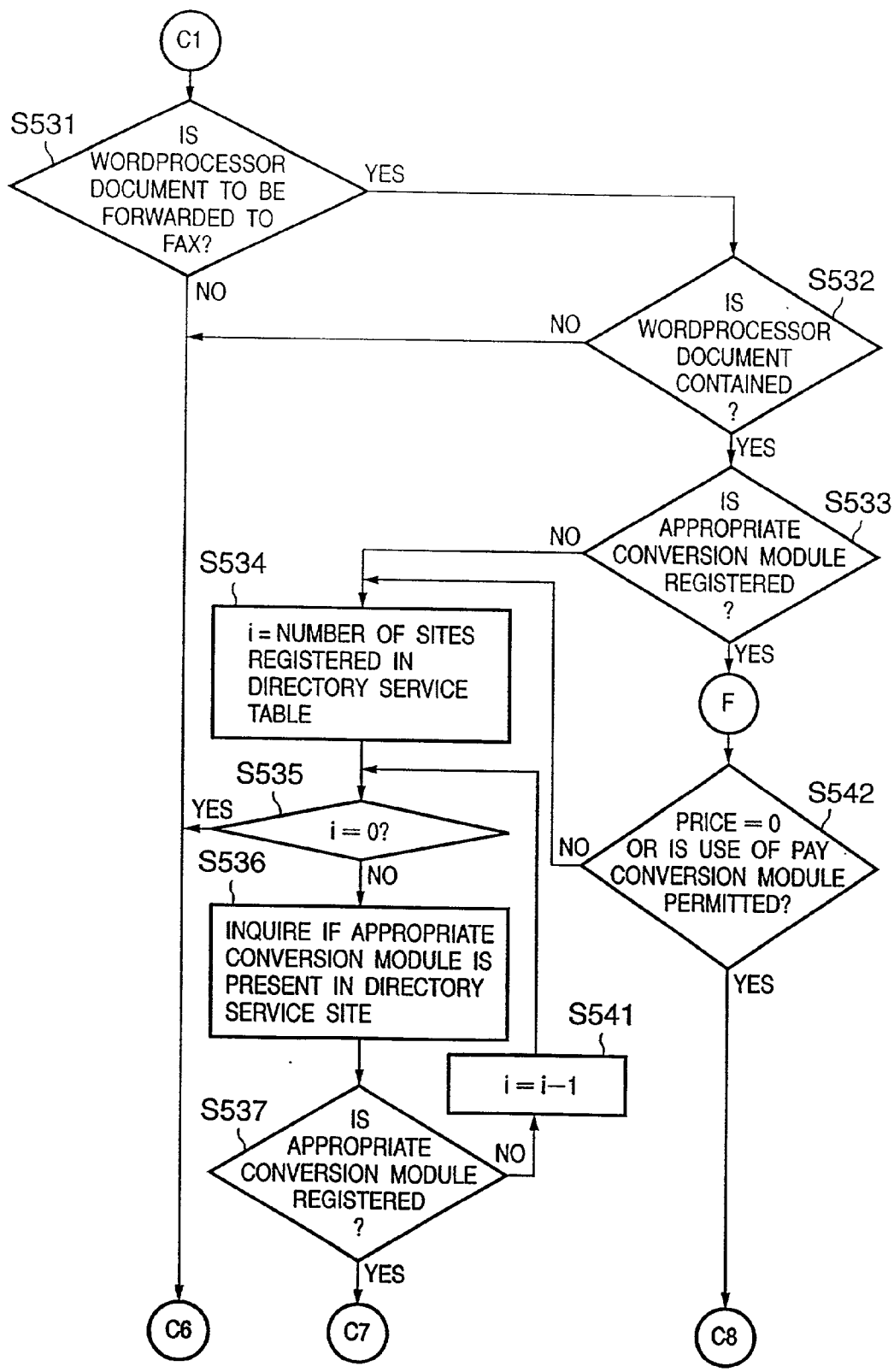
Figure 43D:
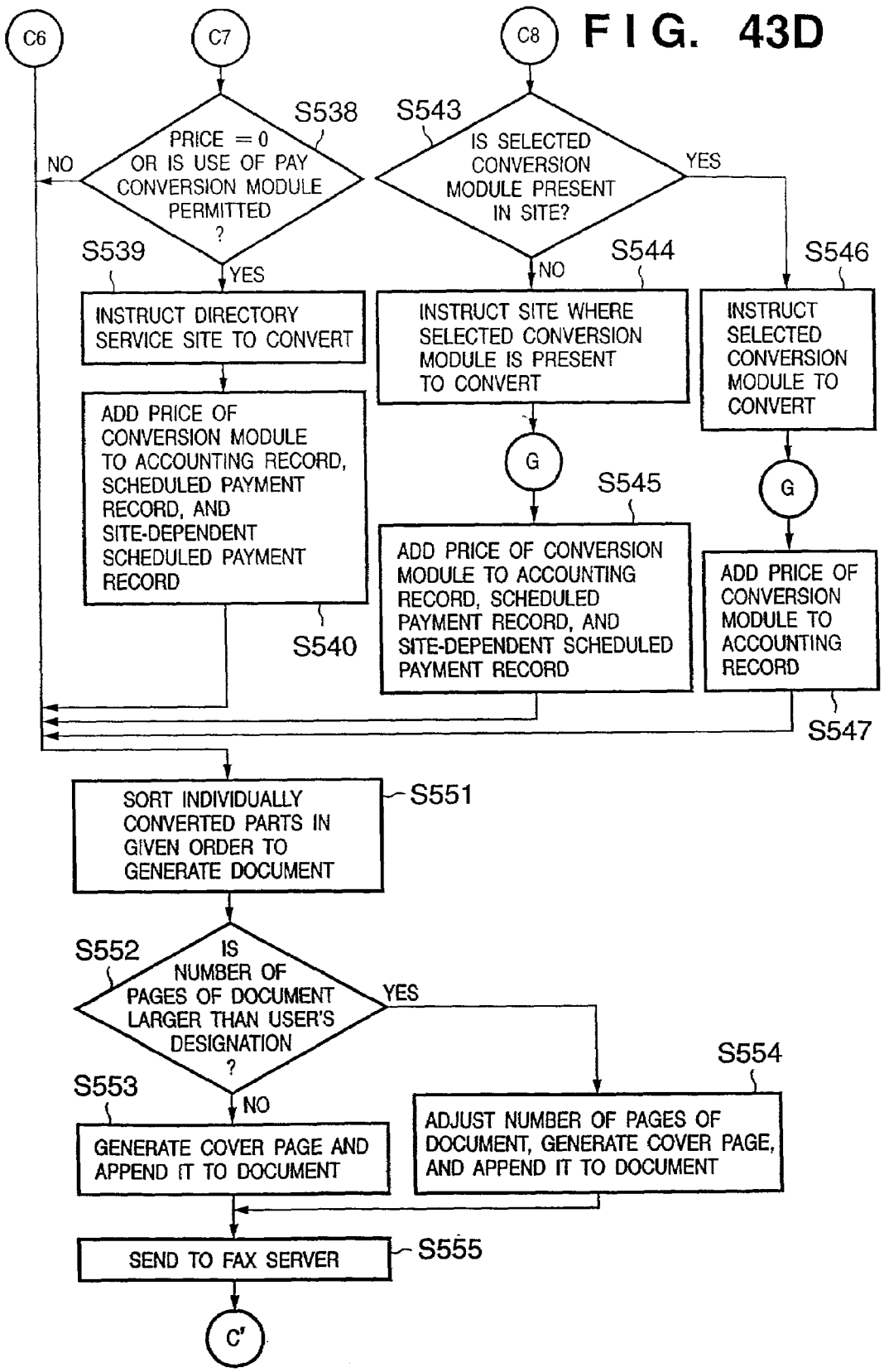
Figure 45B:
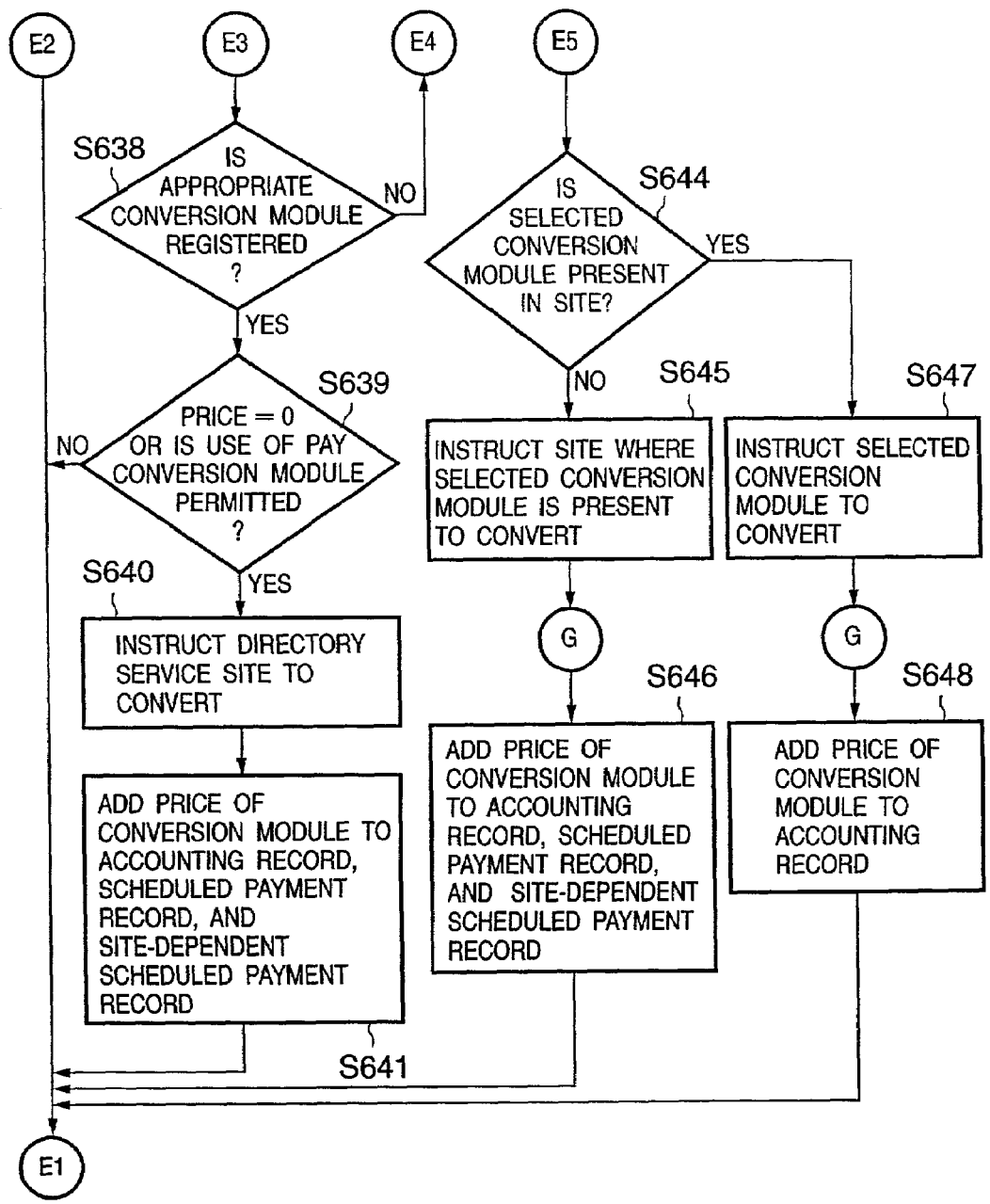
Figure 45C:
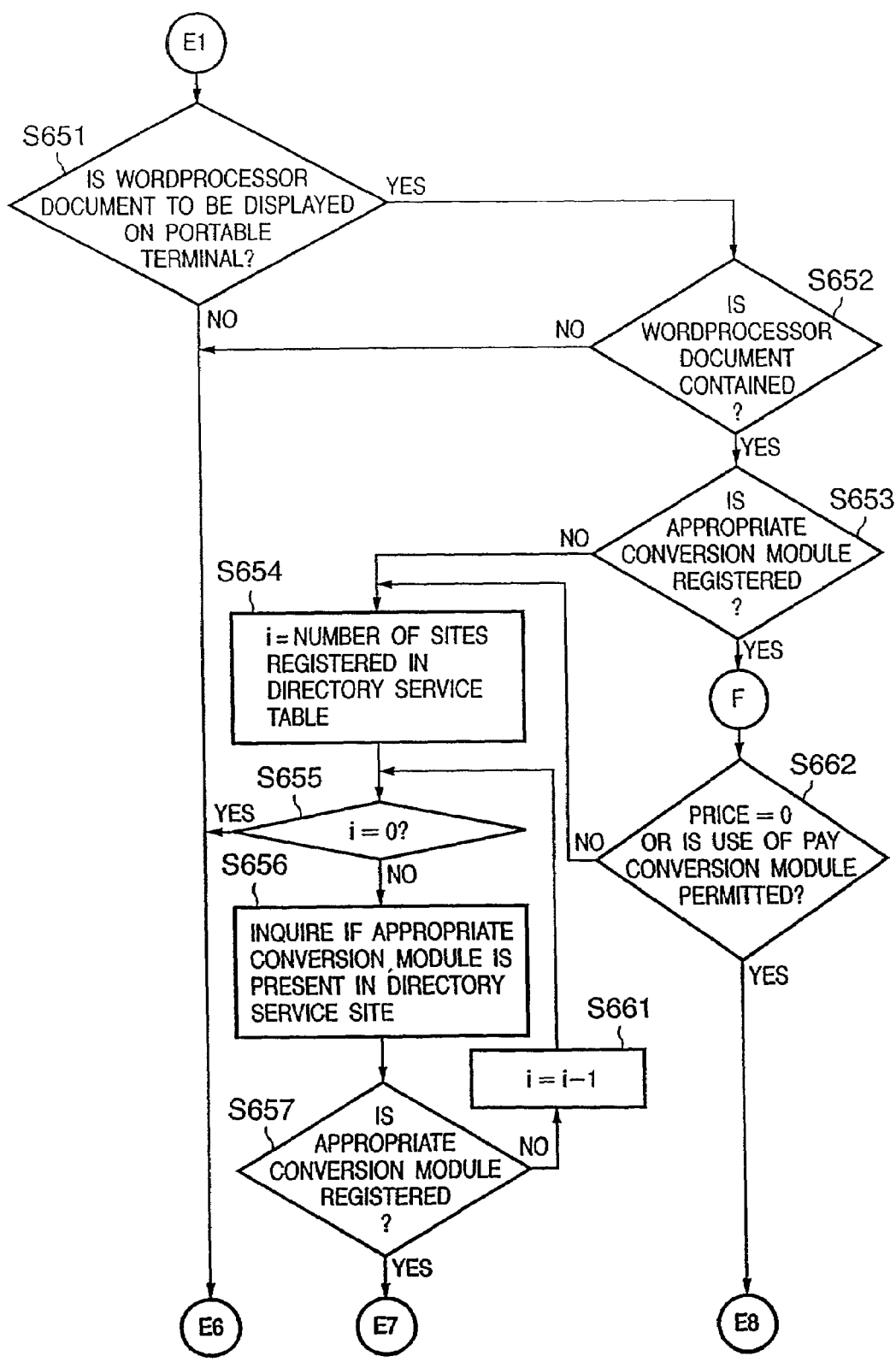
Figure 45D:
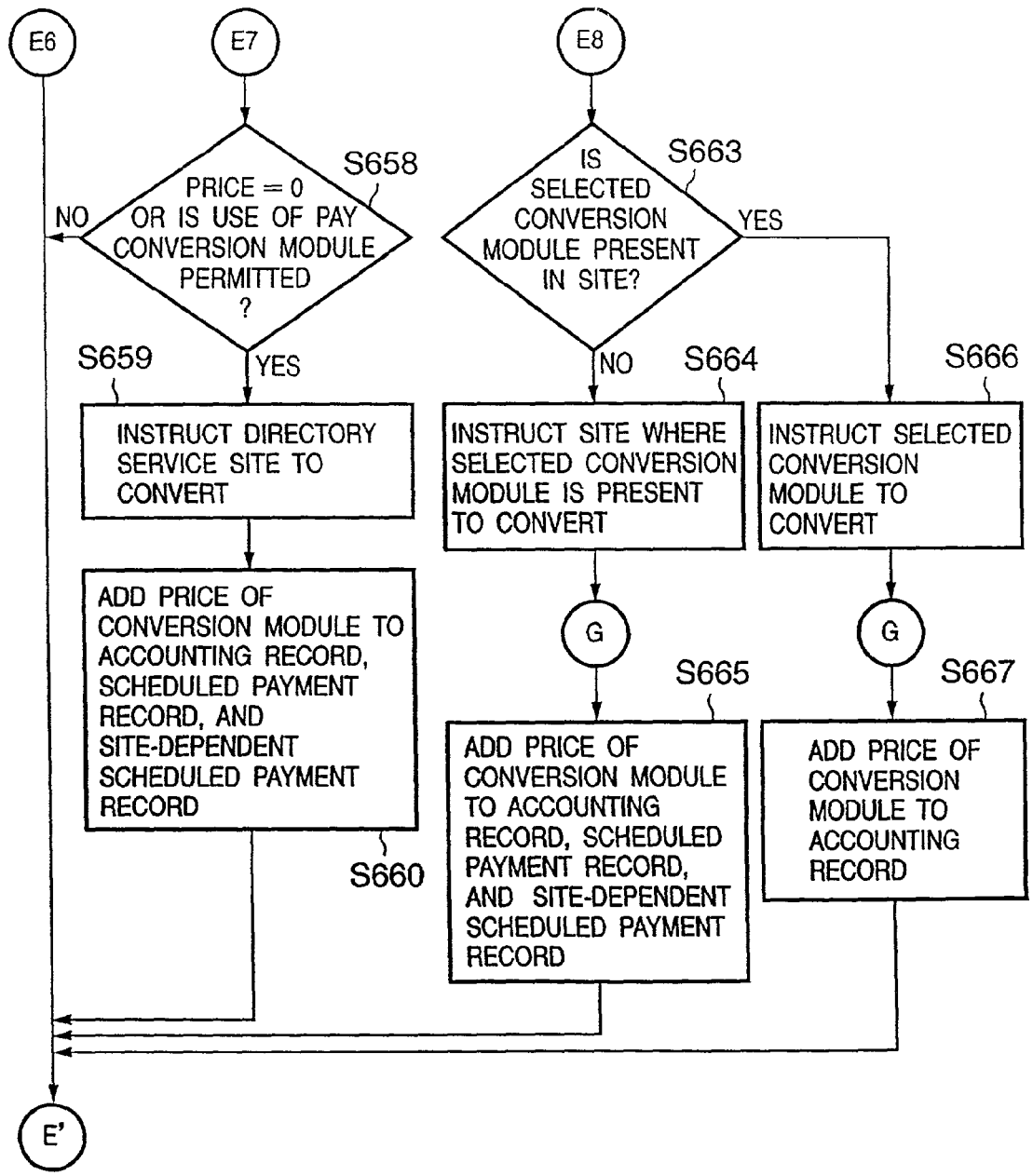

Mail conversion services that allow to display data on a Web, portable terminal, and FAX include a service which is automatically provided when a mail message has arrived at the mail server 100, and a service which is made by the user interactively via the Web server 600 or a phone. The mechanism of the automatic mail conversion service will be explained below. FIG. 40 is a flow chart showing the processing after the mail server receives a mail message and passes that mail message to the judgment module 200. When a plurality of documents are attached to a mail message, all attached documents undergo the process to be described below in the order they are attached in individual steps A, B, C, and D.

If the mail message has multipart Content-Type, the mail message is split using a boundary into individual parts (step S300). If a conversion module that can decode encoded data (normally, Base64, Uuencode, or the like) given by Content-Transfer-Encoding is available, that encoded data is decoded (step S305). Then, conversion processes for individual media shown in FIG. 41A to FIG. 44 are executed. That is, if that mail message is to be displayed on a Web, the process shown in FIGS. 41A to 41D starts from step S310; if the mail message is to be displayed on a Web compatible to a portable terminal, the process shown in FIGS. 42A to 42D starts from step S400; if the mail message is to be forwarded to FAX, the process shown in FIGS. 43A to 43D starts from step S500; or if the mail message is to be displayed on a portable terminal using its mail function, the process shown in FIG. 44 starts from step S600. Note that display on the portable terminal using its mail function includes a message indicating that the mail message is uploaded to the Web server, a message indicating that the mail message is forwarded to FAX, and the like in addition to display of the mail contents.

<<Conversion to Data Displayable on Web>>

FIGS. 41A to 41D are flow charts showing the process for generating data to be displayed on a Web. Since body text does not require any conversion, conversion is required for an image, wordprocessor document, or the like attached to a mail message. If the user conversion setup table 406e includes a setup for displaying an image on a Web (step S311), it is checked based on Content-Type and name extension if mail data contains an image, and it is also checked if the format of that image must be converted (step S312). If an image is contained, and image format conversion is required, the Content-Type and name extension of the image are compared with the input format (MIME) and input format (extension) in the conversion module table 406f to search for appropriate conversion modules for converting this image format into JPEG (step S313).

If appropriate conversion modules are found, one optimal conversion module is selected via procedure F. In procedure F, an optimal one of a plurality of appropriate conversion modules is selected on the basis of the conversion module select criterion stored in the user conversion setup table 406e and the compatibility level, price, and stability (defined by dividing the success count by the use count) stored in the conversion module table 406f, as shown in FIG. 46.

Figure 46:
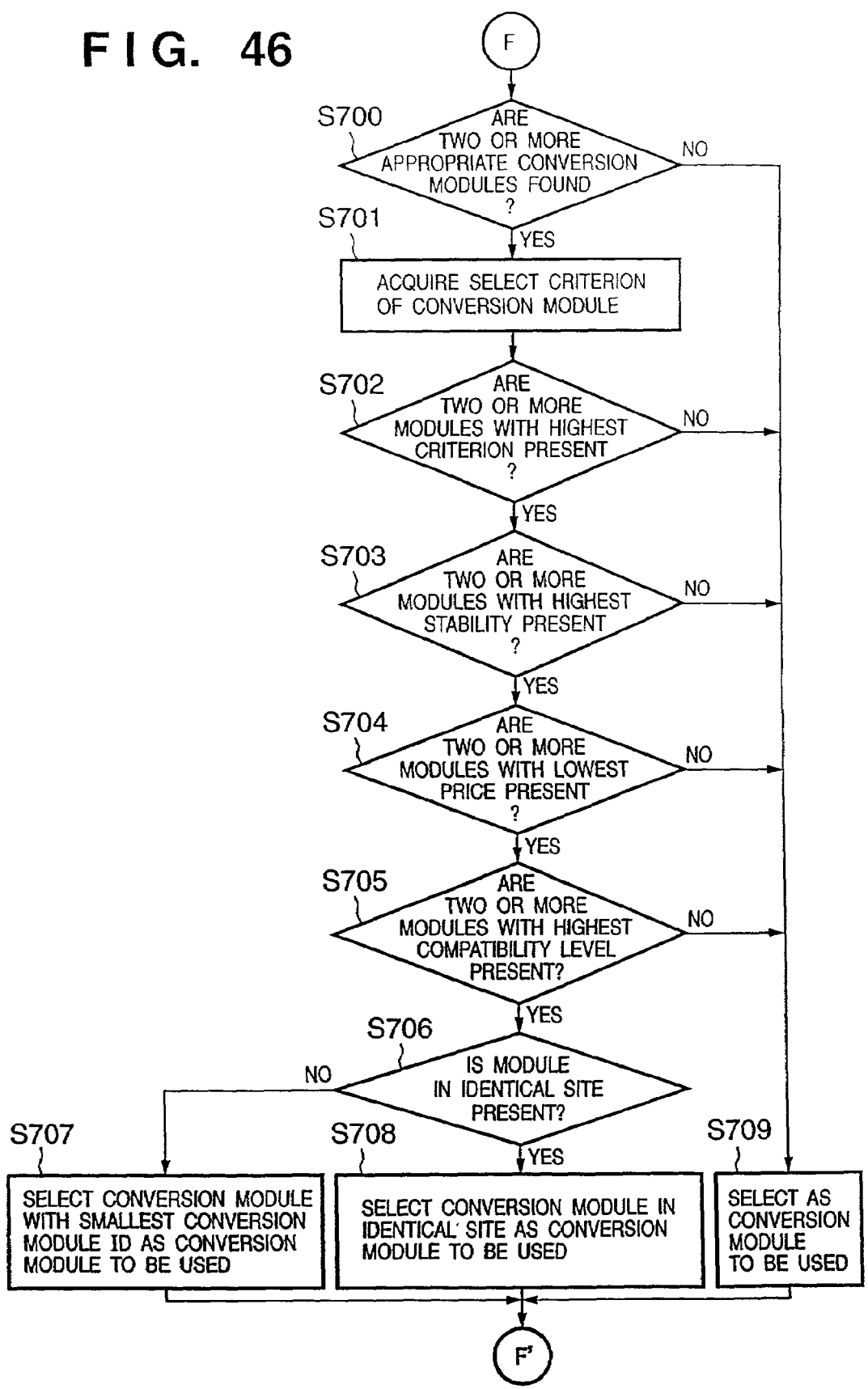
FIG. 46 is a flow chart for explaining the process for selecting one of a plurality of conversion modules.

Referring to FIG. 46, it is checked if two or more appropriate conversion modules are registered in the conversion module table 406f. If only one conversion module is available, that conversion module is determined as one to be used (steps S700 and S709). On the other hand, if two or more appropriate conversion modules are found, the set conversion module select criterion is acquired by looking up the user conversion setup table 406e. If only one conversion module with the highest select criterion set in the table is found, that conversion module is determined as one to be used (steps S702 and S709).

If a plurality of conversion modules with the highest select criterion set in the table are found in step S702, "stability", "price", and "compatibility level" are checked individually to narrow down candidates. In this embodiment, "stability", "price", and "compatibility level" are checked in the order named, but this order is not limited to that of this embodiment. Also, this order may be set by the user.

If only one of conversion modules extracted in step S702 has the highest stability, that conversion module is determined as the one to be used (steps S703 and S709). If a plurality of conversion modules still remain after step S703, conversion modules with the lowest price are extracted. If only one conversion module is extracted, that module is determined as the one to be used (steps S704 and S709). If a plurality of conversion modules still remain after step S704, conversion modules with the highest compatibility level are extracted. If only one conversion module is extracted, that module is determined as the one to be used (steps S705 and S709).

As a result of narrowing down the candidates, if a plurality of conversion modules still remain, a conversion module in the identical site is preferentially determined to be the one to be used (steps S706 and S708). If a conversion module in the identical site is not found, a conversion module with the smallest conversion module ID is set as the one to be used (steps S706 and S707). If a plurality of conversion modules are found in the identical site at the time of step S706, a conversion module with the smallest ID of those in the identical site is determined as the one to be used in step S707.

If the use price of the conversion module is zero (by looking up the conversion module table 406*f*) or use of a pay conversion module is permitted (by looking up the user conversion setup table 406*e*) (step S322), it is checked if the selected conversion module is present within the site (step S323). If YES in step S323, a conversion instruction is sent to the selected conversion module (step S326). On the other hand, if the selected conversion module is present in a site other than the self site, a conversion instruction is sent to the judgment module of that site (step S324).

Figure 47:
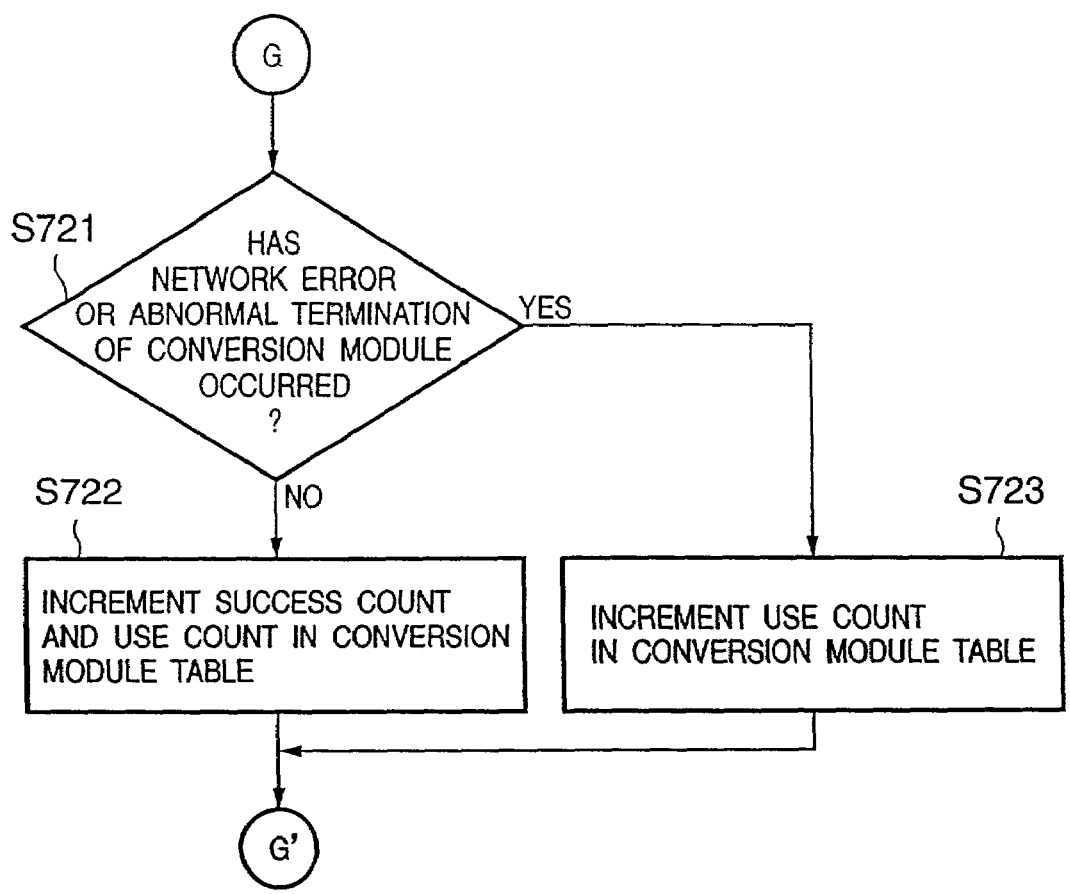
FIG. 47 is a flow chart for explaining a stability update process.

Upon completion of conversion by the conversion module irrespective of the site location, the stability is updated in G (see FIG. 47). That is, if any error such as a network error, abnormal termination of the conversion module, or the like has occurred (step S721), only the use count in the conversion module table 406*f* is incremented (step S723); otherwise, both the use count and success count in the conversion module table 406*f* are incremented (step S722).

Upon completion of updating (G) of the stability, an accounting process is executed. If conversion was made by the conversion module outside the site, the price in the conversion module table 406*f* is added to the accounting record in the user information table 406*a*, the scheduled payment record in the service company table 406*g*, and the site-dependent scheduled payment record in the service site table 406*h* (step S325). On the other hand, if the conversion was made by the conversion module in the site, the price in the conversion module table 406*f* is added to only the accounting record in the user information table 406*a* (step S327).

On the other hand, if no appropriate conversion module is registered in the conversion module table 406*f* (step S313), or if the price of the conversion module to be used is not zero and use of a pay conversion module is not permitted in the user conversion setup table 406*e* (step S322), steps S314 to S317 and S321 are executed to select an appropriate conversion module from the directory service sites registered in the use directory service table 406*i*.

The number of directory service sites registered in the use directory service table 406*i* is stored in a variable i (step S314), an inquiry is sent to the service site in the order of priority (step S316), and this process is repeated until a directory service site in which an appropriate conversion module is registered is found (steps S317, S321, and S315). If no appropriate conversion module is found even after inquiries were sent to all directory service sites (i=0 in step S315), conversion is skipped.

If an appropriate conversion module is found, and the price of the conversion module is zero (by looking up the conversion module table 406*f*) or use of a pay conversion module is permitted (by looking up the user conversion setup table 406*e*) (step S318), a conversion instruction is sent to the corresponding directory service site (step S319). After conversion, the price of the conversion module (to be described later) is added to the accounting record in the user information table 406*a*, the scheduled payment record in the service company table 406*g*, and the site-dependent scheduled payment record in the service site table 406*h* (step S320). On the other hand, if the price of the conversion module to be used is not zero and use of a pay conversion module is not permitted in the user conversion setup table 406*e* (step S318), conversion is skipped.

If the user sets to display a wordprocessor document on a Web (step S331), it is checked based on Content-Type and name extension if mail data contains a wordprocessor document (step S332). By comparing the Content-Type and name extension of the wordprocessor document with the input format (MIME) and input format (extension) in the conversion module table 406*f*, an appropriate conversion module used to convert the format of this wordprocessor document to HTML is searched for (step S333).

If appropriate conversion modules are found, one optimal conversion module is selected via procedure F. If the use price of the conversion module is zero (by looking up the conversion module table 406*f*) or use of a pay conversion module is permitted (by looking up the user conversion setup table 406*e*) (step S342), it is checked if the selected conversion module is present within the site (step S343). If YES in step S343, a conversion instruction of that wordprocessor document is sent to the selected conversion module (step S346). On the other hand, if the selected conversion module is present in a site other than the self site, a conversion instruction is sent to the judgment module of that site (step S344).

Upon completion of conversion by the conversion module irrespective of the site location, the stability is updated in the above process G (see FIG. 47), and an accounting process is then executed. If conversion was made by the conversion module outside the site, the price in the conversion module table 406*f* is added to the accounting record in the user information table 406*a*, the scheduled payment record in the service company table 406*g*, and the site-dependent scheduled payment record in the service site table 406*h* (step S345). On the other hand, if the conversion was made by the conversion module in the site, the price in the conversion module table 406*f* is added to only the accounting record in the user information table 406*a* (step S347).

On the other hand, if no appropriate conversion module is registered in the conversion module table 406*f* in step S333, or if the price of the conversion module to be used is not zero and use of a pay conversion module is not permitted in the user conversion setup table 406*e* in step S342, the flow advances to step S334 to execute steps S334 to S337 and S341 so as to select an appropriate conversion module from the directory service sites registered in the use directory service table 406*i*.

The number of directory service sites registered in the use directory service table 406*i* is stored in a variable i (step S334), an inquiry is sent to the service site in the order of priority (step S336), and this process is repeated until a directory service site in which an appropriate conversion module is registered is found (steps S337, S341, and S335). If no appropriate conversion module is found even after inquiries were sent to all directory service sites (i=0 in step S335), conversion is skipped.

If an appropriate conversion module is found, and the price of the conversion module is zero (by looking up the conversion module table 406*f*) or use of a pay conversion module is permitted (by looking up the user conversion setup table 406*e*) (step S338), a conversion instruction is sent to the corresponding directory service site (step S339). After conversion, the price of the conversion module (to be described later) is added to the accounting record in the user information table 406*a*, the scheduled payment record in the service company table 406*g*, and the site-dependent scheduled payment record in the service site table 406*h* (step S340). On the other hand, if the price of the conversion module to be used is not zero and use of a pay conversion module is not permitted in the user conversion setup table 406*e* (step S338), conversion is skipped.

Individual converted parts or non-converted parts are arranged in the order in which they appear in the original mail, and an HTML header obtained by bounding the contents of "Subject" by title tags is appended (step S351), thus generating a Web page. The obtained Web page is stored in the net database 400 (step S352).

Figure 48:
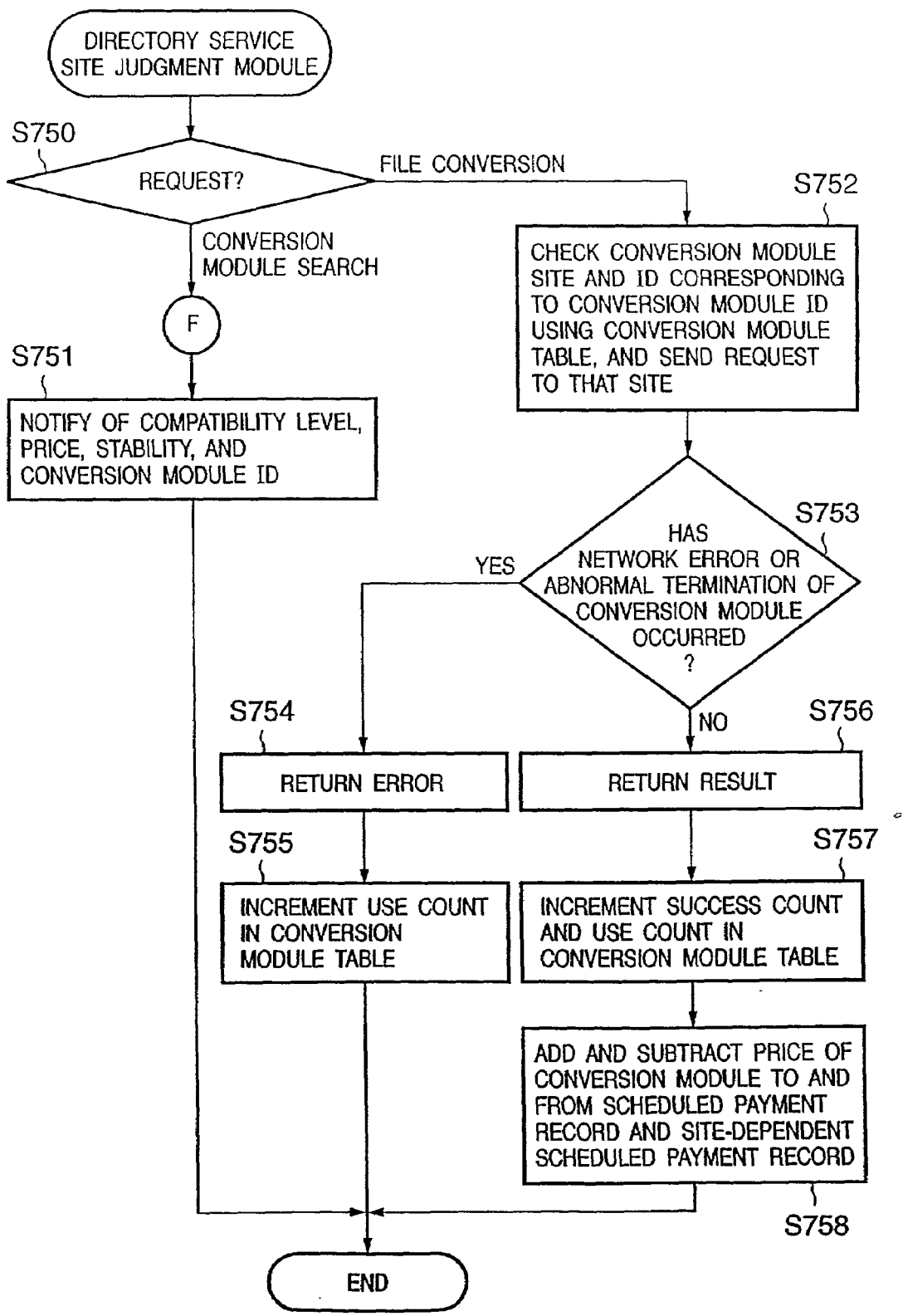
FIG. 48 is a flow chart for explaining the process of the judgment module in a directory service site of this embodiment.
Figure 52:
FIG. 52 shows an example of an XML file used upon searching for a conversion module of this embodiment.

Note that inquiring of the directory service site is implemented by passing an XML file via HTTP in this embodiment. FIG. 52 shows an example of an XML file indicating an inquiry. The XML file describes MIME and extensions of the input and output formats of a required conversion module, which are compared with those in the conversion module table 406*f* in the directory service site. The XML file also describes contents to be emphasized upon selecting a conversion module, and such contents are used to select one conversion module if a plurality of conversion modules that meet the condition are found (process F to be described later using FIG. 48). Using an XML file shown in FIG. 53, data of the found conversion module is passed (step S751).

This XML file contains id which is used as an argument upon sending a conversion request to the directory service site, in addition to the price of the conversion module. Note that this id is the same as the conversion module ID contained in the conversion module table 406*f*. Note that this embodiment implements using XML and HTTP, but such implementation is merely an example and there are no portions which depend on XML and HTTP. It is possible to implement using a unique protocol or another versatile protocol.

In the process shown in FIGS. 41A to 41D, if it is determined in step S318 (S338) that the use fee of a module found by the process in steps S314 to S317 and S321 (S334 to S337 and S341) is not zero, and use of a pay conversion module is not permitted, conversion is skipped. Alternatively, steps S314 to S317 and S321 (S334 to S337 and S341) may be executed to search for a directory service site with lower priority for a conversion module.

<<Conversion to Web Page Compatible to Portable Terminal>>

FIGS. 42A to 42D are flow charts showing a sequence for generating a Web page compatible to a portable terminal. In order to detect a Mark Up language that a portable terminal uses, the portable terminal performance table 406*j* is looked up to find a Mark Up language of a portable terminal specified by the portable terminal type, carrier name, and model number in the user portable terminal information table 406*d* (step S401). Since body text does not require any conversion, conversion is required for an image, wordprocessor document, or the like attached to a mail message.

If the user conversion setup table 406*e* includes a setup for displaying an image on a Web compatible to the portable terminal (step S411), it is checked based on Content-Type and name extension if mail data contains an image (step S412). If an image is contained, the portable terminal performance table 406*j* is looked up to find an image format that can be displayed by the portable terminal specified by the portable terminal type, carrier name, and model number in the user portable terminal information table 406*d* (step S413). Then, the Content-Type and name extension of the image are compared with the input format (MIME) and input format (extension) in the conversion module table 406*f* to search for appropriate conversion modules for converting this image into an appropriate image format (step S414).

If appropriate conversion modules are found, one optimal conversion module is selected via procedure F. If the use price of the conversion module is zero (by looking up the conversion module table 406*f*) or use of a pay conversion module is permitted (by looking up the user conversion setup table 406*e*) (step S423), it is checked if the selected conversion module is present within the site (step S424). If YES in step S424, a conversion instruction is sent to the selected conversion module (step S427). On the other hand, if the selected conversion module is present in a site other than the self site, a conversion instruction is sent to the judgment module of that site (step S425). Upon completion of conversion by the conversion module irrespective of the site location, the stability is updated in G (see FIG. 47), and an accounting process is then executed. That is, if conversion was made by the conversion module outside the site, the price in the conversion module table 406*f* is added to the accounting record in the user information table 406*a*, the scheduled payment record in the service company table 406*g*, and the site-dependent scheduled payment record in the service site table 406*h* (step S426). On the other hand, if the conversion was made by the conversion module in the site, the price in the conversion module table 406*f* is added to only the accounting record in the user information table 406*a* (step S428).

On the other hand, if no appropriate conversion module is registered in the conversion module table 406*f* in step S414, or if the price of the conversion module to be used is not zero and use of a pay conversion module is not permitted in the user conversion setup table 406*e* in step S423, steps S415 to S418 and S422 are executed to select an appropriate conversion module from the directory service sites registered in the use directory service table 406*i*.

The number of directory service sites registered in the use directory service table 406*i* is stored in a variable i (step S415), an inquiry is sent to the service site in the order of priority (step S417), and this process is repeated until a directory service site in which an appropriate conversion module is registered is found (steps S418, S422, and S416). If no appropriate conversion module is found even after inquiries were sent to all directory service sites (i=0 in step S416), conversion is skipped.

If an appropriate conversion module is found, and the price of the conversion module is zero (by looking up the conversion module table 406*f*) or use of a pay conversion module is permitted (by looking up the user conversion setup table 406*e*) (step S419), a conversion instruction is sent to the corresponding directory service site (step S420).

After conversion, the price of the conversion module reported from the directory service site is added to the accounting record in the user information table 406*a*, the scheduled payment record in the service company table 406*g*, and the site-dependent scheduled payment record in the service site table 406*h* (step S421). On the other hand, if it is determined in step S419 that the price of the conversion module to be used is not zero and use of a pay conversion module is not permitted in the user conversion setup table 406*e*, conversion is skipped.

Upon completion of the process for the image attached to the mail message, a process for a wordprocessor document attached to that mail message is then executed.

If the user sets to display a wordprocessor document on a Web compatible to a portable terminal, i.e., if a setup is made to display the summary of the wordprocessor document on the portable terminal compatible Web (step S431), it is checked based on Content-Type and name extension if mail data contains a wordprocessor document (step S432). If the wordprocessor document is contained, the Content-Type and name extension of the wordprocessor document are compared with the input format (MIME) and input format (extension) in the conversion module table 406*f* to search for an appropriate conversion module used to convert the format of this wordprocessor document to the Mark Up language found in step S401 (step S433).

If appropriate conversion modules are found, one optimal conversion module is selected via procedure F. If the use price of the conversion module is zero (by looking up the conversion module table 406f) or use of a pay conversion module is permitted (by looking up the user conversion setup table 406e) (step S442), it is checked if the selected conversion module is present within the site (step S443). If YES in step S443, a conversion instruction of that word-processor document is sent to the selected conversion module (step S446). On the other hand, if the selected conversion module is present in a site other than the self site, a conversion instruction of the wordprocessor document is sent to the judgment module of that site (step S444).

Upon completion of conversion by the conversion module irrespective of the site location, the stability is updated in G (see FIG. 47), and an accounting process is then executed. That is, if conversion was made by the conversion module outside the site, the price in the conversion module table 406f is added to the accounting record in the user information table 406a, the scheduled payment record in the service company table 406g, and the site-dependent scheduled payment record in the service site table 406h (step S445). On the other hand, if the conversion was made by the conversion module in the site, the price in the conversion module table 406f is added to only the accounting record in the user information table 406a (step S447).

On the other hand, if no appropriate conversion module is registered in the conversion module table 406f (step S433), or if the price of the conversion module to be used is not zero and use of a pay conversion module is not permitted in the user conversion setup table 406e (step S442), steps S434 to S437 and S441 are executed to select an appropriate conversion module from the directory service sites registered in the use directory service table 406i.

The number of directory service sites registered in the use directory service table 406i is stored in a variable i (step S434), an inquiry is sent to the service site in the order of priority (step S436), and this process is repeated until a directory service site in which an appropriate conversion module is registered is found (steps S437, S441, and S435). If no appropriate conversion module is found even after inquiries were sent to all directory service sites (i=0 in step S435), conversion is skipped.

If an appropriate conversion module is found, and the price of the conversion module is zero (by looking up the conversion module table 406f) or use of a pay conversion module is permitted (by looking up the user conversion setup table 406e) (step S438), a conversion instruction is sent to the corresponding directory service site (step S439). After conversion, the price of the conversion module reported from the directory service site is added to the accounting record in the user information table 406a, the scheduled payment record in the service company table 406g, and the site-dependent scheduled payment record in the service site table 406h (step S440). On the other hand, if the price of the conversion module to be used is not zero and use of a pay conversion module is not permitted in the user conversion setup table 406e (step S438), conversion is skipped.

Individual converted parts or non-converted parts are arranged in the order in which they appear in the original mail, and a header unique to the Mark Up language, which contains the contents of "Subject" as a title is appended (step S451), thus generating a Web page compatible to the portable terminal. The obtained Web page is stored in the net database 400 (step S452).

In this embodiment, it is assumed that a Web browser on the portable terminal can process a sufficiently large file size. However, even if the file size that the Web browser can process is limited, the file may be divided into a plurality of files which can be joined via hyperlinks. Hence, the above assumption can preserve universality.

In the process shown in FIGS. 42A to 42D, if it is determined in step S419 (S438) that the use fee of a module found by the process in steps S415 to S418 and S422 (S434 to S437 and S441) is not zero, and use of a pay conversion module is not permitted, conversion is skipped. Alternatively, steps S415 to S418 and S422 (S434 to S437 and S441) may be executed to search for a directory service site with lower priority for a conversion module.

<<Conversion to Data That Can Be Sent to FAX>>

FIGS. 43A to 43D are flow charts showing a process for generating display data to be sent via FAX. If the user sets to send mail body text via FAX (step S501), body text is converted into a CCITT FAX format by a conversion module for laying out and rendering body text and then CCITT FAX encoding that text (step S502).

If the user conversion setup table 406e includes a setup for sending an image via FAX (step S511), it is checked based on Content-Type and name extension if mail data contains an image (step S512). If an image is contained, the Content-Type and name extension of the image are compared with the input format (MIME) and input format (extension) in the conversion module table 406f to search for appropriate conversion modules for converting this image into the CCITT FAX (step S513).

If appropriate conversion modules are found, one optimal conversion module is selected via procedure F. If the use price of the conversion module is zero (by looking up the conversion module table 406f) or use of a pay conversion module is permitted (by looking up the user conversion setup table 406e) (step S522), it is checked if the selected conversion module is present within the site (step S523). If YES in step S523, a conversion instruction is sent to the selected conversion module (step S526). On the other hand, if the selected conversion module is present in a site other than the self site, a conversion instruction is sent to the judgment module of that site (step S524).

Upon completion of conversion by the conversion module irrespective of the site location, the stability is updated in G (see FIG. 47), and an accounting process is then executed. If conversion was made by the conversion module outside the site, the price in the conversion module table 406f is added to the accounting record in the user information table 406a, the scheduled payment record in the service company table 406g, and the site-dependent scheduled payment record in the service site table 406h (step S525). On the other hand, if the conversion was made by the conversion module in the site, the price in the conversion module table 406f is added to only the accounting record in the user information table 406a (step S527).

On the other hand, if no appropriate conversion module is registered in the conversion module table 406f (step S513), or if the price of the conversion module to be used is not zero and use of a pay conversion module is not permitted in the user conversion setup table 406e (step S522), steps S514 to S517 and S521 are executed to select an appropriate conversion module from the directory service sites registered in the use directory service table 406i.

The number of directory service sites registered in the use directory service table 406i is stored in a variable i (step S514), an inquiry is sent to the service site in the order of priority (step S516), and this process is repeated until a directory service site in which an appropriate conversion module is registered is found (steps S517, S521, and S515). If no appropriate conversion module is found even after inquiries were sent to all directory service sites (i=0 in step S515), conversion is skipped.

If an appropriate conversion module is found, and the price of the conversion module is zero (by looking up the conversion module table 406*f*) or use of a pay conversion module is permitted (by looking up the user conversion setup table 406*e*) (step S518), a conversion instruction is sent to the corresponding directory service site (step S519). After conversion, the price of the conversion module reported from the directory service site is added to the accounting record in the user information table 406*a*, the scheduled payment record in the service company table 406*g*, and the site-dependent scheduled payment record in the service site table 406*h* (step S520). On the other hand, if the price of the conversion module to be used is not zero and use of a pay conversion module is not permitted in the user conversion setup table 406*e* (step S518), conversion is skipped.

Furthermore, if the user sets to forward a wordprocessor document to FAX (step S531), it is checked based on Content-Type and name extension if mail data contains a wordprocessor document (step S532). If the wordprocessor document is contained, the Content-Type and name extension of the wordprocessor document are compared with the input format (MIME) and input format (extension) in the conversion module table 406*f* to search for an appropriate conversion module used to convert the format of this wordprocessor document to the CCITT FAX format (step S533).

If appropriate conversion modules are found, one optimal conversion module is selected via procedure F. If the use price of the conversion module is zero (by looking up the conversion module table 406*f*) or use of a pay conversion module is permitted (by looking up the user conversion setup table 406*e*) (step S542), it is checked if the selected conversion module is present within the site (step S543). If YES in step S543, a conversion instruction of that wordprocessor document is sent to the selected conversion module (step S546). On the other hand, if the selected conversion module is present in a site other than the self site, a conversion instruction is sent to the judgment module of that site (step S544).

Upon completion of conversion by the conversion module irrespective of the site location, the stability is updated in the above process G (see FIG. 47), and an accounting process is then executed. If conversion was made by the conversion module outside the site, the price in the conversion module table 406*f* is added to the accounting record in the user information table 406*a*, the scheduled payment record in the service company table 406*g*, and the site-dependent scheduled payment record in the service site table 406*h* (step S545). On the other hand, if the conversion was made by the conversion module in the site, the price in the conversion module table 406*f* is added to only the accounting record in the user information table 406*a* (step S547).

On the other hand, if no appropriate conversion module is registered in the conversion module table 406*f* in step S533, or if the price of the conversion module to be used is not zero and use of a pay conversion module is not permitted in the user conversion setup table 406*e* in step S542, the flow advances to step S534 to execute steps S534 to S537 and S541 so as to select an appropriate conversion module from the directory service sites registered in the use directory service table 406*i*.

The number of directory service sites registered in the use directory service table 406*i* is stored in a variable i (step S534), an inquiry is sent to the service site in the order of priority (step S536), and this process is repeated until a directory service site in which an appropriate conversion module is registered is found (steps S537, S541, and S535). If no appropriate conversion module is found even after inquiries were sent to all directory service sites (i=0 in step S535), conversion is skipped.

If an appropriate conversion module is found, and the price of the conversion module is zero (by looking up the conversion module table 406*f*) or use of a pay conversion module is permitted (by looking up the user conversion setup table 406*e*) (step S538), a conversion instruction is sent to the corresponding directory service site (step S539) After conversion, the price of the conversion module reported from the directory service site is added to the accounting record in the user information table 406*a*, the scheduled payment record in the service company table 406*g*, and the site-dependent scheduled payment record in the service site table 406*h* (step S540). On the other hand, if the price of the conversion module to be used is not zero and use of a pay conversion module is not permitted in the user conversion setup table 406*e* (step S538), conversion is skipped.

Individual converted parts are arranged in the order in which they appear in the original mail to generate a document to be sent, and the number of pages of the document is checked (step S551). If the number of pages is equal to or smaller than the number of pages that the user designated in the FAX allowable output page count (819) in FIG. 27 (registered in the user conversion setup table 406*e*) (step S552), a cover page indicating the address of user's choice as a FAX forwarding destination is generated, and is attached to the head of the generated document (step S553). On the other hand, if the number of pages of the document is larger than the number of pages that the user designated in the FAX allowable output page count (819) in FIG. 27, the flow advances to step S554 to delete some pages from the document generated in step S551 in turn from the last page, so that the number of pages of the document falls becomes equal to the FAX allowable output page count. Then, a cover page which contains a message indicating that the number of pages to be sent is limited according to user's designation, and which indicates the address of user's choice as a FAX forwarding destination is generated, and is appended to the head of the document, the number of pages of which has been adjusted (step S554). The document obtained in step S553 or S554 is sent to a facsimile device designated by the user via the FAX server 650 (step S555)

<<Convert to Data Displayable on Portable Terminal>>

FIG. 44 is a flow chart showing a process for generating data to be displayed on a portable terminal. When data is uploaded to the Web server or a FAX document is sent, text of a message to be sent to the portable terminal is generated. That is, it is checked if "notify by mail when Web page is uploaded to Web server" is set in the user conversion setup table 406*e* (step S601). If YES in step S601, message text indicating that data is uploaded to the Web server is generated (step S602). Likewise, it is checked if "notify by mail when page compatible to portable terminal is uploaded to Web server" is set in the user conversion setup table 406*e* (step S603). If YES in step S603, message text indicating that data is uploaded to the Web server is generated (step S604). It is then checked if "notify of destination if FAX is sent" is set in the user conversion setup table 406*e* (step S605). If YES in step S605, message text indicating that the FAX is sent, and FAX destination is generated (step S606). The message text contents generated in these steps S602, S604, and S606 are arranged in turn, and the number of characters of total text is checked (step S607).

It is checked if "forward to portable terminal=ON" is set in the user conversion setup table 406e (step S608). If YES in step S608, individual conversion processes, which will be explained later using the flow charts of FIGS. 45A to 45D, are executed. After that, individual converted parts and parts which need not be converted are appended in an order in which they appear in the original mail, and message text generated in step S607 is appended to the head, thus generating a document to be sent to the portable terminal (step S609). The obtained document is sent to the portable terminal designated by the user via the mail server 100 (step S610).

Process E executed when it is determined in step S608 that "forward to portable terminal=ON" is set will be described in detail below. When "forward to portable terminal=ON" is set, the control enters the process in FIGS. 45A to 45D to execute individual conversion processes required to display a mail message on the portable terminal.

As for body text, the portable terminal performance table 406j is looked up to find the maximum number of characters that can be displayed on the portable terminal specified by the portable terminal type, carrier name, and model number registered in the user portable terminal information table 406d, and it is checked if the number of characters of mail body text is larger than a value obtained by subtracting the number of characters of the message text detected in step S607 from the maximum number of displayable characters (step S621). If YES in step S621, it is checked based on the setup contents of the user conversion setup table 406e if a summary of body text is to be generated (step S622). If the user sets to generate the summary, a conversion module for generating a summary of body text generates a summary of mail body text (step S624). On the other hand, if the user sets not to generate a summary, a conversion module which cuts off a character string of the mail body text to fall within the maximum number of displayable characters of the portable terminal cuts off a character string (step S623).

If the user conversion setup table 406e includes a setup for displaying an image on the portable terminal (step S631), it is checked based on Content-Type and name extension if mail data contains an image (step S632). If an image is contained, the portable terminal performance table 406j is looked up to find an image format that can be displayed by the portable terminal specified by the portable terminal type, carrier name, and model number in the user portable terminal information table 406d (step S633). Then, the Content-Type and name extension of the image are compared with the input format (MIME) and input format (extension) in the conversion module table 406f to search for appropriate conversion modules for converting this image into an appropriate image format (step S634).

If appropriate conversion modules are found, one optimal conversion module is selected via procedure F. If the price of the conversion module is zero (by looking up the conversion module table 406f) or use of a pay conversion module is permitted (by looking up the user conversion setup table 406e) (step S643), it is checked if the selected conversion module is present within the site (step S644). If YES in step S644, a conversion instruction is sent to the selected conversion module (step S647). On the other hand, if the selected conversion module is present in a site other than the self site, a conversion instruction is sent to the judgment module of that site (step S645).

Upon completion of conversion by the conversion module irrespective of the site location, the stability is updated in G (see FIG. 47), and an accounting process is then executed. If conversion was made by the conversion module outside the site, the price in the conversion module table 406f is added to the accounting record in the user information table 406a, the scheduled payment record in the service company table 406g, and the site-dependent scheduled payment record in the service site table 406h (step S646). On the other hand, if the conversion was made by the conversion module in the site, the price in the conversion module table 406f is added to only the accounting record in the user information table 406a (step S648).

On the other hand, if no appropriate conversion module is registered in the conversion module table 406f (step S634), or if the price of the conversion module to be used is not zero and use of a pay conversion module is not permitted in the user conversion setup table 406e (step S643), steps S635 to S638 and S642 are executed to select an appropriate conversion module from the directory service sites registered in the use directory service table 406i.

The number of directory service sites registered in the use directory service table 406i is stored in a variable i (step S635), an inquiry is sent to the service site in the order of priority (step S637), and this process is repeated until a directory service site in which an appropriate conversion module is registered is found (steps S638, S642, and S636). If no appropriate conversion module is found even after inquiries were sent to all directory service sites (i=0 in step S636), conversion is skipped.

If an appropriate conversion module is found, and the price of the conversion module is zero (by looking up the conversion module table 406f) or use of a pay conversion module is permitted (by looking up the user conversion setup table 406e) (step S639), a conversion instruction is sent to the corresponding directory service site (step S640). After conversion, the price of the conversion module reported from the directory service site is added to the accounting record in the user information table 406a, the scheduled payment record in the service company table 406g, and the site-dependent scheduled payment record in the service site table 406h (step S641). On the other hand, if it is determined in step S639 that the price of the conversion module to be used is not zero and use of a pay conversion module is not permitted in the user conversion setup table 406e, conversion is skipped.

Also, if the user sets to display the summary of a word processor document on the portable terminal (step S651), it is checked based on Content-Type and name extension if mail data contains a wordprocessor document (step S652). If the wordprocessor document is contained, the Content-Type and name extension of the wordprocessor document are compared with the input format (MIME) and input format (extension) in the conversion module table 406f to search for an appropriate conversion module used to convert the format of this wordprocessor document to the summary (step S653).

If appropriate conversion modules are found, one optimal conversion module is selected via procedure F. If the use price of the conversion module is zero (by looking up the conversion module table 406f) or use of a pay conversion module is permitted (by looking up the user conversion setup table 406e) (step S662), it is checked if the selected conversion module is present within the site (step S663). If YES in step S663, a conversion instruction is sent to the selected conversion module (step S666). On the other hand, if the selected conversion module is present in a site other than the self site, a conversion instruction is sent to the judgment module of that site (step S664).

Upon completion of conversion by the conversion module irrespective of the site location, the stability is updated in G (see FIG. 47), and an accounting process is then executed. If conversion was made by the conversion module outside the site, the price in the conversion module table 406f is added to the accounting record in the user information table 406a, the scheduled payment record in the service company table 406g, and the site-dependent scheduled payment record in the service site table 406h (step S665). On the other hand, if the conversion was made by the conversion module in the site, the price in the conversion module table 406f is added to only the accounting record in the user information table 406a (step S667).

On the other hand, if no appropriate conversion module is registered in the conversion module table 406f (step S653), or if the price of the conversion module to be used is not zero and use of a pay conversion module is not permitted in the user conversion setup table 406e (step S662), steps S654 to S657 and S661 are executed to select an appropriate conversion module from the directory service sites registered in the use directory service table 406i.

The number of directory service sites registered in the use directory service table 406i is stored in a variable i (step S654), an inquiry is sent to the service site in the order of priority (step S656), and this process is repeated until a directory service site in which an appropriate conversion module is registered is found (steps S657, S661, and S655). If no appropriate conversion module is found even after inquiries were sent to all directory service sites (i=0 in step S655), conversion is skipped.

If an appropriate conversion module is found, and the price of the conversion module is zero (by looking up the conversion module table 406f) or use of a pay conversion module is permitted (by looking up the user conversion setup table 406e) (step S658), a conversion instruction is sent to the corresponding directory service site (step S659). After conversion, the price of the conversion module reported from the directory service site is added to the accounting record in the user information table 406a, the scheduled payment record in the service company table 406g, and the site-dependent scheduled payment record in the service site table 406h (step S660). On the other hand, if the price of the conversion module to be used is not zero and use of a pay conversion module is not permitted in the user conversion setup table 406e (step S658), conversion is skipped.

In the process shown in FIGS. 45A to 45D, if it is determined in step S639 (S658) that the use fee of a module found by the process in steps S635 to S638 and S642 (S654 to S657 and S661) is not zero, and use of a pay conversion module is not permitted, conversion is skipped. Alternatively, steps S635 to S638 and S642 (S654 to S657 and S661) maybe executed to search for a directory service site with lower priority for a conversion module.

The functions of the judgment module of the net mail service site in the automatic conversion service have been explained. The functions of the judgment module in the directory service site will be explained below. As has already been described, there are two roles that the judgment module of the directory service site must play: (1) to fulfill the search request of a conversion module from the net mail service site, and (2) to fulfill the format conversion request. These functions will be described in detail below using FIG. 48.

If a request from the net mail service site is a search request of a conversion module (step S750), the judgment module receives an XML file that describes the input and output file formats of a required conversion module, and contents to be emphasized upon selecting that conversion module. Hence, using such information, process F (FIG. 46) is executed to select the best conversion module from those registered in the conversion module table 406f. Information (including compatibility level, price, stability, and conversion module ID) of this conversion module is passed as an XML file to the judgment module of the net mail service site (steps S750 to S751).

If a request from the net mail service site is a file conversion request (step S750), a conversion request is issued by designating the conversion module ID, as described above. The conversion module table 406f in the directory service site is looked up to find a conversion module site corresponding to this ID and the ID in that conversion module site, and a conversion request is sent to the conversion module site (step S752). If an error has occurred before the conversion result is obtained (step S753), an error is returned to the net mail service site (step S754), and the use count in the conversion module table 406f is incremented (step S755).

If a normal result is obtained, the conversion result is returned to the net mail service site (step S756), and both the use count and success count in the conversion module table 406f are incremented (step S757). Then, an accounting process is executed, i.e., the price in the conversion module table 406f is subtracted from (in case of the module in the mail service site) or added to (in case of the module in the conversion module site) the scheduled payment record in the service company table 406g and the site-dependent scheduled payment record in the service site table 406h (step S758).

Figure 49:
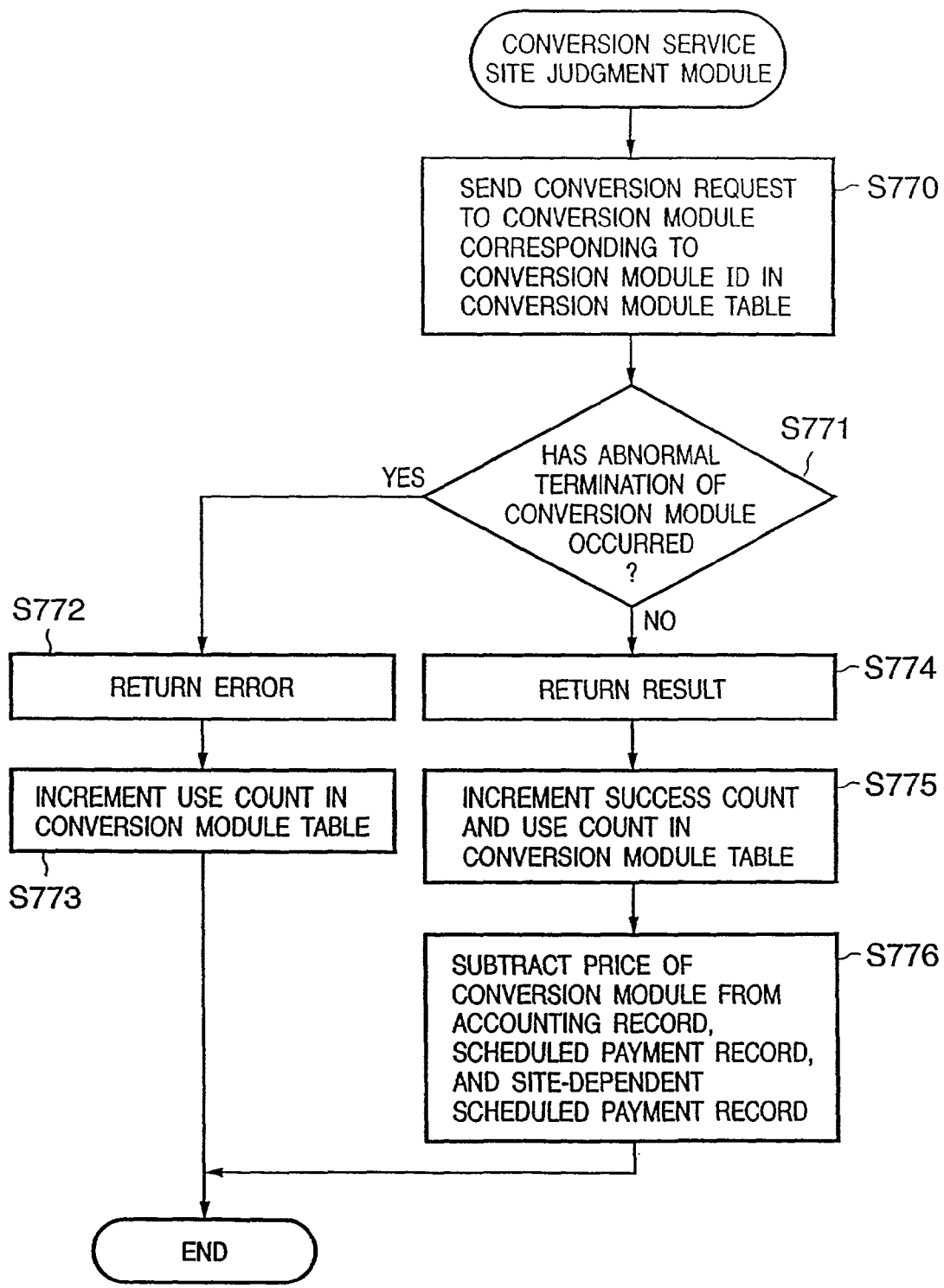
FIG. 49 is a flow chart for explaining the process of the judgment module in a conversion service site of this embodiment.

The functions of the judgment module in the conversion service site will be described below using FIG. 49. If a conversion request is issued from the net mail service site or directory service site, a conversion request is sent to a conversion module corresponding to the conversion module ID (step S770). If an error has occurred before the conversion result is obtained (step S771), an error is returned to the net mail service site or directory service site (step S772), and the use count in the conversion module table 406f is incremented (step S773). On the other hand, if a normal result is obtained, the conversion result is returned to the net mail service site or directory service site (step S774), and both the use count and success count in the conversion module table 406f are incremented (step S775). Then, an accounting process is executed, i.e., the price in the conversion module table 406f is subtracted from the scheduled payment record in the service company table 406g and the site-dependent scheduled payment record in the service site table 406h (step S776)

<Interactive Mail Conversion Service>

In the automatic mail conversion service, conversion is made based on the user conversion setups, which are set in advance using FIG. 27, and are stored in the user conversion setup table 406e. As has been described previously, the temporary flag of the use conversion setup table 406e used in this case is "False". On the other hand, in the interactive mail conversion service, user conversion setups are made using FIG. 30 or 34 immediately before conversion, and are stored in the user conversion setup table 406e. In this case, the contents of the user conversion setup table 406e are substantially the same as that in the automatic conversion service, except that the temporary flag is "True". In the automatic conversion service, the forwarding destination is selected from those registered in advance in the user home information table 406b, user office information table 406c, and user portable terminal information table 406d. In the interactive conversion service, the forwarding destination set via FIG. 30 or 34 is used instead. As can be seen from the above description, the automatic and interactive conversion services can use the same flow, and all descriptions using FIGS. 40 to 49 can be applied to the interactive conversion service. Hence, a description of the interactive conversion service will be omitted.

As described above, according to this embodiment, upon receiving information which cannot be expanded and displayed in a terminal environment in which the user receives an e-mail message, the user is informed of summary information and an acquisition method of that information, and information which cannot be expanded and displayed in the user's environment can be provided to the user in various patterns, thereby greatly improving an e-mail use environment.

<Another Embodiment>

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, DVD, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, the contents of an e-mail message can be forwarded while being converted into a data format corresponding to the performance of an e-mail receiving terminal, and a message indicating that forwarding can be sent to another receiving terminal.

As many apparently widely different embodiments of the present invention can be made without departing from the spirit and scope thereof, it is to be understood that the invention is not limited to the specific embodiments thereof except as defined in the claims.

What is claimed is:

1. An information service apparatus comprising:
   registering means for registering, in association with each destination terminal, permission information indicating whether or not a use of pay conversion module is permitted;
   reception means for receiving information including information to be sent and information of a destination user;
   determination means for determining a destination terminal of the information received by said reception means on the basis of information set in correspondence with the destination user;
   split means for splitting data contained in the information into respective types of contents;
   selection means for, with respect to each of split data split by said split means, selecting a conversion module based on permission information registered in association with the terminal device by said registering means, a usage fee of the conversion module and a format to be converted;
   instruction means for passing the split data to the conversion module selected by said selection means and instructing to convert the split data;
   obtaining means for obtaining converted data from the conversion module;
   output means for outputting the converted data to the destination terminal; and
   addition means for adding the usage fee of the conversion module to a payment record.

2. The apparatus according to claim 1, wherein said selection means selects the instruction to the conversion module that can implement format conversion for matching the split data with the processing performance of the destination terminal determined by said determination means.

3. The apparatus according to claim 1, wherein when the destination terminal is an information service apparatus using a World Wide Web, said instruction means instructs the selected conversion module to convert image data contained in the information to be sent into JPEG data, and to format-convert wordprocessor document data into HTML data.

4. An information service method comprising:
   the registering step of registering, in association with each destination terminal, permission information indicating whether or not a use of pay conversion module is permitted;
   the reception step of receiving information including information to be sent and information of a destination user;
   the determination step of determining a destination terminal of the information received in the reception step on the basis of information set in correspondence with the destination user;
   the split step of splitting data contained in the information into respective types of contents;
   the selection step of, with respect to each of split data split in said split step, selecting a conversion module based on permission information registered in association with the terminal device in the registering step, usage fee of the conversion module and a format to be converted;
   the instruction step of passing the split data to the conversion module selected in said selection step and instructing to convert the split data;
   the obtaining step of obtaining converted data from the conversion module;
   the output step of outputting the converted data to the destination terminal; and
   the addition step of adding the usage fee of the conversion module to a payment record.

5. A computer program product stored on a computer-readable memory medium and embodying a computer-executable program for implementing a method comprising:

program code of the registering step of registering, in association with each destination terminal, permission information indicating whether or not a use of pay conversion module is permitted;

program code of the reception step of receiving information including information to be sent and information of a destination user;

program code of the determination step of determining a destination of the information received in the reception step on the basis of information set in correspondence with the destination user;

program code of the split step of splitting data contained in the information into respective types of contents;

program code of the selection step of with respect to each of split data split in said split step, selecting a conversion module based on permission information registered in association with the terminal device in the registering step, a usage fee of the conversion module and a format to be converted;

program code of the instruction step of passing the split data to the conversion module selected in said selection step and instructing to convert the split data;

program code of the obtaining step of obtaining converted data from the conversion module;

program code of the output step of outputting the converted data to the destination terminal; and program code of the addition step of adding the usage fee of the conversion module to a payment record.

* * * * *

UNITED STATES PATENT AND TRADEMARK OFFICE
CERTIFICATE OF CORRECTION

PATENT NO. : 7,213,078 B2 Page 1 of 1
APPLICATION NO. : 10/159586
DATED : May 1, 2007
INVENTOR(S) : Kenichiro Matsuura et al.

It is certified that error appears in the above-identified patent and that said Letters Patent is hereby corrected as shown below:

Column 38, line 54, delete "S776)" and insert -- S776). --

Signed and Sealed this

Eighth Day of April, 2008

JON W. DUDAS
*Director of the United States Patent and Trademark Office*